(12) United States Patent
Li et al.

(10) Patent No.: US 11,649,529 B2
(45) Date of Patent: May 16, 2023

(54) ALUMINUM ALLOY PRODUCTS EXHIBITING IMPROVED BOND DURABILITY AND METHODS OF MAKING THE SAME

(71) Applicant: Novelis Inc., Atlanta, GA (US)

(72) Inventors: Liangliang Li, Atlanta, GA (US); Theresa Elizabeth MacFarlane, Woodstock, GA (US); Sazol Kumar Das, Acworth, GA (US); Peter Lloyd Redmond, Acworth, GA (US); Changook Son, Marietta, GA (US); Dewei Zhu, Marietta, GA (US); Yudie Yuan, Roswell, GA (US); Luis Fanor Vega, Woodstock, GA (US); Milan Felberbaum, Lausanne (CH); Julio Malpica, Canton, GA (US); Brian Paradis, Kennesaw, GA (US); Alp Manavbasi, Kennesaw, GA (US); Dechao Lin, Kennesaw, GA (US)

(73) Assignee: NOVELIS INC., Atlanta, GA (US)

(*) Notice: Subject to any disclaimer, the term of this patent is extended or adjusted under 35 U.S.C. 154(b) by 0 days.

(21) Appl. No.: 16/168,016

(22) Filed: Oct. 23, 2018

(65) Prior Publication Data

US 2019/0193185 A1 Jun. 27, 2019

Related U.S. Application Data

(60) Provisional application No. 62/741,688, filed on Oct. 5, 2018, provisional application No. 62/608,614, filed on Dec. 21, 2017.

(51) Int. Cl.
*C22C 21/00* (2006.01)
*B23K 11/11* (2006.01)
(Continued)

(52) U.S. Cl.
CPC ............. *C22C 21/00* (2013.01); *B21B 1/46* (2013.01); *B23K 11/11* (2013.01); *C22C 21/02* (2013.01);
(Continued)

(58) Field of Classification Search
CPC ..... C22C 21/00; C22C 21/003; C22C 21/006; C22C 21/02; C22C 21/04; C22C 21/06;
(Continued)

(56) References Cited

U.S. PATENT DOCUMENTS

| 8,524,015 B2 | 9/2013 | Zhao et al. |
| 10,041,154 B2 | 8/2018 | Hirayama et al. |

(Continued)

FOREIGN PATENT DOCUMENTS

| CN | 1576394 A | 2/2005 |
| CN | 1743507 | 3/2006 |

(Continued)

OTHER PUBLICATIONS

Total Materia, Aluminum-Magnesium (5000) Alloys, 2003 (Year: 2003).*

(Continued)

*Primary Examiner* — Keith Walker
*Assistant Examiner* — Benjamin C Anderson
(74) *Attorney, Agent, or Firm* — Kilpatrick Townsend & Stockton LLP

(57) ABSTRACT

Disclosed are aluminum alloy products and methods of making and processing such products. Thus, disclosed are aluminum alloy products exhibiting controllable surface properties, including excellent bond durability, low contact resistance, and corrosion resistance. Aluminum alloy products described herein include a migrant element, a subsurface portion having a concentration of the migrant element, and a bulk portion having a concentration of the migrant (Continued)

element. The aluminum alloy product comprises an enrichment ratio of 4.0 or less, wherein the enrichment ratio is a ratio of the migrant element concentration in the subsurface portion to the concentration in the bulk portion. Additionally, the aluminum alloy products surface and/or subsurface can contain phosphorus (e.g., elemental phosphorus or oxidized phosphorus). The phosphorus containing surface provides reduced electronic stress on an electrode tip of a resistance spot welding apparatus, and an extended service lifetime (e.g., weld cycles to failure) of the electrode tip.

37 Claims, 23 Drawing Sheets

(51) Int. Cl.

| | |
|---|---|
| C23F 1/00 | (2006.01) |
| C23F 1/20 | (2006.01) |
| C23F 17/00 | (2006.01) |
| C22F 1/047 | (2006.01) |
| B21B 1/46 | (2006.01) |
| C22C 21/12 | (2006.01) |
| C22C 21/02 | (2006.01) |
| C22F 1/043 | (2006.01) |
| C22F 1/053 | (2006.01) |
| B23K 103/10 | (2006.01) |
| C22C 21/08 | (2006.01) |

(52) U.S. Cl.
CPC .............. *C22C 21/12* (2013.01); *C22F 1/043* (2013.01); *C22F 1/047* (2013.01); *C22F 1/053* (2013.01); *C23F 1/00* (2013.01); *C23F 1/20* (2013.01); *C23F 17/00* (2013.01); *B23K 2103/10* (2018.08); *C22C 21/08* (2013.01)

(58) Field of Classification Search
CPC ......... C22C 21/08; C22C 21/10; C22C 21/12; C22C 21/14; C22C 21/16; C22C 21/18; C22F 1/043; C22F 1/047; C22F 1/05; C22F 1/053; C22F 1/057; C22F 1/04–057; B21B 3/003; B21B 2003/001; B22D 11/003; B23K 2103/10
See application file for complete search history.

(56) References Cited

U.S. PATENT DOCUMENTS

| | | | |
|---|---|---|---|
| 2002/0162990 A1* | 11/2002 | Johnson ................. | C23F 1/20 252/175 |
| 2013/0112323 A1* | 5/2013 | Abe ...................... | B22D 11/003 148/551 |
| 2014/0037984 A1 | 2/2014 | Eberl et al. | |
| 2014/0166162 A1* | 6/2014 | Hirayama ............... | C22C 21/06 148/551 |
| 2014/0366998 A1* | 12/2014 | Kamat .................... | C22C 21/08 148/551 |
| 2015/0064058 A1 | 3/2015 | Kim et al. | |
| 2015/0252453 A1* | 9/2015 | Aruga .................... | C22F 1/047 420/533 |
| 2016/0186302 A1* | 6/2016 | Hatta ...................... | C22F 1/04 420/532 |
| 2016/0237586 A1* | 8/2016 | Curran ................... | C22C 21/08 |
| 2017/0334171 A1* | 11/2017 | Takada ................... | B32B 9/00 |
| 2018/0216236 A1 | 8/2018 | Takada et al. | |
| 2019/0001623 A1* | 1/2019 | Yang ....................... | C22C 21/08 |
| 2019/0037721 A1* | 1/2019 | Curran ................... | H05K 5/04 |

FOREIGN PATENT DOCUMENTS

| | | | |
|---|---|---|---|
| CN | 101333614 A | 12/2008 | |
| CN | 102312233 | 1/2012 | |
| CN | 103572112 A | 2/2014 | |
| CN | 108220717 | 6/2018 | |
| EP | 1231296 | 8/2002 | |
| EP | 1328600 | 7/2003 | |
| EP | 3219828 | 9/2017 | |
| JP | S4918697 | 5/1974 | |
| JP | H06220564 | 8/1994 | |
| JP | H06-256881 A * | 9/1994 | ............. C22C 21/06 |
| JP | H09263868 | 10/1997 | |
| JP | 2000345364 | 12/2000 | |
| JP | 2007131889 | 5/2007 | |
| JP | 2008179843 | 8/2008 | |
| JP | 2009083190 A | 4/2009 | |
| JP | 2010222659 | 10/2010 | |
| JP | 2015203122 A | 11/2015 | |
| JP | 2017203209 | 11/2017 | |
| KR | 20130090371 | 8/2013 | |
| KR | 20140041293 | 4/2014 | |
| WO | 2013133978 A1 | 9/2013 | |
| WO | 2013187308 | 12/2013 | |
| WO | 2016094380 | 6/2016 | |
| WO | WO-2017111561 A1 * | 6/2017 | ........... B32B 15/012 |

OTHER PUBLICATIONS

"Understanding the Alloys of Aluminum", 2008. AlcoTec (Year: 2008).*
Miller et al., "Recent development in aluminium alloys for the automotive industry", 2000. Materials Science and Engineering A, vol. 280, pp. 37-49 (Year: 2000).*
Nadella et al., "Macrosegregation In Direct-Chill Casting of Aluminium Alloys", Progress in Materials Science, vol. 53, No. 3, Oct. 26, 2007, pp. 421-480.
PCT/US2018/057046 , "International Search Report and Written Opinion", dated Apr. 3, 2019, 15 pages.
PCT/US2018/057046 , "Invitation to Pay Additional Fees and, Where Applicable, Protest Fee", dated Feb. 8, 2019, 11 pages.
PCT/US2018/057053 , "International Search Report and Written Opinion", dated Jan. 8, 2019, 11 pages.
Chinese Application No. 201880082455.9, Office Action, dated Sep. 3, 2021, 23 pages.
Indian Application No. 202017023232, First Examination Report, dated Oct. 8, 2021, 7 pages.
Canadian Application No. 3,085,731, Office Action, dated Jun. 29, 2021, 4 pages.
European Application No. 18801128.2, Office Action, dated Jun. 18, 2021, 4 pages.
Japanese Application No. 2020-533082, Office Action, dated Aug. 3, 2021, 25 pages.
Canadian Application No. 3,085,731 , Notice of Allowance, dated May 30, 2022, 1 page.
Cayless , "Alloy and Temper Designation Systems for Aluminum and Aluminum Alloys", ASM Handbook, vol. 2: Properties and Selection: Nonferrous Alloys and Special-Purpose Materials, ASM Handbook Committee, 1990, pp. 15-28.
Chinese Application No. 201880082455.9 , Office Action, dated Mar. 14, 2022, 12 pages.
European Application No. 18801128.2 , "Summons to Attend Oral Proceedings", Mar. 14, 2022, 6 pages.
Japanese Application No. 2020-533082 , Office Action, dated Apr. 5, 2022, 17 pages.
Canadian Application No. 3,085,731 , Office Action, dated Dec. 7, 2021, 3 pages.
Korean Application No. 10-2020-7020464 , Office Action, dated Jan. 25, 2022, 10 pages.
Chinese Application No. 201880082455.9 , "Office Action", dated Jul. 5, 2022, 8 pages.
Korean Application No. 10-2020-7020464 , "Office Action", dated Jul. 31, 2022, 10 pages.
Japanese Application No. 2020-533082 , "Notice of Decision to Grant", dated Nov. 15, 2022, 4 pages.
Chinese Application No. 201880082455.9 , "Notice of Decision to Grant", dated Nov. 30, 2022, 7 pages.

(56) References Cited

OTHER PUBLICATIONS

European Application No. 22193045.6 , "Extended European Search Report", dated Dec. 15, 2022, 6 pages.
Korean Application No. 10-2020-7020464, "Notice of Decision to Grant", dated Feb. 15, 2023, 5 pages.

* cited by examiner

ALUMINUM ALLOY PRODUCTS EXHIBITING IMPROVED BOND DURABILITY AND METHODS OF MAKING THE SAME

CROSS-REFERENCE TO RELATED APPLICATIONS

This application claims the benefit of U.S. Provisional Application Nos. 62/608,614, filed Dec. 21, 2017, and 62/741,688, filed Oct. 5, 2018, which are incorporated herein by reference in their entireties.

FIELD

The present disclosure is directed to aluminum alloy products and the surface features of the same. The disclosure further relates to methods of processing aluminum alloy products.

BACKGROUND

Aluminum alloy products are often bonded or joined to other metals or alloys, including other aluminum alloys, during fabrication of aluminum alloy and other metals based products. Requirements of the aluminum alloy products include, for example, good bond durability and high resistance to corrosion. Aluminum alloy products can be processed in a manner to enhance the bond durability and corrosion resistance.

In addition, aluminum alloy products should exhibit amenability to resistance spot welding and other joining methods. In addition, the methods should include safeguards such that the replacement of consumable items used in the joining methods is minimized.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Described herein are aluminum alloy products and methods for preparing and processing the same. An aluminum alloy product as described herein comprises a migrant element, a subsurface portion having a concentration of the migrant element, and a bulk portion having a concentration of the migrant element, wherein the aluminum alloy product comprises an enrichment ratio of 4.0 or less, wherein the enrichment ratio is a ratio of the concentration of the migrant element in the subsurface portion to the concentration of the migrant element in the bulk portion. Optionally, the migrant element comprises Zn, Cu, Mg, and/or Si. The subsurface portion of the product can comprise an area from the surface of the aluminum alloy product to a depth of up to about 5 μm (e.g., to a depth of about 2 μm) within the interior of the aluminum alloy product, and the bulk portion can comprise the remainder of the aluminum alloy product. In some cases, the enrichment ratio in the product can be 2.0 or less, 1.5 or less, or 1.0. The aluminum alloy product can comprise a 7xxx series aluminum alloy, a 6xxx series aluminum alloy, a 5xxx series aluminum alloy, or a 2xxx series aluminum alloy.

Also described herein is an aluminum alloy product comprising a subsurface portion having a concentration of a migrant element and a bulk portion having a concentration of the migrant element. In these products, the concentration of the migrant element in the subsurface portion can be higher than the concentration of the migrant element in the bulk portion. Optionally, the migrant element comprises Cu, Mn, Cr, and/or Fe. The aluminum alloy product can optionally comprise a 6xxx series aluminum alloy or a 5xxx series aluminum alloy.

Also described herein are methods of producing an aluminum alloy product as described herein. The method can comprise casting an aluminum alloy comprising a migrant element to produce a cast aluminum alloy article, rolling the cast aluminum alloy article to provide a rolled aluminum alloy article, and heat treating the rolled aluminum alloy article to form an aluminum alloy product, wherein the migrant element is distributed within a subsurface portion and a bulk portion of the aluminum alloy product to provide an enrichment ratio of 4.0 lower and wherein the enrichment ratio is a ratio of the concentration of the migrant element in the subsurface portion to the concentration of the migrant element in the bulk portion. The rolling step can be performed at a temperature of from about 200° C. to about 550° C. The heat treating step can be performed at a temperature of from about 400° C. to about 580° C. and for a duration of about 120 seconds or less.

The method can further comprise pretreating the cast aluminum alloy product. The pretreating step can include cleaning a surface of the alloy product, etching the surface of the alloy product, and applying a pretreatment to the surface of the alloy product. Optionally, the pretreating is performed after the heat treating step. The casting can comprise direct chill casting or continuous casting.

Further described herein is an aluminum alloy product comprising a subsurface portion and a bulk portion, wherein the subsurface portion comprises phosphorus (P). The P can be present within the subsurface portion as at least one of elemental P, phosphorus pentoxide, phosphorus trioxide, phosphorus monoxide, or diphosphorus tetraoxide. Optionally, the subsurface portion comprises P in an amount of from about 2 atomic percent (at. %) to about 10 at. %. The subsurface portion can comprise an area from a surface of the aluminum alloy product to a depth of about 150 μm (e.g., to a depth of about 83 μm). The aluminum alloy product can comprise a yellow index of greater than about 15 (e.g., greater than about 20).

Also described herein are methods of treating a surface of an aluminum alloy product. The methods of treating a surface of an aluminum alloy product can comprise providing an aluminum alloy product having a subsurface portion and a bulk portion; and etching a surface of the aluminum alloy product with an etch solution comprising a P-containing compound. Optionally, the providing step comprises providing an aluminum alloy product comprising at least about 0.001 wt. % magnesium (Mg) (e.g., from about 0.001 wt. % to about 10 wt. % Mg). Optionally, the providing step comprises providing an aluminum alloy product comprising a 5xxx series aluminum alloy, a 6xxx series aluminum alloy, or a 7xxx series aluminum alloy.

The P-containing compound can comprise phosphoric acid, phosphonic acid, phosphinic acid, any other P-containing acid, and combinations thereof. Optionally, the etch solution further comprises one or more additional acids (e.g., sulfuric acid, hydrofluoric acid, acetic acid, and/or hydrochloric acid). In some examples, the etch solution comprises phosphoric acid and sulfuric acid. Optionally, the ratio of phosphoric acid to sulfuric acid is from about 3 to about 5. In certain aspects, etching the surface of the aluminum alloy product exposes Mg on the surface of the aluminum alloy product, and forms magnesium phosphate, magnesium phosphide, magnesium phosphite, or any combination thereof, and provides an atomic concentration ratio of P to Mg of from 0.001 to 10 in the subsurface portion.

Also described herein are aluminum alloy products prepared according to the methods described herein. The aluminum alloy products can comprise motor vehicle body parts, among others.

Further aspects, objects, and advantages will become apparent upon consideration of the detailed description and figures that follow.

BRIEF DESCRIPTION OF THE FIGURES

FIG. 25, Panel B shows a weld zone according to certain aspects of the present disclosure. FIG. 25, Panel C shows a higher magnification image of Panel B.

DETAILED DESCRIPTION

Figure 1:
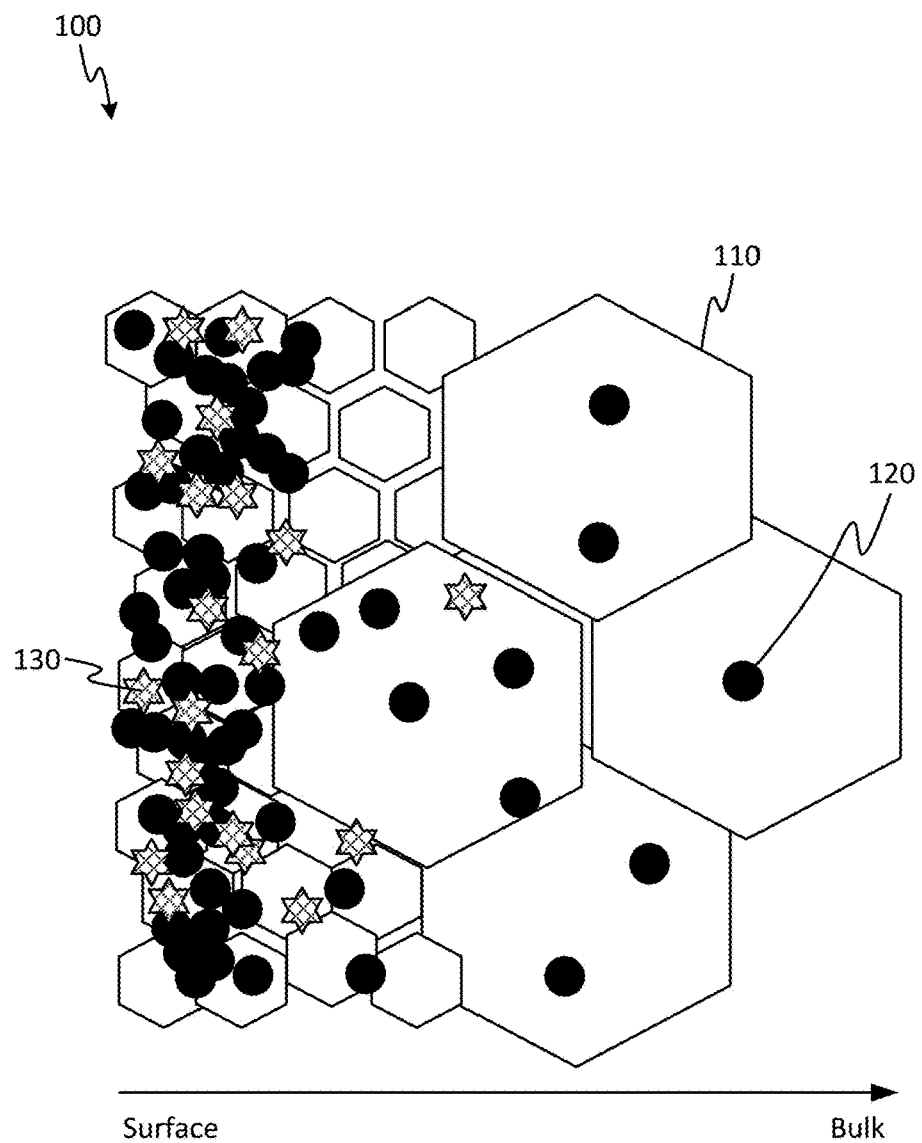
FIG. 1 is a schematic of migrant elements within subsurface and bulk portions of an aluminum alloy product.
Figure 1:
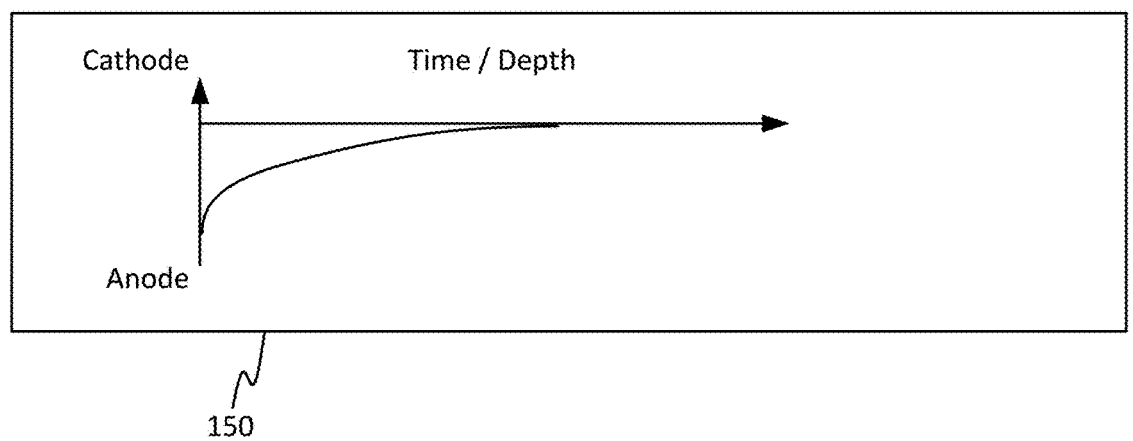

In a first embodiment of the present disclosure, described herein are metal alloy products, including aluminum alloy products, having desired surface properties. The aluminum alloy products described herein have a concentration of migrant elements, including magnesium and silicon, which can be controlled. In some cases, the concentration of the migrant elements throughout the thickness of the alloy product can be controlled to result in desirable properties. Exemplary desirable properties exhibited by the aluminum alloy products described herein include, for example, high bond durability and high corrosion resistance. The properties of the alloys are achieved due to the methods of processing the alloys to produce the described plates, shates, and sheets. As further described herein, the desirable properties can be achieved by specially designed rolling, heat treating, and/or etching and pretreating techniques.

In a second embodiment of the present disclosure, described herein are aluminum alloy products having a surface that contains phosphorus (P). The P can be present as elemental P or as phosphorus oxide. The P can be deposited during a surface etching process and can result in desirable properties exhibiting by the aluminum alloy product surface. Such desirable properties exhibited by the aluminum alloy products described herein include, for example, low contact resistance, thereby providing reduced electronic stress on an electrode tip of a resistance spot welding apparatus, and an extended service lifetime (e.g., weld cycles to failure) of the electrode tip.

Definitions and Descriptions

The terms "invention," "the invention," "this invention" and "the present invention" used herein are intended to refer broadly to all of the subject matter of this patent application and the claims below. Statements containing these terms should be understood not to limit the subject matter described herein or to limit the meaning or scope of the patent claims below.

In this description, reference is made to alloys identified by aluminum industry designations, such as "series" or "6xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, the meaning of "a," "an," or "the" includes singular and plural references unless the context clearly dictates otherwise.

As used herein, a plate generally has a thickness of greater than about 15 mm. For example, a plate may refer to an aluminum product having a thickness of greater than 15 mm, greater than 20 mm, greater than 25 mm, greater than 30 mm, greater than 35 mm, greater than 40 mm, greater than 45 mm, greater than 50 mm, or greater than 100 mm.

As used herein, a shate (also referred to as a sheet plate) generally has a thickness of from about 4 mm to about 15 mm. For example, a shate may have a thickness of 4 mm, 5 mm, 6 mm, 7 mm, 8 mm, 9 mm, 10 mm, 11 mm, 12 mm, 13 mm, 14 mm, or 15 mm.

As used herein, a sheet generally refers to an aluminum product having a thickness of less than about 4 mm. For example, a sheet may have a thickness of less than 4 mm, less than 3 mm, less than 2 mm, less than 1 mm, less than 0.5 mm, less than 0.3 mm, or less than 0.1 mm.

Reference is made in this application to alloy temper or condition. For an understanding of the alloy temper descriptions most commonly used, see "American National Standards (ANSI) H35 on Alloy and Temper Designation Systems." An F condition or temper refers to an aluminum alloy as fabricated. A W condition or temper refers to an aluminum alloy solution heat treated at a temperature greater than a solvus temperature of the aluminum alloy, and quenched. An O condition or temper refers to an aluminum alloy after annealing. An Hxx condition or temper, also referred to herein as an H temper, refers to a non-heat treatable aluminum alloy after cold rolling with or without thermal treatment (e.g., annealing). Suitable H tempers include HX1, HX2, HX3 HX4, HX5, HX6, HX7, HX8, or HX9 tempers. A T1 condition or temper refers to an aluminum alloy cooled from hot working and naturally aged (e.g., at room temperature). A T2 condition or temper refers to an aluminum alloy cooled from hot working, cold worked and naturally aged. A T3 condition or temper refers to an aluminum alloy solution heat treated, cold worked, and naturally aged. A T4 condition or temper refers to an aluminum alloy solution heat treated and naturally aged. A T5 condition or temper refers to an aluminum alloy cooled from hot working and artificially aged (at elevated temperatures). A T6 condition or temper refers to an aluminum alloy solution heat treated and artificially aged. A T7 condition or temper refers to an aluminum alloy solution heat treated and artificially over-aged. A T8x condition or temper refers to an aluminum alloy solution heat treated, cold worked, and artificially aged. A T9 condition or temper refers to an aluminum alloy solution heat treated, artificially aged, and cold worked. A W condition or temper refers to an aluminum alloy after solution heat treatment.

As used herein, terms such as "cast metal article," "cast article," and the like are interchangeable and refer to a product produced by direct chill casting (including direct chill co-casting) or semi-continuous casting, continuous casting (including, for example, by use of a twin belt caster, a twin roll caster, a block caster, or any other continuous caster), electromagnetic casting, hot top casting, or any other casting method.

As used herein, "bond durability" refers to an ability of a bonding agent bonding two products together to withstand cycled mechanical stress after exposure to environmental conditions that initiate failure of the bonding agent. Bond durability is characterized in terms of number of mechanical stress cycles applied to the bound products, while the bound products are exposed to the environmental conditions, until the bond fails.

As used herein, "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

All ranges disclosed herein are to be understood to encompass any endpoints and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

Aluminum Alloy Products Exhibiting Improved Bond Durability

Aluminum Alloy Products

Described herein are aluminum alloy products having desired surface properties. Among other properties, the aluminum alloy products described herein contain a controlled concentration of migrant elements throughout the thickness of the alloy product, including within the subsurface of the alloy product. In some non-limiting examples, the disclosed alloy products have improved surface qualities for bonding, joining, friction, corrosion resistance, and optical properties. In certain cases, the alloy products also demonstrate very good anodized qualities. In some aspects, alloys having desirable surface properties, including improved bonding and joining properties, have a low enrichment ratio of magnesium (Mg) and silicon (Si). Differences in the atomic concentration of the migrant elements between the subsurface area and the remainder of the alloy (i.e., the bulk of the alloy product) can cause a gradient in electrochemical activity. The gradient in electrochemical activity can lead to a surface that is more anodically active and prone to being corroded due to galvanic coupling between the subsurface and the bulk portion of the alloy product.

Figure 2:
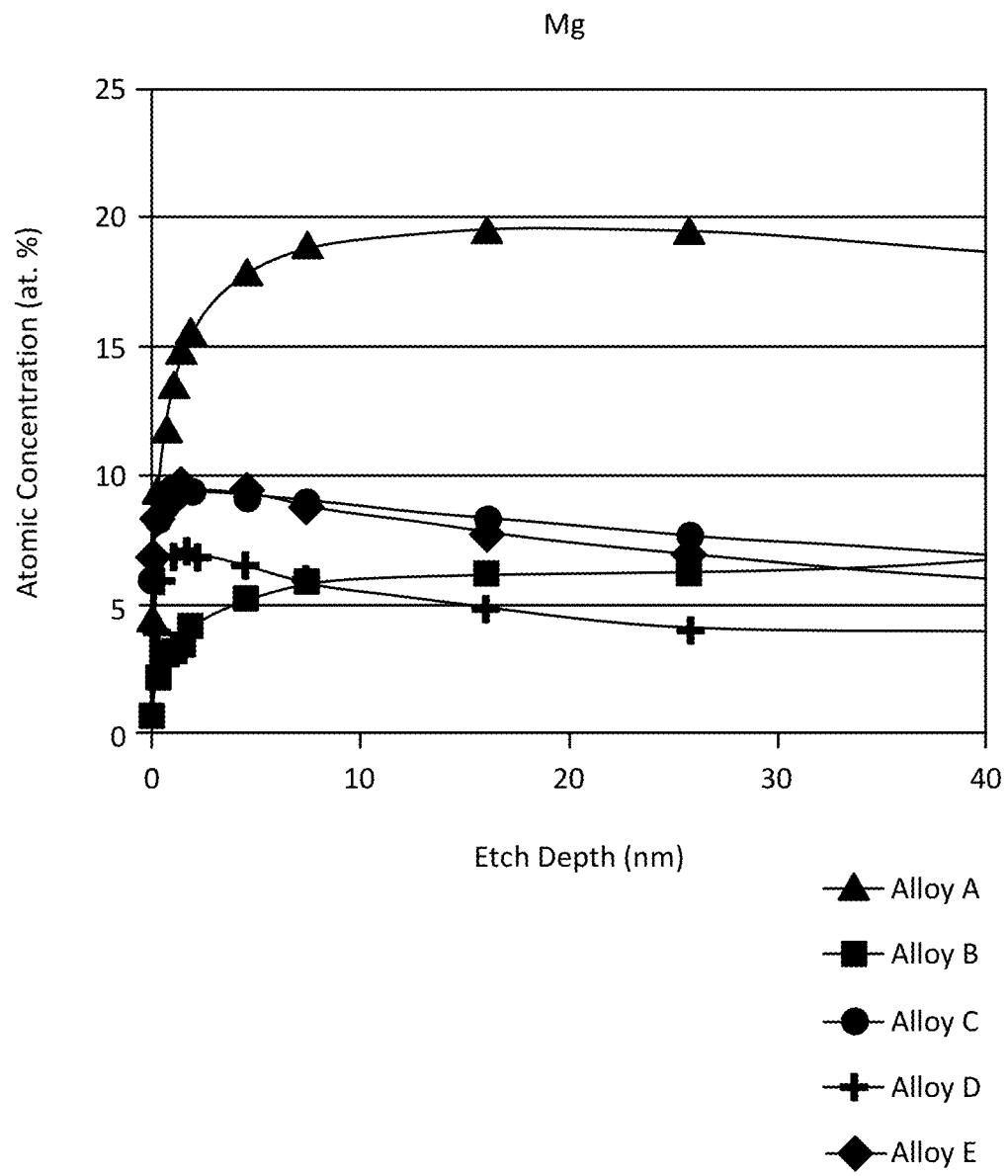
FIG. 2 is a graph showing the Mg content in 5xxx and 6xxx series aluminum alloy products by X-ray photoelectron spectroscopy.
Figure 3:
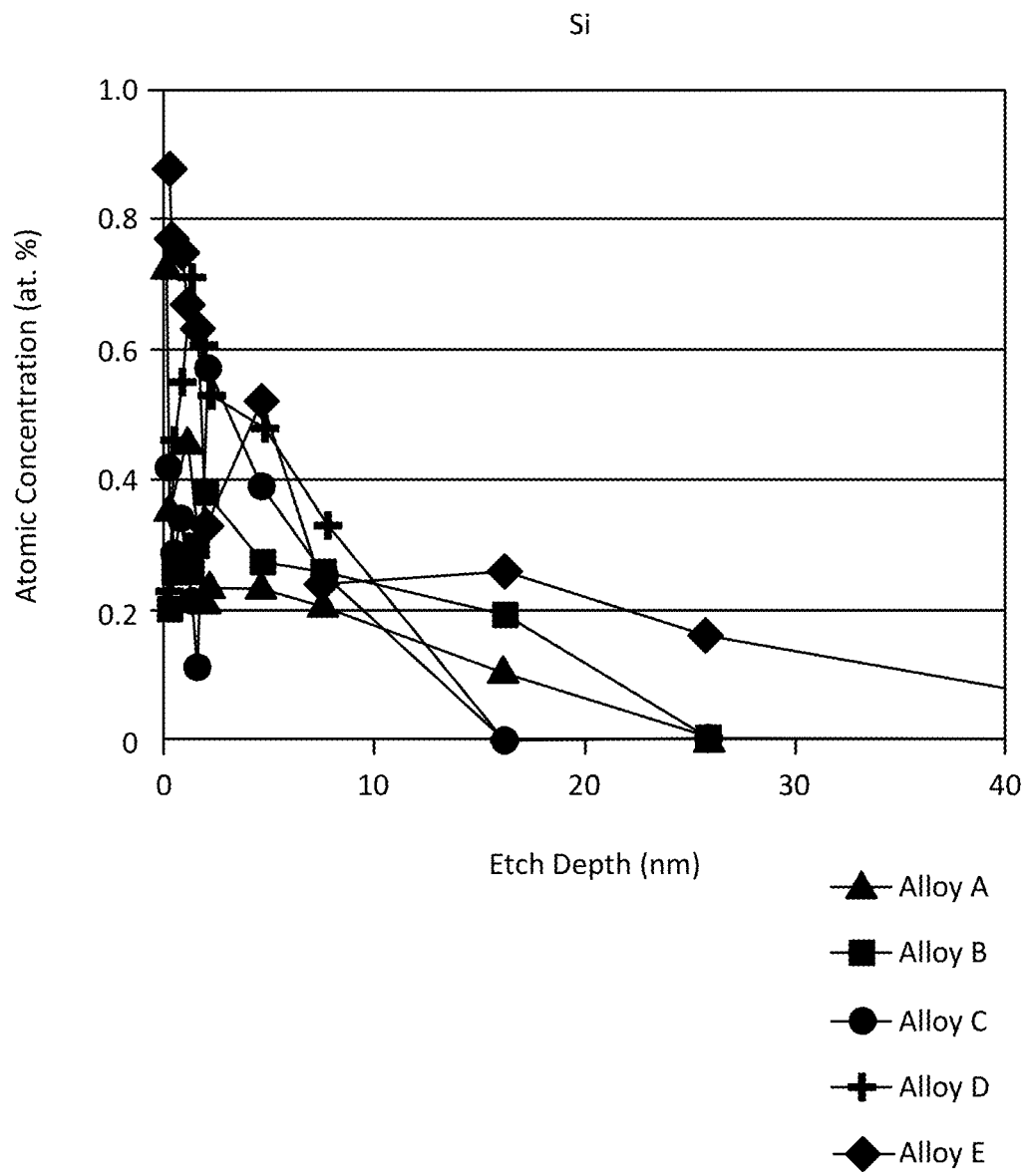
FIG. 3 is a graph showing the Si content in 5xxx and 6xxx series aluminum alloy products by X-ray photoelectron spectroscopy.

FIG. 1 is an illustrative representation of an aluminum alloy product 100 comprising an aluminum matrix 110 that is enriched with Mg 120 and Si 130. As shown in FIG. 1, Mg 120 and Si 130 can migrate to an alloy surface during thermal treatments, thus providing undesired surface characteristics. A difference in the atomic concentration of the migrant element between the alloy subsurface and the bulk (remainder) of the alloy can cause a gradient in electrochemical activity as seen in the open circuit potential (OCP) profile 150 in FIG. 1. FIGS. 2 and 3 demonstrate the elemental distribution of Mg and Si, respectively, in 5xxx series (Alloys A and B) and 6xxx series (Alloys C, D, and E) alloy products. The 5xxx series alloys (Alloys A and B) demonstrate less enrichment of Mg and Si near the surface of the alloy product, whereas the 6xxx series alloys (Alloys C, D, and E) demonstrate more enrichment of Mg and Si near the surface as compared to the amount in the remaining portion of the alloy product. Surprisingly, controlling migrant element distribution within the subsurface can reverse the effects shown in FIGS. 1-3 and provide desirable surface properties, without the need to alter or otherwise adjust the concentration of the elements used to prepare the aluminum alloy product. Such aluminum alloy products containing desirable surface properties, due to a suitable distribution of elements within the subsurface, are described below.

As used herein, the term "subsurface" refers to the portion of the alloy product that extends from the exterior surface of the alloy product into an interior of the alloy product to a depth of up to about 5 µm. Optionally, the subsurface refers to the portion of the alloy that extends into the interior of the alloy product to a depth of about 0.01 µm, about 0.05 µm, about 0.1 µm, about 0.15 µm, about 0.2 µm, about 0.25 µm, about 0.3 µm, about 0.35 µm, about 0.4 µm, about 0.45 µm, about 0.5 µm, about 0.55 µm, about 0.6 µm, about 0.65 µm, about 0.7 µm, about 0.75 µm, about 0.8 µm, about 0.85 µm, about 0.9 µm, about 0.95 µm, about 1.0 µm, about 1.5 µm, about 2.0 µm, about 2.5 µm, about 3.0 µm, about 3.5 µm, about 4.0 µm, about 4.5 µm, or about 5.0 µm, or anywhere in between. In some examples, the subsurface extends from the surface to a depth of about 2.0 µm within the interior of the alloy product. The portion of the aluminum alloy product excluding the subsurface portion (e.g., the remainder of the alloy product) is referred to herein as the bulk of the alloy product.

The term "migrant element," as used herein, refers to an element that can diffuse from a first position in the alloy product to a second position in the alloy product, as a result of, for example, one or more of the production and processing steps of the alloy product as further described below. Exemplary migrant elements include, for example, magnesium (Mg), silicon (Si), copper (Cu), manganese (Mn), zinc (Zn), chromium (Cr), and iron (Fe). Optionally, the migrant element is in the form of a compound or phase. For example, Mg can be present as $Mg_2Si$ or MgO. Mn and Fe can be present, for example, as Al(FeMn) or Al(Fe,Mn)Si.

In some examples, a migrant element as described herein can diffuse throughout the alloy product such that the concentration of the element is distributed throughout the full thickness of the alloy product (i.e., within the subsurface and the bulk portions). For example, the alloy product can include a concentration of Mg and Si that is distributed throughout the alloy product and not concentrated within the subsurface. Such alloy products display exceptional bond durability and corrosion resistance properties.

In some examples, a migrant element as described herein can diffuse toward the subsurface portion of the alloy product such that an enrichment of the migrant element is provided near the surface of the alloy product. For example, the alloy product can include a concentration of Zn, Cu, Mn, Cr, and/or Fe that is localized within the subsurface portion of the alloy product. Such alloy products display exceptional adhesive performance and can behave as a pretreatment. In addition, alloy products including Cr enrichment within the subsurface can control the Fe—Si particle distribution and thus enhance corrosion resistance.

In either case of a migrant element that is distributed throughout the full thickness of the alloy product or that is localized within the subsurface portion of the alloy product, the migrant element can be homogeneously populated or variably populated within the full thickness or subsurface of the alloy product. As used herein, "homogeneously populated" as related to the migrant elements means that the particular migrant element is evenly distributed within the full thickness or subsurface of the alloy product. In these cases, the concentration of the particular migrant element per region (i.e., within a region of the subsurface or within a region of the full thickness of the alloy product) is relatively constant across regions, on average. As used herein, "relatively constant" as related to migrant element distribution means that the concentration of the element in a first region of the subsurface or full thickness of the alloy product can differ from the concentration of the element in a second region of the subsurface or full thickness of the alloy product up to about 20% (e.g., by up to about 15%, by up to about 10%, by up to about 5%, or by about up to 1%).

In other cases, the concentration of the particular migrant element in a region is variably populated within the full thickness or subsurface of the alloy product. As used herein, "variably populated" as related to migrant element distribution means that the particular migrant element is not evenly distributed within the full thickness or subsurface of the alloy product. For example, a higher concentration of the migrant element can be localized in a first portion of the subsurface (or in a first portion of the full thickness of the alloy product) as compared to the concentration of the same migrant element in a second portion of the subsurface (or in a second portion of the full thickness of the alloy product).

In some examples, the migrant element distribution within the alloy product can be characterized by an enrichment ratio. The enrichment ratio is a comparison of the migrant element concentration in the subsurface to the migrant element concentration in the bulk of the alloy product. In some examples, the enrichment ratio can be calculated by measuring a peak atomic concentration of a migrant element at a depth within the subsurface and at a depth within the thickness of the alloy and outside of the subsurface (i.e., within the bulk of the alloy). The enrichment ratio can be quantified by the following equation:

$$\frac{(\text{atomic concentration})_{subsurface\ peak} - (\text{atomic concentration})_{bulk}}{(\text{atomic concentration})_{bulk}}$$

For example, the atomic concentration can be measured at 2 nm, which represents a depth within the subsurface of a particular alloy product in which the peak atomic concentration can be found, and at 40 nm, which represents a depth within the bulk portion of a particular alloy product. The enrichment ratio can be provided, for example, using the following equation:

$$\frac{(\text{atomic concentration})_{2\ nm} - (\text{atomic concentration})_{40\ nm}}{(\text{atomic concentration})_{40\ nm}}$$

wherein (atomic concentration)$_{2nm}$ represents the concentration of the migrant element at 2 nm and (atomic concentration)$_{40nm}$ represents the concentration of the migrant element at 40 nm. The atomic concentrations can be measured using techniques as known to those of ordinary skill in the art, including x-ray photoelectron spectroscopy (XPS).

A low enrichment ratio for a particular element indicates that the concentration of the migrant element is distributed throughout the alloy product and is not localized primarily within the subsurface. Suitable enrichment ratios that can be considered as low enrichment ratios include, for example, about 4.0 or lower (e.g., from about 1.0 to about 4.0). For example, the enrichment ratio can be approximately 4.0 or lower, 3.9 or lower, 3.8 or lower, 3.7 or lower, 3.6 or lower, 3.5 or lower, 3.4 or lower, 3.3 or lower, 3.2 or lower, 3.1 or lower, 3.0 or lower, 2.9 or lower, 2.8 or lower, 2.7 or lower, 2.6 or lower, 2.5 or lower, 2.4 or lower, 2.3 or lower, 2.2 or lower, 2.1 or lower, 2.0 or lower, 1.9 or lower, 1.8 or lower, 1.7 or lower, 1.6 or lower, 1.5 or lower, 1.4 or lower, 1.3 or lower, 1.2 or lower, 1.1 or lower, or 1.0.

A high enrichment ratio for a particular element indicates that a high concentration of the migrant element is localized within the subsurface of the alloy product. Suitable enrichment ratios that can be considered as high enrichment ratios include, for example, about 4.1 or greater. For example, the enrichment ratio can be approximately 4.1 or greater, 4.2 or greater, 4.3 or greater, 4.4 or greater, 4.5 or greater, 4.6 or greater, 4.7 or greater, 4.8 or greater, 4.9 or greater, 5.0 or greater, 5.1 or greater, 5.2 or greater, 5.3 or greater, 5.4 or greater, 5.5 or greater, 5.6 or greater, 5.7 or greater, 5.8 or greater, 5.9 or greater, 6.0 or greater, 6.1 or greater, 6.2 or greater, 6.3 or greater, 6.4 or greater, 6.5 or greater, 6.6 or greater, 6.7 or greater, 6.8 or greater, 6.9 or greater, 7.0 or greater, 7.1 or greater, 7.2 or greater, 7.3 or greater, 7.4 or greater, 7.5 or greater, 7.6 or greater, 7.7 or greater, 7.8 or greater, 7.9 or greater, or 8.0 or greater.

In some cases, it is desirable to have an aluminum alloy product having a high enrichment ratio for one or more migrant elements and a low enrichment ratio (e.g., a depletion) for other migrant elements. For example, an aluminum alloy product as described herein can have low enrichment ratios for Mg, Si, and/or Cu. In some examples, the aluminum alloy product as described herein can have high enrichment ratios for Cr, Mn, and/or Fe.

In some cases, elemental enrichment in a certain area can be accompanied by an elemental depletion in another area of the aluminum alloy product. In some non-limiting examples, Mg, Si, and/or Cu enrichment can occur in areas of the subsurface of the aluminum alloy product in which Fe and Mn can be depleted. In some other examples, the aluminum alloy product can have a subsurface characterized by Si, Mn, and/or Fe depletion along with Cu enrichment.

In some aspects, migrant element particle size and morphology can affect surface properties of the aluminum alloy product. For example, small Cu dispersoids and/or particles (e.g., less than about 10 nm in diameter) within the subsurface of the aluminum alloy product can provide good bond durability with no significant effect on corrosion susceptibility. Optionally, the Cu dispersoids and/or particles are about 9 nm or less in diameter, about 8 nm or less in diameter, about 7 nm or less in diameter, about 6 nm or less in diameter, about 5 nm or less in diameter, about 4 nm or less in diameter, about 3 nm or less in diameter, about 2 nm or less in diameter, or about 1 nm or less in diameter.

The aluminum alloy product can have any suitable composition. In non-limiting examples, the aluminum alloy products can include a 2xxx series aluminum alloy, a 5xxx series aluminum alloy, a 6xxx series aluminum alloy, or a 7xxx series aluminum alloy.

Non-limiting exemplary AA2xxx series alloys for use as the aluminum alloy product can include AA2001, A2002, AA2004, AA2005, AA2006, AA2007, AA2007A, AA2007B, AA2008, AA2009, AA2010, AA2011, AA2011A, AA2111, AA2111A, AA2111B, AA2012, AA2013, AA2014, AA2014A, AA2214, AA2015, AA2016, AA2017, AA2017A, AA2117, AA2018, AA2218, AA2618, AA2618A, AA2219, AA2319, AA2419, AA2519, AA2021, AA2022, AA2023, AA2024, AA2024A, AA2124, AA2224, AA2224A, AA2324, AA2424, AA2524, AA2624, AA2724, AA2824, AA2025, AA2026, AA2027, AA2028, AA2028A, AA2028B, AA2028C, AA2029, AA2030, AA2031, AA2032, AA2034, AA2036, AA2037, AA2038, AA2039, AA2139, AA2040, AA2041, AA2044, AA2045, AA2050, AA2055, AA2056, AA2060, AA2065, AA2070, AA2076, AA2090, AA2091, AA2094, AA2095, AA2195, AA2295, AA2196, AA2296, AA2097, AA2197, AA2297, AA2397, AA2098, AA2198, AA2099, or AA2199.

Non-limiting exemplary AA5xxx series alloys for use as the aluminum alloy product can include AA5182, AA5183, AA5005, AA5005A, AA5205, AA5305, AA5505, AA5605, AA5006, AA5106, AA5010, AA5110, AA5110A, AA5210, AA5310, AA5016, AA5017, AA5018, AA5018A, AA5019, AA5019A, AA5119, AA5119A, AA5021, AA5022, AA5023, AA5024, AA5026, AA5027, AA5028, AA5040, AA5140, AA5041, AA5042, AA5043, AA5049, AA5149, AA5249, AA5349, AA5449, AA5449A, AA5050, AA5050A, AA5050C, AA5150, AA5051, AA5051A, AA5151, AA5251, AA5251A, AA5351, AA5451, AA5052, AA5252, AA5352, AA5154, AA5154A, AA5154B, AA5154C, AA5254, AA5354, AA5454, AA5554, AA5654, AA5654A, AA5754, AA5854, AA5954, AA5056, AA5356, AA5356A, AA5456, AA5456A, AA5456B, AA5556, AA5556A, AA5556B, AA5556C, AA5257, AA5457, AA5557, AA5657, AA5058, AA5059, AA5070, AA5180, AA5180A, AA5082, AA5182, AA5083, AA5183, AA5183A, AA5283, AA5283A, AA5283B, AA5383, AA5483, AA5086, AA5186, AA5087, AA5187, and AA5088.

Non-limiting exemplary AA6xxx series alloys for use as the aluminum alloy product can include AA6101, AA6101A, AA6101B, AA6201, AA6201A, AA6401, AA6501, AA6002, AA6003, AA6103, AA6005, AA6005A, AA6005B, AA6005C, AA6105, AA6205, AA6305, AA6006, AA6106, AA6206, AA6306, AA6008, AA6009, AA6010, AA6110, AA6110A, AA6011, AA6111, AA6012, AA6012A, AA6013, AA6113, AA6014, AA6015, AA6016, AA6016A, AA6116, AA6018, AA6019, AA6020, AA6021, AA6022, AA6023, AA6024, AA6025, AA6026, AA6027, AA6028, AA6031, AA6032, AA6033, AA6040, AA6041, AA6042, AA6043, AA6151, AA6351, AA6351A, AA6451, AA6951, AA6053, AA6055, AA6056, AA6156, AA6060, AA6160, AA6260, AA6360, AA6460, AA6460B, AA6560, AA6660, AA6061, AA6061A, AA6261, AA6361, AA6162, AA6262, AA6262A, AA6063, AA6063A, AA6463, AA6463A, AA6763, A6963, AA6064, AA6064A, AA6065, AA6066, AA6068, AA6069, AA6070, AA6081, AA6181, AA6181A, AA6082, AA6082A, AA6182, AA6091, and AA6092.

Non-limiting exemplary AA7xxx series alloys for use as the aluminum alloy product can include AA7003, AA7004, AA7204, AA7005, AA7108, AA7108A, AA7009, AA7010, AA7012, AA7014, AA7015, AA7016, AA7116, AA7017, AA7018, AA7019, AA7019A, AA7020, AA7021, AA7022, AA7122, AA7023, AA7024, AA7025, AA7026, AA7028, AA7029, AA7129, AA7229, AA7030, AA7031, AA7032, AA7033, AA7034, AA7035, AA7035A, AA7036, AA7136, AA7037, AA7039, AA7040, AA7140, AA7041, AA7042, AA7046, AA7046A, AA7047, AA7049, AA7049A, AA7149, AA7249, AA7349, AA7449, AA7050, AA7050A, AA7150, AA7055, AA7155, AA7255, AA7056, AA7060, AA7064, AA7065, AA7068, AA7168, AA7072, AA7075, AA7175, AA7475, AA7076, AA7178, AA7278, AA7278A, AA7081, AA7181, AA7085, AA7185, AA7090, AA7093, AA7095, AA7099, and AA7199.

The aluminum alloy product can have any suitable gauge. For example, the aluminum alloy product can be an aluminum alloy plate, an aluminum alloy shate, or an aluminum alloy sheet having a gauge between about 0.5 mm and about 50 mm (e.g., about 0.5 mm, about 1 mm, about 2 mm, about 3 mm, about 4 mm, about 5 mm, about 6 mm, about 7 mm, about 8 mm, about 9 mm, about 10 mm, about 15 mm, about 20 mm, about 25 mm, about 30 mm, about 35 mm, about 40 mm, about 45 mm, about 50 mm, or anywhere in between).

Methods of Preparing the Alloy Products

In certain aspects, the disclosed alloy products can be prepared using a method as described herein. Without intending to limit the invention, aluminum alloy properties are partially determined by the formation of microstructures during the preparation of the alloy. In certain aspects, the method of preparation for an alloy composition determines whether the alloy will have properties adequate for a desired application. As described below, certain processing steps and conditions, including the rolling (e.g., hot rolling and/or cold rolling), heat treating (e.g., homogenizing, solutionizing, and/or annealing), and pretreatment steps and conditions, provide the alloy products described above having the desirable bond durability and corrosion resistance properties. The methods of producing aluminum alloy products as described herein can include the steps of casting a molten aluminum alloy to form a cast aluminum alloy article, and processing the aluminum alloy article by one or more steps, including, for example, quenching, rolling, heat treating, and/or pretreating to form an aluminum alloy product.

Direct Chill Casting and Processing

In some cases, the aluminum alloy products described herein can be cast using a direct chill (DC) casting process to form a cast product such as an ingot. The resulting ingots can then be scalped. The cast product can then be subjected to further processing steps. In one non-limiting example, the processing method includes homogenizing the aluminum alloy ingot and hot rolling the aluminum alloy ingot to form an aluminum alloy hot band. The aluminum alloy hot band can then be subjected to cold rolling, solution heat treatment, and optionally a pretreatment step.

Homogenization

The homogenization step can include heating a cast product prepared from an alloy composition as described herein to attain a peak metal temperature (PMT) of about, or at least about, 450° C. (e.g., at least about 460° C., at least about 470° C., at least about 480° C., at least about 490° C., at least about 500° C., at least about 510° C., at least about 520° C., at least about 530° C., at least about 540° C., at least about 550° C., at least about 560° C., at least about 570° C., or at least about 580° C.). For example, the ingot can be heated to a temperature of from about 450° C. to about 580° C., from about 460° C. to about 575° C., from about 470° C. to about 570° C., from about 480° C. to about 565° C., from about 490° C. to about 555° C., or from about 500° C. to about 550° C. In some cases, the heating rate to the PMT can be about 100° C./hour or less, about 75° C./hour or less, about 50° C./hour or less, about 40° C./hour or less, about 30° C./hour or less, about 25° C./hour or less, about 20° C./hour or less, or about 15° C./hour or less. In other cases, the heating rate to the PMT can be from about 10° C./min to about 100° C./min (e.g., about 10° C./min to about 90° C./min, about 10° C./min to about 70° C./min, about 10° C./min to about 60° C./min, from about 20° C./min to about 90° C./min, from about 30° C./min to about 80° C./min, from about 40° C./min to about 70° C./min, or from about 50° C./min to about 60° C./min).

The ingot is then allowed to soak (i.e., held at the indicated temperature) for a period of time. According to one non-limiting example, the ingot is allowed to soak for up to about 6 hours (e.g., from about 30 minutes to about 6 hours, inclusively). For example, the ingot can be soaked at a temperature of at least about 500° C. for about 30 minutes, about 1 hour, about 2 hours, about 3 hours, about 4 hours, about 5 hours, or about 6 hours, or anywhere in between.

Hot Rolling

Following the homogenization step, a hot rolling step can be performed to form a hot band. In certain cases, the ingots are laid down and hot-rolled. The hot rolling temperature can be from about 200° C. to about 550° C. (e.g., from about 250° C. to about 500° C., from about 300° C. to about 400° C.). For example, the hot rolling temperature can be about 200° C., about 205° C., about 210° C., about 215° C., about 220° C., about 225° C., about 230° C., about 235° C., about 240° C., about 245° C., about 250° C., about 255° C., about 260° C., about 265° C., about 270° C., about 275° C., about 280° C., about 285° C., about 290° C., about 295° C., about 300° C., about 305° C., about 310° C., about 315° C., about 320° C., about 325° C., about 330° C., about 335° C., about 340° C., about 345° C., about 350° C., about 355° C., about 360° C., about 365° C., about 370° C., about 375° C., about 380° C., about 385° C., about 390° C., about 395° C., about 400° C., about 405° C., about 410° C., about 415° C., about 420° C., about 425° C., about 430° C., about 435° C., about 440° C., about 445° C., about 450° C., about 455° C., about 460° C., about 465° C., about 470° C., about 475° C., about 480° C., about 485° C., about 490° C., about 495° C., about 500° C., about 505° C., about 510° C., about 515° C., about 520° C., about 525° C., about 530° C., about 535° C., about 540° C., about 545° C., or about 550° C.

In some non-limiting examples, a hot roll exit temperature can be from about 200° C. to about 450° C. In some examples, the hot roll exit temperature should not exceed about 360° C. For example, the hot roll exit temperature can range from about 250° C. to about 360° C. (e.g., from about 300° C. to about 350° C.). In these examples, the hot roll exit temperature can be about 250° C., about 255° C., about 260° C., about 265° C., about 270° C., about 275° C., about 280° C., about 285° C., about 290° C., about 295° C., about 300° C., about 305° C., about 310° C., about 315° C., about 320° C., about 325° C., about 330° C., about 335° C., about 340° C., about 345° C., about 350° C., about 355° C., or about 360° C.

In certain cases, the cast article can be hot rolled to an about 4 mm to about 15 mm thick gauge (e.g., from about 5 mm to about 12 mm thick gauge), which is referred to as a shate. For example, the ingot can be hot rolled to an about 4 mm thick gauge, about 5 mm thick gauge, about 6 mm thick gauge, about 7 mm thick gauge, about 8 mm thick gauge, about 9 mm thick gauge, about 10 mm thick gauge, about 11 mm thick gauge, about 12 mm thick gauge, about 13 mm thick gauge, about 14 mm thick gauge, or about 15 mm thick gauge. In certain cases, the ingot can be hot rolled to a gauge greater than 15 mm thick (i.e., a plate). In other cases, the ingot can be hot rolled to a gauge less than 4 mm (i.e., a sheet).

Cold Rolling

A cold rolling step can be performed following the hot rolling step. In certain aspects, the hot band from the hot rolling step can be cold rolled to a sheet. The hot band temperature can be reduced to a temperature ranging from about 20° C. to about 200° C. (e.g., from about 120° C. to about 200° C.). The cold rolling step can be performed for a period of time to result in a desired final gauge thickness. Optionally, the cold rolling step can be performed for a period of up to about 1 hour (e.g., from about 10 minutes to about 30 minutes). For example, the cold rolling step can be performed for a period of about 10 minutes, about 20 minutes, about 30 minutes, about 40 minutes, about 50 minutes, or about 1 hour.

Optionally, the desired final gauge thickness is below approximately 4.0 mm. In certain aspects, the rolled product is cold rolled to a thickness of about 0.4 mm to about 1.0 mm, about 1.0 mm to about 3.0 mm, or about 3.0 mm to less than about 4.0 mm. In certain aspects, the alloy is cold rolled to about 3.5 mm or less, about 3 mm or less, about 2.5 mm or less, about 2 mm or less, about 1.5 mm or less, about 1 mm or less, about 0.5 mm or less, about 0.4 mm or less, about 0.3 mm or less, about 0.2 mm or less, or about 0.1 mm or less, or anywhere in between.

Solutionizing

The cold rolled coil can then be solutionized in a solution heat treatment step. The solutionizing can include heating the final gauge aluminum alloy from room temperature to a temperature of from about 400° C. to about 580° C. (e.g., from about 450° C. to about 575° C., from about 520° C. to about 580° C., from about 530° C. to about 570° C., from about 545° C. to about 575° C., from about 550° C. to about 570° C., from about 555° C. to about 565° C., from about 540° C. to about 560° C., from about 560° C. to about 580° C., or from about 550° C. to about 575° C.). For example, the solutionizing step can be performed by heating the final gauge aluminum alloy to about 400° C., about 405° C., about 410° C., about 415° C., about 420° C., about 425° C., about 430° C., about 435° C., about 440° C., about 445° C., about 450° C., about 455° C., about 460° C., about 465° C., about 470° C., about 475° C., about 480° C., about 485° C., about 490° C., about 495° C., about 500° C., about 505° C., about 510° C., about 515° C., about 520° C., about 525° C., about 530° C., about 535° C., about 540° C., about 545° C., about 550° C., about 555° C., about 560° C., about 565° C., about 570° C., about 575° C., or about 580° C.

In some examples, the solutionizing is performed at a temperature of 560° C. or below (e.g., from about 520° C. to about 560° C.). For example, the solutionizing can be performed at a temperature of about 520° C., about 525° C., about 530° C., about 535° C., about 540° C., about 545° C., about 550° C., about 555° C., or about 560° C. Solutionizing at a temperature of 560° C. or below can result in an alloy product having a desired particle size and particle size distribution of migrant element particles within the alloy product subsurface and the alloy product bulk, and having a low enrichment ratio for certain migrant elements (e.g., Mg and Si).

The cold rolled coil can soak at the solutionizing temperature for a period of time. In certain aspects, the cold rolled coil is allowed to soak for up to approximately 2 hours (e.g., from about 1 second to about 120 minutes, inclusively). For example, the cold rolled coil can be soaked at the solutionizing temperature of from about 525° C. to about 590° C. for 1 second, 5 seconds, 10 seconds, 15 seconds, 20 seconds, 25 seconds, 30 seconds, 35 seconds, 40 seconds, 45 seconds, 50 seconds, 55 seconds, 60 seconds, 65 seconds, 70 seconds, 75 seconds, 80 seconds, 85 seconds, 90 seconds, 95 seconds, 100 seconds, 105 seconds, 110 seconds, 115 seconds, 120 seconds, 125 seconds, 130 seconds, 135 seconds, 140 seconds, 145 seconds, 150 seconds, 5 minutes, 10 minutes, 15 minutes, 20 minutes, 25 minutes, 30 minutes, 35 minutes, 40 minutes, 45 minutes, 50 minutes, 55 minutes, 60 minutes, 65 minutes, 70 minutes, 75 minutes, 80 minutes, 85 minutes, 90 minutes, 95 minutes, 100 minutes, 105 minutes, 110 minutes, 115 minutes, or 120 minutes, or anywhere in between.

In some examples, a shorter soaking duration is desirable. For example, the cold rolled coil can be allowed to soak for about 120 seconds or less (e.g., 115 seconds or less, 110 seconds or less, 105 seconds or less, 100 seconds or less, 95 seconds or less, 90 seconds or less, 85 seconds or less, 80 seconds or less, 75 seconds or less, 70 seconds or less, 65 seconds or less, 60 seconds or less, 55 seconds or less, 50 seconds or less, 45 seconds or less, 40 seconds or less, 35 seconds or less, 30 seconds or less, 25 seconds or less, 20 seconds or less, 15 seconds or less, 10 seconds or less, 5 seconds or less, or 1 second).

Quenching

In certain aspects, the aluminum alloy product can then be cooled to a temperature of about 35° C. at a quench speed that can vary between about 50° C./s to 400° C./s in a quenching step that is based on the selected gauge. For example, the quench rate can be from about 50° C./s to about 375° C./s, from about 60° C./s to about 375° C./s, from about 70° C./s to about 350° C./s, from about 80° C./s to about 325° C./s, from about 90° C./s to about 300° C./s, from about 100° C./s to about 275° C./s, from about 125° C./s to about 250° C./s, from about 150° C./s to about 225° C./s, or from about 175° C./s to about 200° C./s.

In the quenching step, the aluminum alloy product is quenched with a liquid (e.g., water) and/or gas or another selected quench medium. In certain aspects, the aluminum alloy product can be air quenched. The aluminum alloy product can optionally undergo a pretreatment process, as further described below.

Continuous Casting and Processing

The aluminum alloy products described herein can be cast using a continuous casting (CC) process to form a cast aluminum alloy article. The CC process may include, but is not limited to, the use of twin belt casters, twin roll casters, or block casters. In some examples, the casting process is performed by a CC process to form a cast product such as a billet, slab, shate, strip, or the like. The CC method described herein can include extracting heat from the molten alloy by cooling the molten alloy with water, controlling a feed rate of the molten alloy, or controlling a casting speed of the molten alloy, as further described below. Extracting heat from the molten alloy can control diffusion of migrant elements within the molten alloy.

In some non-limiting examples, the continuous casting method can include extracting heat in a controlled manner to control diffusion of migrant elements within the metal article. In some aspects, solidifying a molten alloy without controlled heat extraction can allow undesired diffusion of the migrant elements within the molten alloy. In some cases, the migrant elements can diffuse to a surface of the molten alloy during solidifying, providing a cast metal article having undesired surface properties. In some non-limiting examples, controlling a rate of solidification (e.g., extracting heat in a controlled manner) can control diffusion of the migrant elements, thus providing a cast metal article with desired surface properties. In some aspects, controlling the diffusion of the migrant elements can provide selective enrichment of a cast metal article surface, thus providing a cast metal article having tailored surface properties.

Extracting heat from the molten alloy can be performed by any suitable method, including cooling with water, cooling with air, controlling a feed rate of the molten alloy into the casting cavity, or controlling a speed of a pair of moving opposed casting surfaces. Cooling with water can be performed by employing either one or a plurality of nozzles to deliver water directly onto the molten alloy. Likewise, cooling with air can be performed by employing either one or a plurality of nozzles to deliver forced air directly onto the molten alloy. In some examples, controlling the feed rate of the molten alloy into the casting cavity can control the diffusion of the migrant elements. A slower feed rate can allow the molten alloy to solidify closer to the molten metal injector, thus suppressing any undesired diffusion of the migrant elements. Likewise, a faster feed rate can allow the molten alloy to solidify farther from the molten metal injector, thus allowing undesired diffusion of the migrant elements. In some examples, controlling the speed of the pair of moving opposed casting surfaces can control the diffusion of the migrant elements. A slower speed of the pair of moving opposed casting surfaces can allow the molten alloy to solidify closer to the molten metal injector, thus suppressing any undesired diffusion of the migrant elements. Likewise, a faster speed of the pair of moving opposed casting surfaces can allow the molten alloy to solidify farther from the molten metal injector, thus allowing undesired diffusion of the migrant elements.

In some non-limiting examples, controlling the diffusion rate of the migrant elements can provide selective diffusion of the migrant elements. For example, heat can be extracted from the molten metal at a rate that can promote diffusion of a first migrant element and simultaneously suppress diffusion of a second migrant element. Thus, the metal article surface can be selectively enriched by a select migrant element during solidification of the molten alloy to provide the metal article.

The cast aluminum alloy article can then be subjected to further processing steps to form the aluminum alloy product. The processing steps can include, for example, quenching, hot rolling, cold rolling, and/or annealing steps.

Quenching

After the casting step, the cast aluminum alloy article can be quenched. In the quenching step, the cast aluminum alloy article can be cooled to a temperature at or below about 300° C. For example, the cast aluminum alloy article can be cooled to a temperature at or below about 290° C., at or below about 280° C., at or below about 270° C., at or below about 260° C., at or below about 250° C., at or below about 240° C., at or below about 230° C., at or below about 220° C., at or below about 210° C., at or below about 200° C., at or below about 190° C., at or below about 180° C., at or below about 170° C., at or below about 160° C., at or below about 150° C., at or below about 140° C., at or below about 130° C., at or below about 120° C., at or below about 110° C., at or below about 100° C., at or below about 90° C., at or below about 80° C., at or below about 70° C., at or below about 60° C., at or below about 50° C., or at or below about 40° C. (e.g., about 25° C.). The quenching step can be performed using a liquid (e.g., water), a gas (e.g., air), or another selected quench medium.

Hot Rolling and Forming a Hot Band

The method also includes a step of hot rolling the cast aluminum alloy article to produce a rolled aluminum alloy article (e.g., a hot band). The step of hot rolling the cast aluminum alloy article can include reducing the thickness of the cast aluminum alloy article by at least about 30% and up to about 80% (e.g., by about 30%, by about 35%, by about 40%, by about 45%, by about 50%, by about 55%, by about 60%, by about 65%, by about 70%, or by about 75%). Hot rolling can be performed at a temperature of from about 400° C. to about 600° C. (e.g., from about 425° C. to about 575° C. or from about 450° C. to about 550° C.). For example, the hot rolling step can be performed at a temperature of about 400° C., about 410° C., about 420° C., about 430° C., about 440° C., about 450° C., about 460° C., about 470° C., about 480° C., about 490° C., about 500° C., about 510° C., about 520° C., about 530° C., about 540° C., about 550° C., about 560° C., about 570° C., about 580° C., about 590° C., about 600° C., or anywhere in between.

Cold Rolling and Annealing

A cold rolling step can then be performed using, for example, a single stand mill or a multi-stand mill. In some cases, the cold rolling step is a one-stage cold rolling process. In some cases, the cold rolling step is a two-stage cold rolling process.

In the one-stage cold rolling process, the coil or sheet temperature can be reduced to a temperature ranging from about 20° C. to about 150° C. (e.g., from about 120° C. to about 200° C.). In some cases, the coil or sheet is cold rolled with an entry temperature range of from about 20° C. to about 150° C. The entry temperature can be, for example, about 20° C., about 30° C., about 40° C., about 50° C., about 60° C., about 70° C., about 80° C., about 90° C., about 100° C., about 110° C., about 120° C., about 130° C., about 140° C., or about 150° C. In some cases, the cold roll exit temperature can range from about 80° C. to about 200° C. The cold roll exit temperature can be, for example, about 80° C., about 90° C., about 100° C., about 110° C., about 120° C., about 130° C., about 140° C., about 150° C., about 160° C., about 170° C., about 180° C., about 190° C., or about 200° C.

The cold rolling step can be performed for a period of time to result in a gauge of from about 0.2 mm to about 6 mm. For example, the resulting gauge can be from about 0.5 mm to about 5.5 mm or from about 0.8 mm to about 5.0 mm. Optionally, the cold rolling step can be performed for a period of up to about 1 hour (e.g., from about 10 minutes to about 30 minutes). For example, the cold rolling step can be performed for a period of about 10 minutes, about 20 minutes, about 30 minutes, about 40 minutes, about 50 minutes, or about 1 hour.

As discussed above, the cold rolling step can be a two-stage cold rolling process in which an intervening annealing step is performed during the cold rolling. In the two-stage cold rolling process, the coil or sheet temperature can be reduced to a temperature ranging from about 20° C. to about 150° C. (e.g., from about 120° C. to about 200° C.). In some cases, the coil or sheet is cold rolled with an entry temperature range of from about 20° C. to about 150° C. The entry temperature can be, for example, about 20° C., about 30° C., about 40° C., about 50° C., about 60° C., about 70° C., about 80° C., about 90° C., about 100° C., about 110° C., about 120° C., about 130° C., about 140° C., or about 150° C. In some cases, the cold roll exit temperature can range from about 80° C. to about 200° C. The exit temperature can be, for example, about 80° C., about 90° C., about 100° C., about 110° C., about 120° C., about 130° C., about 140° C., about 150° C., about 160° C., about 170° C., about 180° C., about 190° C., or about 200° C.

The first stage of the cold rolling step can be performed for a period of time to result in a gauge of from about 1.2 mm to about 6 mm. For example, the resulting gauge can be from about 1.25 mm to about 5.5 mm, from about 1.3 mm to about 4 mm, from about 1.4 mm to about 3.5 mm, or from about 1.5 mm to about 3 mm. Optionally, the cold rolling step can be performed for a period of up to about 1 hour (e.g., from about 10 minutes to about 30 minutes). For example, the cold rolling step can be performed for a period of about 10 minutes, about 20 minutes, about 30 minutes, about 40 minutes, about 50 minutes, or about 1 hour.

As the next step of the two-stage cold rolling process, an annealing process referred to herein as an intermediate annealing step can be performed. In the intermediate annealing step, the cold rolled gauge can be held at a temperature ranging from about 250° C. to about 450° C. (e.g., from about 275° C. to about 400° C. or from about 300° C. to about 375° C.), with a soak time of up to about 4 hours. For example, the soak time can range from about 10 minutes to about 4 hours (e.g., about 10 minutes, about 30 minutes, about 1 hour, about 2 hours, about 3 hours, or about 4 hours). Optionally, the intermediate annealing step can result in an alloy having grains that are round.

Following the intermediate annealing step, a second stage of the cold-rolling process can be performed. In some cases, the second stage of the cold-rolling process includes cold rolling using a single stand mill or a multi-stand mill with an entry temperature range of from about 20° C. to about 150° C. The entry temperature can be, for example, about 20° C., about 30° C., about 40° C., about 50° C., about 60° C., about 70° C., about 80° C., about 90° C., about 100° C., about 110° C., about 120° C., about 130° C., about 140° C., or about 150° C. In some cases, the cold roll exit temperature can range from about 80° C. to about 200° C. The exit temperature can be, for example, about 80° C., about 90° C., about 100° C., about 110° C., about 120° C., about 130° C., about 140° C., about 150° C., about 160° C., about 170° C., about 180° C., about 190° C., or about 200° C. to result in a gauge of about 3 mm or less (e.g., from about 0.2 mm to about 2 mm or from about 0.2 mm to about 1.4 mm). For example, the resulting gauge can be about 0.2 mm, about 0.3 mm, about 0.4 mm, about 0.5 mm, about 0.6 mm, about 0.7 mm, about 0.8 mm, about 0.9 mm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, about 2 mm, about 2.1 mm, about 2.2 mm, about 2.3 mm, about 2.4 mm, about 2.5 mm, about 2.6 mm, about 2.7 mm, about 2.8 mm, about 2.9 mm, or about 3 mm.

Solutionizing

The cold rolled coil can then be solutionized in a solution heat treatment step. The solutionizing can include heating the final gauge aluminum alloy from room temperature to a temperature of from about 520° C. to about 590° C. (e.g., from about 520° C. to about 580° C., from about 530° C. to about 570° C., from about 545° C. to about 575° C., from about 550° C. to about 570° C., from about 555° C. to about 565° C., from about 540° C. to about 560° C., from about 560° C. to about 580° C., or from about 550° C. to about 575° C.).

The cold rolled coil can soak at the solutionizing temperature for a period of time. In certain aspects, the cold rolled coil is allowed to soak for up to approximately 2 hours (e.g., from about 1 second to about 120 minutes, inclusively). For example, the cold rolled coil can be soaked at the solutionizing temperature of from about 525° C. to about 590° C. for 1 second, 5 seconds, 10 seconds, 15 seconds, 20 seconds, 25 seconds, 30 seconds, 35 seconds, 40 seconds, 45 seconds, 50 seconds, 55 seconds, 60 seconds, 65 seconds, 70 seconds, 75 seconds, 80 seconds, 85 seconds, 90 seconds, 95 seconds, 100 seconds, 105 seconds, 110 seconds, 115 seconds, 120 seconds, 125 seconds, 130 seconds, 135 seconds, 140 seconds, 145 seconds, 150 seconds, 5 minutes, 10 minutes, 15 minutes, 20 minutes, 25 minutes, 30 minutes, 35 minutes, 40 minutes, 45 minutes, 50 minutes, 55 minutes, 60 minutes, 65 minutes, 70 minutes, 75 minutes, 80 minutes, 85 minutes, 90 minutes, 95 minutes, 100 minutes, 105 minutes, 110 minutes, 115 minutes, or 120 minutes, or anywhere in between.

Quenching

In certain aspects, the aluminum alloy product can then be cooled to a temperature of about 35° C. at a quench speed that can vary between about 50° C./s to 400° C./s in a quenching step that is based on the selected gauge. For example, the quench rate can be from about 50° C./s to about 375° C./s, from about 60° C./s to about 375° C./s, from about 70° C./s to about 350° C./s, from about 80° C./s to about 325° C./s, from about 90° C./s to about 300° C./s, from about 100° C./s to about 275° C./s, from about 125° C./s to about 250° C./s, from about 150° C./s to about 225° C./s, or from about 175° C./s to about 200° C./s. The quenching step can be performed using a liquid (e.g., water), a gas (e.g., air), or another selected quench medium.

Pretreating

Optionally, the aluminum alloy products described herein and cast by DC casting or CC and subsequently processed can be pretreated.

Alkaline Cleaning

The pretreatment process described herein includes a step of applying a cleaner (also referred to herein as an entry cleaner or pre-cleaner) to one or more surfaces of the aluminum alloy product. The entry cleaner removes residual oils, or loosely adhering oxides, from the aluminum alloy product surface. Optionally, the entry cleaning can be performed using an alkaline solution having a pH of 7.5 or above. In some cases, the pH of the alkaline solution can be about 8, about 8.5, about 9, about 9.5, about 10, about 10.5, about 11, about 11.5, about 12, about 12.5, or about 13. The concentration of the alkaline agent in the alkaline solution can be from about 1% to about 5% (e.g., about 1%, about 2%, about 3%, about 4%, or about 5% based on the volume of the alkaline solution). Suitable alkaline agents include, for example, silicates and hydroxides (e.g., sodium hydroxide). The alkaline solution can further include one or more surfactants, including for example anionic and non-ionic surfactants.

Acid Etching and Rinsing

The pretreatment process described herein can also include a step of etching the surface of the aluminum alloy product. The surface of the aluminum alloy product can be etched using a chemical etch such as an acid etch (i.e., an etching procedure that includes an acid solution having a pH of less than 7), an alkaline etch (i.e., an etching procedure that includes a basic solution having a pH of greater than 7), or an etch under neutral conditions (i.e., an etching procedure that includes a neutral solution having a pH of 7). The chemical etch prepares the surface to accept the subsequent application of a pretreatment. Any loosely adhering oxides, such as Al oxides and Mg rich oxides, entrapped oils, or debris, can be adequately removed during this step. Exemplary chemicals for performing the acid etch include sulfuric acid, hydrofluoric acid, nitric acid, phosphoric acid, and combinations of these. Exemplary chemicals for performing the alkaline etch include sodium hydroxide and potassium hydroxide. After the acid etching step, the surface of the aluminum alloy product can be rinsed with an aqueous or organic solvent.

Applying a Pretreatment, Rinsing, and Drying

A pretreatment can then be applied to the surface of the aluminum alloy product. Optionally, the pretreatment can include an adhesion promoter, a corrosion inhibitor, a coupling agent, an antimicrobial agent, or a mixture thereof. After the application of the pretreatment, the surface of the aluminum alloy product optionally can be rinsed with a solvent (e.g., an aqueous or an organic solvent). The surface of the aluminum alloy product can be dried after the rinsing step.

Methods of Using

The aluminum alloy products and methods described herein can be used in automotive, electronics, and transportation applications, such as commercial vehicle, aircraft, or railway applications. For example, the aluminum alloy products can be used for chassis, cross-member, and intra-chassis components (encompassing, but not limited to, all components between the two C channels in a commercial vehicle chassis) to gain strength, serving as a full or partial replacement of high-strength steels. In certain examples, the aluminum alloy products can be used in the F, T4, T6, or T8x tempers.

In certain aspects, the aluminum alloy products and methods can be used to prepare motor vehicle body part products. For example, the disclosed aluminum alloy products and methods can be used to prepare automobile body parts, such as bumpers, side beams, roof beams, cross beams, pillar reinforcements (e.g., A-pillars, B-pillars, and C-pillars), inner panels, side panels, floor panels, tunnels, structure panels, reinforcement panels, inner hoods, or trunk lid panels. The disclosed aluminum alloy products and methods can also be used in aircraft or railway vehicle applications, to prepare, for example, external and internal panels.

The aluminum alloy products and methods described herein can also be used in electronics applications, to prepare, for example, external and internal encasements. For example, the aluminum alloy products and methods described herein can also be used to prepare housings for electronic devices, including mobile phones and tablet computers. In some examples, the aluminum alloy products can be used to prepare housings for the outer casing of mobile phones (e.g., smart phones) and tablet bottom chassis.

In certain aspects, the aluminum alloy products and methods can be used to prepare aerospace vehicle body part products. For example, the disclosed aluminum alloy products and methods can be used to prepare airplane body parts, such as skin alloys.

Aluminum Alloy Products Having Phosphorus-Containing Surfaces

Aluminum Alloy Products

Described herein are aluminum alloy products having desired surface properties, including optimal contact resistance properties for certain bonding and joining applications, including, for example, resistance spot welding (referred to as "RSW"). Among other compositional features, the aluminum alloy products described herein contain a concentration of residual elements within the subsurface portion of the aluminum alloy product.

As used herein, the term "subsurface" refers to the portion of the aluminum alloy product that extends from the exterior surface of the alloy product into an interior of the alloy product to a depth of up to about 150 µm. Optionally, the subsurface refers to the portion of the alloy product that extends into the interior of the alloy product to a depth of about 0.01 µm, about 0.05 µm, about 0.1 µm, about 0.15 µm, about 0.2 µm, about 0.25 µm, about 0.3 µm, about 0.35 µm, about 0.4 µm, about 0.45 µm, about 0.5 µm, about 0.55 µm, about 0.6 µm, about 0.65 µm, about 0.7 µm, about 0.75 µm, about 0.8 µm, about 0.85 µm, about 0.9 µm, about 0.95 µm, about 1 µm, about 1.5 µm, about 2 µm, about 2.5 µm, about 3 µm, about 3.5 µm, about 4 µm, about 4.5 µm, about 5 µm, about 5.5 µm, about 6 µm, about 6.5 µm, about 7 µm, about 7.5 µm, about 8 µm, about 8.5 µm, about 9 µm, about 9.5 µm, about 10 µm, about 10.5 µm, about 11 µm, about 11.5 µm, about 12 µm, about 12.5 µm, about 13 µm, about 13.5 µm, about 14 µm, about 14.5 µm, about 15 µm, about 15.5 µm, about 16 µm, about 16.5 µm, about 17 µm, about 17.5 µm, about 18 µm, about 18.5 µm, about 19 µm, about 19.5 µm, about 20 µm, about 20.5 µm, about 21 µm, about 21.5 µm, about 22 µm, about 22.5 µm, about 23 µm, about 23.5 µm, about 24 µm, about 24.5 µm, about 25 µm, about 25.5 µm, about 26 µm, about 26.5 µm, about 27 µm, about 27.5 µm, about 28 µm, about 28.5 µm, about 29 µm, about 29.5 µm, about 30 µm, about 30.5 µm, about 31 µm, about 31.5 µm, about 32 µm, about 32.5 µm, about 33 µm, about 33.5 µm, about 34 µm, about 34.5 µm, about 35 µm, about 35.5 µm, about 36 µm, about 36.5 µm, about 37 µm, about 37.5 µm, about 38 µm, about 38.5 µm, about 39 µm, about 39.5 µm, about 40 µm, about 40.5 µm, about 41 µm, about 41.5 µm, about 42 µm, about 42.5 µm, about 43 µm, about 43.5 µm, about 44 µm, about 44.5 µm, about 45 µm, about 45.5 µm, about 46 µm, about 46.5 µm, about 47 µm, about 47.5 µm, about 48 µm, about 48.5 µm, about 49 µm, about 49.5 µm, about 50 µm, about 50.5 µm, about 51 µm, about 51.5 µm, about 52 µm, about 52.5 µm, about 53 µm, about 53.5 µm, about 54 µm, about 54.5 µm, about 55 µm, about 55.5 µm, about 56 µm, about 56.5 µm, about 57 µm, about 57.5 µm, about 58 µm, about 58.5 µm, about 59 µm, about 59.5 µm, about 60 µm, about 60.5 µm, about 61 µm, about 61.5 µm, about 62 µm, about 62.5 µm, about 63 µm, about 63.5 µm, about 64 µm, about 64.5 µm, about 65 µm, about 65.5 µm, about 66 µm, about 66.5 µm, about 67 µm, about 67.5 µm, about 68 µm, about 68.5 µm, about 69 µm, about 69.5 µm, about 70 µm, about 70.5 µm, about 71 µm, about 71.5 µm, about 72 µm, about 72.5 µm, about 73 µm, about 73.5 µm, about 74 µm, about 74.5 µm, about 75 µm, about 75.5 µm, about 76 µm, about 76.5 µm, about 77 µm, about 77.5 µm, about 78 µm, about 78.5 µm, about 79 µm, about 79.5 µm, about 80 µm, about 80.5 µm, about 81 µm, about 81.5 µm, about 82 µm, about 82.5 µm, about 83 µm, about 83.5 µm, about 84 µm, about 84.5 µm, about 85 µm, about 85.5 µm, about 86 µm, about 86.5 µm, about 87 µm, about 87.5 µm, about 88 µm, about 88.5 µm, about 89 µm, about 89.5 µm, about 90 µm, about 90.5 µm, about 91 µm, about 91.5 µm, about 92 µm, about 92.5 µm, about 93 µm, about 93.5 µm, about 94 µm, about 94.5 µm, about 95 µm, about 95.5 µm, about 96 µm, about 96.5 µm, about 97 µm, about 97.5 µm, about 98 µm, about 98.5 µm, about 99 µm, about 99.5 µm, about 100 µm, about 100.5 µm, about 101 µm, about 101.5 µm, about 102 µm, about 102.5 µm, about 103 µm, about 103.5 µm, about 104 µm, about 104.5 µm, about 105 µm, about 105.5 µm, about 106 µm, about 106.5 µm, about 107 µm, about 107.5 µm, about 108 µm, about 108.5 µm, about 109 µm, about 109.5 µm, about 110 µm, about 110.5 µm, about 111 µm, about 111.5 µm, about 112 µm, about 112.5 µm, about 113 µm, about 113.5 µm, about 114 µm, about 114.5 µm, about 115 µm, about 115.5 µm, about 116 µm, about 116.5 µm, about 117 µm, about 117.5 µm, about 118 µm, about 118.5 µm, about 119 µm, about 119.5 µm, about 120 µm, about 120.5 µm, about 121 µm, about 121.5 µm, about 122 µm, about 122.5 µm, about 123 µm, about 123.5 µm, about 124 µm, about 124.5 µm, about 125 µm, about 125.5 µm, about 126 µm, about 126.5 µm, about 127 µm, about 127.5 µm, about 128 µm, about 128.5 µm, about 129 µm, about 129.5 µm, about 130 µm, about 130.5 µm, about 131 µm, about 131.5 µm, about 132 µm, about 132.5 µm, about 133 µm, about 133.5 µm, about 134 µm, about 134.5 µm, about 135 µm, about 135.5 µm, about 136 µm, about 136.5 µm, about 137 µm, about 137.5 µm, about 138 µm, about 138.5 µm, about 139 µm, about 139.5 µm, about 140 µm, about 140.5 µm, about 141 µm, about 141.5 µm, about 142 µm, about 142.5 µm, about 143 µm, about 143.5 µm, about 144 µm, about 144.5 µm, about 145 µm, about 145.5 µm, about 146 µm, about 146.5 µm, about 147 µm, about 147.5 µm, about 148 µm, about 148.5 µm, about 149 µm, about 149.5 µm, about 150 µm, or anywhere in between. In some examples, the subsurface extends from the surface to a depth of about 83 µm within the interior of the aluminum alloy product. In some examples, the subsurface extends from the surface to a depth of about 5 µm within the interior of the aluminum alloy product. In some examples, the subsurface extends from the surface to a depth of about 2 µm within the interior of the aluminum alloy product. The portion of the aluminum alloy product excluding the subsurface portion (e.g., the remainder of the alloy product) is referred to herein as the bulk of the alloy product.

In some aspects, the subsurface can extend from any exterior surface of the aluminum alloy product. For example, the subsurface can extend from a first side of the aluminum alloy product (e.g., a top of an alloy sheet), a second side of the aluminum alloy product (e.g., a bottom of an alloy sheet), a third side of the aluminum alloy product (e.g., a first edge of an alloy sheet), or a fourth side of the aluminum alloy product (e.g., a second edge of an alloy sheet).

The term "residual element," as used herein, refers to an element that remains within the subsurface portion of the aluminum alloy product, even after being subjected to certain production and processing steps as further described below. A residual element as described herein includes, for example, P. In some aspects, the P can be present as elemental P or as oxidized P (e.g., any oxidation state of P, including −3, −2, −1, +1, +2, +3, +4, or +5). The oxidized P can be present within the subsurface portion as, for example, phosphorus pentoxide, phosphorus trioxide, phosphorus monoxide, or diphosphorus tetraoxide. In some non-limiting examples, elemental P can be present as a residual element in an amount of from about 2 at. % to about 10 at. % within the subsurface. For example, the elemental P can be present in an amount of about 2 at. %, 3 at. %, 4 at. %, 5 at. %, 6 at. %, 7 at. %, 8 at. %, 9 at. %, 10 at. %, or anywhere in between.

The aluminum alloy product can have any suitable composition. In some examples, the aluminum alloy product can be prepared from any aluminum alloy that includes at least about 0.001 wt. % magnesium (Mg). For example, the aluminum alloy product can be prepared from an aluminum alloy that includes from about 0.001 wt. % to about 10 wt. % Mg (e.g., from about 0.01 wt. % to about 9 wt. %, from about 0.05 wt. % to about 8 wt. %, or from about 0.1 wt. % to about 8 wt. %). Optionally, the aluminum alloy for use in the aluminum alloy products described herein includes Mg in an amount of about 0.001 wt. %, 0.002 wt. %, 0.003 wt. %, 0.004 wt. %, 0.005 wt. %, 0.006 wt. %, 0.007 wt. %, 0.008 wt. %, 0.009 wt. %, 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.1 wt. %, 0.11 wt. %, 0.12 wt. %, 0.13 wt. %, 0.14 wt. %, 0.15 wt. %, 0.16 wt. %, 0.17 wt. %, 0.18 wt. %, 0.19 wt. %, 0.2 wt. %, 0.3 wt. %, 0.4 wt. %, 0.5 wt. %, 0.6 wt. %, 0.7 wt. %, 0.8 wt. %, 0.9 wt. %, 1.0 wt. %, 1.1 wt. %, 1.2 wt. %, 1.3 wt. %, 1.4 wt. %, 1.5 wt. %, 1.6 wt. %, 1.7 wt. %, 1.8 wt. %, 1.9 wt. %, 2.0 wt. %, 2.1 wt. %, 2.2 wt. %, 2.3 wt. %, 2.4 wt. %, 2.5 wt. %, 2.6 wt. %, 2.7 wt. %, 2.8 wt. %, 2.9 wt. %, 3.0 wt. %, 3.1 wt. %, 3.2 wt. %, 3.3 wt. %, 3.4 wt. %, 3.5 wt. %, 3.6 wt. %, 3.7 wt. %, 3.8 wt. %, 3.9 wt. %, 4.0 wt. %, 4.1 wt. %, 4.2 wt. %, 4.3 wt. %, 4.4 wt. %, 4.5 wt. %, 4.6 wt. %, 4.7 wt. %, 4.8 wt. %, 4.9 wt. %, 5.0 wt. %, 5.1 wt. %, 5.2 wt. %, 5.3 wt. %, 5.4 wt. %, 5.5 wt. %, 5.6 wt. %, 5.7 wt. %, 5.8 wt. %, 5.9 wt. %, 6.0 wt. %, 6.1 wt. %, 6.2 wt. %, 6.3 wt. %, 6.4 wt. %, 6.5 wt. %, 6.6 wt. %, 6.7 wt. %, 6.8 wt. %, 6.9 wt. %, 7.0 wt. %, 7.1 wt. %, 7.2 wt. %, 7.3 wt. %, 7.4 wt. %, 7.5 wt. %, 7.6 wt. %, 7.7 wt. %, 7.8 wt. %, 7.9 wt. %, 8.0 wt. %, 8.1 wt. %, 8.2 wt. %, 8.3 wt. %, 8.4 wt. %, 8.5 wt. %, 8.6 wt. %, 8.7 wt. %, 8.8 wt. %, 8.9 wt. %, 9.0 wt. %, 9.1 wt. %, 9.2 wt. %, 9.3 wt. %, 9.4 wt. %, 9.5 wt. %, 9.6 wt. %, 9.7 wt. %, 9.8 wt. %, 9.9 wt. %, or 10.0 wt. %.

In non-limiting examples, the aluminum alloy products can include 5xxx series aluminum alloys, 6xxx series aluminum alloys, or 7xxx series aluminum alloys.

Suitable 5xxx series aluminum alloys for use as the aluminum alloy product include, for example, AA5005, AA5005A, AA5205, AA5305, AA5505, AA5605, AA5006, AA5106, AA5010, AA5110, AA5110A, AA5210, AA5310, AA5016, AA5017, AA5018, AA5018A, AA5019, AA5019A, AA5119, AA5119A, AA5021, AA5022, AA5023, AA5024, AA5026, AA5027, AA5028, AA5040, AA5140, AA5041, AA5042, AA5043, AA5049, AA5149, AA5249, AA5349, AA5449, AA5449A, AA5050, AA5050A, AA5050C, AA5150, AA5051, AA5051A, AA5151, AA5251, AA5251A, AA5351, AA5451, AA5052, AA5252, AA5352, AA5154, AA5154A, AA5154B, AA5154C, AA5254, AA5354, AA5454, AA5554, AA5654, AA5654A, AA5754, AA5854, AA5954, AA5056, AA5356, AA5356A, AA5456, AA5456A, AA5456B, AA5556, AA5556A, AA5556B, AA5556C, AA5257, AA5457, AA5557, AA5657, AA5058, AA5059, AA5070, AA5180, AA5180A, AA5082, AA5182, AA5083, AA5183, AA5183A, AA5283, AA5283A, AA5283B, AA5383, AA5483, AA5086, AA5186, AA5087, AA5187, or AA5088.

Suitable 6xxx series aluminum alloys for use as the aluminum alloy product include, for example, AA6101, AA6101A, AA6101B, AA6201, AA6201A, AA6401, AA6501, AA6002, AA6003, AA6103, AA6005, AA6005A, AA6005B, AA6005C, AA6105, AA6205, AA6305, AA6006, AA6106, AA6206, AA6306, AA6008, AA6009, AA6010, AA6110, AA6110A, AA6011, AA6111, AA6012, AA6012A, AA6013, AA6113, AA6014, AA6015, AA6016, AA6016A, AA6116, AA6018, AA6019, AA6020, AA6021, AA6022, AA6023, AA6024, AA6025, AA6026, AA6027, AA6028, AA6031, AA6032, AA6033, AA6040, AA6041, AA6042, AA6043, AA6151, AA6351, AA6351A, AA6451, AA6951, AA6053, AA6055, AA6056, AA6156, AA6060, AA6160, AA6260, AA6360, AA6460, AA6460B, AA6560, AA6660, AA6061, AA6061A, AA6261, AA6361, AA6162, AA6262, AA6262A, AA6063, AA6063A, AA6463, AA6463A, AA6763, A6963, AA6064, AA6064A, AA6065, AA6066, AA6068, AA6069, AA6070, AA6081, AA6181, AA6181A, AA6082, AA6082A, AA6182, AA6091, and AA6092.

Suitable 7xxx series aluminum alloys for use as the aluminum alloy product include, for example, AA7003, AA7004, AA7204, AA7005, AA7108, AA7108A, AA7009, AA7010, AA7012, AA7014, AA7015, AA7016, AA7116, AA7017, AA7018, AA7019, AA7019A, AA7020, AA7021, AA7022, AA7122, AA7023, AA7024, AA7025, AA7026, AA7028, AA7029, AA7129, AA7229, AA7030, AA7031, AA7032, AA7033, AA7034, AA7035, AA7035A, AA7036, AA7136, AA7037, AA7039, AA7040, AA7140, AA7041, AA7042, AA7046, AA7046A, AA7047, AA7049, AA7049A, AA7149, AA7249, AA7349, AA7449, AA7050, AA7050A, AA7150, AA7055, AA7155, AA7255, AA7056, AA7060, AA7064, AA7065, AA7068, AA7168, AA7072, AA7075, AA7175, AA7475, AA7076, AA7178, AA7278, AA7278A, AA7081, AA7181, AA7085, AA7185, AA7090, AA7093, AA7095, AA7099, and AA7199.

While aluminum alloy products are described throughout the text, the methods and products apply to any metal. In some examples, the metal product is aluminum, an aluminum alloy, magnesium, a magnesium-based material, titanium, a titanium-based material, copper, a copper-based material, steel, a steel-based material, bronze, a bronze-based material, brass, a brass-based material, a composite, a sheet used in composites, or any other suitable metal or combination of materials. The product may include monolithic materials, as well as non-monolithic materials such as roll-bonded materials, clad materials, composite materials (such as but not limited to carbon fiber-containing materials), or various other materials. In some examples, the metal product is a metal coil, a metal strip, a metal plate, a metal sheet, a metal billet, a metal ingot, or the like.

In some examples, an alloying element, and/or an oxide thereof, as described herein can diffuse throughout the alloy product such that the concentration of the alloying element and/or oxide thereof is distributed throughout a full thickness (e.g., a bulk of the aluminum alloy) of the aluminum alloy product (i.e., at least within the subsurface and the bulk portions). For example, the aluminum alloy product can include a concentration of Mg and/or MgO that is distributed throughout the aluminum alloy product and can migrate to the subsurface portion during various processing steps, including homogenization, hot rolling, cold rolling, and solutionizing.

In other cases, the concentration of P and Mg and/or MgO can provide at least a portion of the subsurface that is amenable to RSW. In some cases, a contact resistance of the subsurface can be optimized for RSW. In some non-limiting examples, the optimized contact resistance can reduce electronic stress (e.g., Joule heating) on at least a tip of a RSW electrode, and/or the entire electrode. In some examples, increased contact resistance can provide increased Joule heating of the electrode and/or the tip and accelerate failure of the electrode and/or the tip due to thermally enhanced failure mechanisms including corrosion, fatigue, fracture, or any combination thereof. Thus, providing an optimized contact resistance can decelerate the failure of the electrode and/or the tip and allow RSW electrodes to have a service lifetime greater than current demands of the industry, for example, at least about 80 weld cycles. For example, the RSW electrodes and/or the tip can survive at least about 85 weld cycles, at least about 90 weld cycles, at least about 95 weld cycles, or at least about 100 weld cycles.

In some cases, a higher concentration of MgO present within the subsurface of the aluminum alloy product can shorten the service lifetime of a RSW electrode. However, when the aluminum alloy is etched and/or cleaned with a P-containing compound (e.g., phosphoric acid), the service lifetime of the RSW electrode can be increased. Thus, in some non-limiting examples, providing a concentration of residual P to the subsurface portion of the aluminum alloy product can improve the service lifetime of the RSW electrode.

Additionally, P present at the surface of the aluminum alloy product can stabilize the surface. In some cases, P and Mg present at the surface and/or in the subsurface can form magnesium phosphate (MgPO$_4$), dimagnesium phosphate (MgHPO$_4$), trimagnesium phosphate (Mg$_3$(PO$_4$)$_2$), magnesium phosphide (Mg$_3$P$_2$), magnesium phosphite (Mg$_3$(PO$_3$)$_2$), magnesium dihydrogen phosphate (Mg(H$_2$PO$_4$)$_2$), any suitable Mg—P compound, or any combination thereof. Forming Mg—P compounds at the surface and/or in the subsurface can reduce the concentration of MgO, stabilizing the surface and thus lengthening the service lifetime of the RSW electrode (see Equations I-IV, described in detail below).

In some examples, etching the surface of the aluminum alloy product with a P-containing etchant (e.g., a mixture of phosphoric acid and sulfuric acid (H$_3$PO$_4$/H$_2$SO$_4$)) can reduce the concentration of MgO at the surface and/or in the subsurface by (i) removing the MgO and/or (ii) promoting Mg—P compound formation. Thus, etching with a P-containing etchant further reduces the MgO concentration beyond that of etching without a P-containing etchant. In some aspects, reducing the MgO concentration as described herein can lengthen the service lifetime of a RSW electrode as described above (e.g., surviving at least about 100 weld cycles).

In some non-limiting examples, the sulfuric acid in the H$_3$PO$_4$/H$_2$SO$_4$ mixture can dissolve MgO, magnesium hydroxide (Mg(OH)$_2$), alumina (Al$_2$O$_3$), and/or aluminum hydroxide (Al(OH)$_3$) at the surface or in the subsurface. Additionally, the phosphoric acid in the H$_3$PO$_4$/H$_2$SO$_4$ mixture can complex with MgO and Mg(OH)$_2$ and form various Mg—P compounds according to the formulae below:

$$MgO + 2H_3PO_4 \rightarrow Mg(H_2PO_4)_2 + H_2O; \qquad \text{Eq. (I)}$$

$$MgO + H_2PO_4 \rightarrow MgPO_4 + H_2O; \qquad \text{Eq. (II)}$$

$$3Mg(OH)_2 + 2H_3PO_4 \rightarrow Mg_3(PO_4)_2 + 6H_2O; \qquad \text{Eq. (III)}$$

$$3Mg + H_3PO_4 \rightarrow Mg_3(PO_4)_2 + H_{2(g)}; \qquad \text{Eq. (IV)}$$

The atomic concentrations of the P and Mg within the aluminum alloy product vary based on the particular location (e.g., depth) within the aluminum alloy product, and the methods of preparing, processing, and treating the aluminum alloy product. Additionally, the aluminum alloy material in the aluminum alloy product comprises P from the etching as described above. The atomic concentrations of P and Mg (e.g., P/Mg) can be measured using techniques as known to those of ordinary skill in the art, including x-ray photoelectron spectroscopy (XPS).

P and Mg, for example, can be present at the surface and/or in the subsurface of the aluminum alloy product. The atomic concentration ratio of P to Mg at the surface and/or in the subsurface of the aluminum alloy product can have any suitable value, generally ranging from about 0.001 to about 10 (e.g., from about 0.005 to about 9, from about 0.01 to about 8, from about 0.05 to about 7, from about 0.1 to about 6, from about 0.1 to about 5, from about 0.15 to about 5.5, from about 0.2 to about 5, from about 0.25 to about 4.5, from about 0.5 to about 4, from about 0.75 to about 3.5, from about 1 to about 3, from about 1.25 to about 2.5, or from about 1.5 to about 2). For example, the atomic concentration ratio of P to Mg at the surface and/or in the subsurface of the aluminum alloy product can be about 0.001, about 0.002, about 0.003, about 0.004, about 0.005, about 0.006, about 0.007, about 0.008, about 0.009, about 0.01, about 0.02, about 0.03, about 0.04, about 0.05, about 0.06, about 0.07, about 0.08, about 0.09, about 0.1, about 0.2, about 0.3, about 0.4, about 0.5, about 0.6, about 0.7, about 0.8, about 0.9, about 1, about 1.1, about 1.2, about 1.3, about 1.4, about 1.5, about 1.6, about 1.7, about 1.8, about 1.9, about 2, about 2.1, about 2.2, about 2.3, about 2.4, about 2.5, about 2.6, about 2.7, about 2.8, about 2.9, about 3, about 3.1, about 3.2, about 3.3, about 3.4, about 3.5, about 3.6, about 3.7, about 3.8, about 3.9, about 4, about 4.1, about 4.2, about 4.3, about 4.4, about 4.5, about 4.6, about 4.7, about 4.8, about 4.9, about 5, about 5.1, about 5.2, about 5.3, about 5.4, about 5.5, about 5.6, about 5.7, about 5.8, about 5.9, about 6, about 6.1, about 6.2, about 6.3, about 6.4, about 6.5, about 6.6, about 6.7, about 6.8, about 6.9, about 7, about 7.1, about 7.2, about 7.3, about 7.4, about 7.5, about 7.6, about 7.7, about 7.8, about 7.9, about 8, about 8.1, about 8.2, about 8.3, about 8.4, about 8.5, about 8.6, about 8.7, about 8.8, about 8.9, about 9, about 9.1, about 9.2, about 9.3, about 9.4, about 9.5, about 9.6, about 9.7, about 9.8, about 9.9, or about 10. The atomic concentration ratio of P to Mg at the surface or in the subsurface can be calculated by taking the simple ratio of the atomic concentration of P to that of Mg (e.g., P/Mg) at the surface or in the subsurface, respectively, where the concentration is measured using, for example, XPS as described above. In some examples, Eq. (I) above can provide a P/Mg ratio of about 2, Eq. (II) can provide a P/Mg ratio of about 1, and Eq. (III) and/or Eq. (IV) can provide a P/Mg ratio of about 0.75. In some non-limiting examples, the atomic concentration ratio of P/Mg is from about 0.6 to about 0.7 in a subsurface extending to about 83 μm from the surface.

The yellow index (referred to as "YI") can indicate an optimal surface chemistry for resistive spot welding aluminum alloys. The YI is a result of a concentration of magnesium oxide (MgO) present on at least a portion of the surface of the aluminum alloy, causing the aluminum alloy to have a yellow appearance. Optionally, the YI is at least 15 (e.g., at least about 18, at least about 20, or at least about 22). The YI was measured according to ASTM standard E313.

The aluminum alloy products described herein can have any suitable gauge. For example, the aluminum alloy product can be an aluminum alloy plate, an aluminum alloy shate, or an aluminum alloy sheet having a gauge between about 0.5 mm and about 50 mm (e.g., about 0.5 mm, about 1 mm, about 2 mm, about 3 mm, about 4 mm, about 5 mm, about 6 mm, about 7 mm, about 8 mm, about 9 mm, about 10 mm, about 15 mm, about 20 mm, about 25 mm, about 30 mm, about 35 mm, about 40 mm, about 50 mm, or anywhere in between).

The aluminum alloy products described herein can have a surface roughness suitable for successful bonding according to any suitable bonding technique, including, for example, resistance spot welding. The aluminum alloy products described herein can have an average surface roughness of from about 25 nanometers (nm) to about 50 nm. For example, the aluminum alloy products described herein can have a surface roughness of about 25 nm, about 26 nm, about 27 nm, about 28 nm, about 29 nm, about 30 nm, about 31 nm, about 32 nm, about 33 nm, about 34 nm, about 35 nm, about 36 nm, about 37 nm, about 38 nm, about 39 nm, about 40 nm, about 41 nm, about 42 nm, about 43 nm, about 44 nm, about 45 nm, about 46 nm, about 47 nm, about 48 nm, about 49 nm, about 50 nm, or anywhere in between.

Methods of Preparing the Alloy Products

In certain aspects, the aluminum alloy products described herein can be prepared using a method as described herein. Without intending to limit the scope, aluminum alloy product properties are partially determined by the formation of certain compositional features during the preparation of the products. As described below, certain processing steps and conditions, including the etching steps and conditions, provide the aluminum alloy products described above having the desirable bond durability properties, and in particular, the optimal surface chemistry and/or contact resistance required to reduce electronic stress on the electrode tip of a resistance spot welding (RSW) apparatus, and thereby extend the service lifetime of the RSW electrode.

Any suitable aluminum alloy as described herein (i.e., containing at least some amount of Cu) can be cast by any suitable method to result in a cast product. In some examples, the alloys can be cast using a direct chill (DC) casting process to form an aluminum alloy ingot. In some examples, the alloys can be cast using a continuous casting (CC) process that may include, but is not limited to, the use of twin-belt casters, twin-roll casters, or block casters, to form a cast product in the form of a billet, a slap, a shate, a strip, and the like. The cast product can then be subjected to processing steps, including, but not limited to, homogenization, hot rolling, cold rolling, solution heat treatment, quenching, and/or aging based on the particular aluminum alloy series used to prepare the product. Following processing, the aluminum alloy product can undergo surface preparation steps as further described below.

Surface Preparation

The aluminum alloy products described herein and cast by DC casting or CC or otherwise and subsequently processed can be subjected to surface preparation processes described below.

Cleaning

Optionally, the surface preparation process described herein includes a step of applying a cleaner (also referred to herein as an entry cleaner or pre-cleaner) to one or more surfaces of the aluminum alloy product. The entry cleaner removes residual oils, or loosely adhering oxides, from the aluminum alloy product surface. Optionally, the entry cleaning can be performed using an alkaline solution having a pH of 7.5 or above. In some cases, the pH of the alkaline solution can be about 8, about 8.5, about 9, about 9.5, about 10, about 10.5, about 11, about 11.5, about 12, about 12.5, or about 13. The concentration of the alkaline agent in the alkaline solution can be from about 1% to about 5% (e.g., about 1%, about 2%, about 3%, about 4%, or about 5% based on the volume of the alkaline solution). Suitable alkaline agents include, for example, silicates and hydroxides (e.g., sodium hydroxide). The alkaline solution can further include one or more surfactants, including for example anionic and non-ionic surfactants.

Etching

The pretreatment process described includes a step of etching the surface of the aluminum alloy product. The surface of the aluminum alloy product can be etched using an acid etch (i.e., an etching procedure that includes an acidic solution). The etching step deposits P within the subsurface portion of the aluminum alloy product. In addition, the etching step prepares the surface to accept the subsequent application of a pretreatment. Any loosely adhering oxides, such as Al oxides and Mg rich oxides, entrapped oils, or debris, should be adequately removed during this step.

The etching step is performed using an etch solution that includes at least one P-containing compound. In some examples, suitable P-containing compounds for use in the etch solution include phosphoric acid, phosphonic acid, phosphinic acid, any other P-containing acid, and combinations thereof. For example, the P-containing compound can include phosphoric acid ($H_3PO_4$). Optionally, the etch solution can include one or more additional acids, including sulfuric acid, hydrofluoric acid, acetic acid, and/or hydrochloric acid. In some examples, the etch solution includes a mixture of phosphoric acid and sulfuric acid. In some cases, the mixture includes a ratio of phosphoric acid to sulfuric acid of from about 3 to about 5. For example, the ratio of phosphoric acid to sulfuric acid can be about 3, about 3.1, about 3.2, about 3.3, about 3.4, about 3.5, about 3.6, about 3.7, about 3.8, about 3.9, about 4, about 4.1, about 4.2, about 4.3, about 4.4, about 4.5, about 4.6, about 4.7, about 4.8, about 4.9, or about 5.

As described above, the etching step deposits the residual element concentration (e.g., P) within the subsurface portion of the aluminum alloy product. In some examples, the etching step deposits at least about 2 at. % to about 10 at. % of P within the subsurface of the aluminum alloy product. Such depositing and the subsequent oxidizing of the P can optimize the contact resistance of subsurface portion for RSW. In some further examples, optimizing the contact resistance can reduce electronic stress on the RSW electrode, thus extending the service lifetime of the RSW electrode beyond current industry demands.

Rinsing after Etching

After the etching step, the surface of the aluminum alloy product can be rinsed with a solvent. Optionally, the solvent can be an aqueous solution, such as deionized (DI) water or reverse osmosis (RO) water.

Applying a Pretreatment

Optionally, a pretreatment can then be applied to the surface of the aluminum alloy product. Suitable pretreatments include, for example, adhesion promoters and corrosion inhibitors. The pretreatment can be applied at any suitable temperature known in the art.

Application of the pretreatment produces a thin layer of the pretreatment on the surface of the aluminum alloy product. After the pretreatment application, the surface of the aluminum alloy product can be rinsed and/or dried as known in the art.

Methods of Using

The aluminum alloy products and methods described herein can be used in automotive, electronics, and transportation applications, such as commercial vehicle, aircraft, or railway applications, or any other suitable application. For example, the aluminum alloy products can be used for chassis, cross-member, and intra-chassis components (encompassing, but not limited to, all components between the two C channels in a commercial vehicle chassis) to gain strength, serving as a full or partial replacement of high strength steels. In certain examples, the aluminum alloy products can be used in the F, O, T4, T6, or T8x tempers.

In certain aspects, the aluminum alloy products and methods can be used to prepare motor vehicle body part products. For example, the disclosed aluminum alloy products and methods can be used to prepare automobile body parts, such as bumpers, side beams, roof beams, cross beams, pillar reinforcements (e.g., A-pillars, B-pillars, and C-pillars), inner panels, side panels, floor panels, tunnels, structure panels, reinforcement panels, inner hoods, or trunk lid panels. The disclosed aluminum alloy products and methods can also be used in aircraft or railway vehicle applications, to prepare, for example, external and internal panels.

The aluminum alloy products and methods described herein can also be used in electronics applications, to prepare, for example, external and internal encasements. For example, the aluminum alloy products and methods described herein can also be used to prepare housings for electronic devices, including mobile phones and tablet computers. In some examples, the aluminum alloy products can be used to prepare housings for the outer casing of mobile phones (e.g., smart phones) and tablet bottom chassis.

In certain aspects, the aluminum alloy products and methods can be used to prepare aerospace vehicle body part products. For example, the disclosed aluminum alloy products and methods can be used to prepare airplane body parts, such as skin alloys.

Illustrative Aspects

Aspect 1 is an aluminum alloy product, comprising: a migrant element; a subsurface portion having a concentration of the migrant element; and a bulk portion having a concentration of the migrant element, wherein the aluminum alloy product comprises an enrichment ratio of 4.0 or less, wherein the enrichment ratio is a ratio of the concentration of the migrant element in the subsurface portion to the concentration of the migrant element in the bulk portion.

Aspect 2 is the aluminum alloy product of any preceding or subsequent aspect, wherein the migrant element comprises at least one of Zn, Cu, Mg, or Si.

Aspect 3 is the aluminum alloy product of any preceding or subsequent aspect, wherein the subsurface portion comprises an area from the surface of the aluminum alloy product to a depth of about 5 μm.

Aspect 4 is the aluminum alloy product of any preceding or subsequent aspect, wherein the subsurface portion comprises an area from the surface of the aluminum alloy product to a depth of about 2 μm.

Aspect 5 is the aluminum alloy product of any preceding or subsequent aspect, wherein the enrichment ratio is 2.0 or less.

Aspect 6 is the aluminum alloy product of any preceding or subsequent aspect, wherein the enrichment ratio is 1.5 or less.

Aspect 7 is the aluminum alloy product of any preceding or subsequent aspect, wherein the enrichment ratio is 1.0. Illustration 8 is the aluminum alloy product of any preceding or subsequent illustration, wherein the aluminum alloy product comprises a 7xxx series aluminum alloy, a 6xxx series aluminum alloy, a 5xxx series aluminum alloy, or a 2xxx series aluminum alloy.

Aspect 9 is a method of producing an aluminum alloy product according to any preceding or subsequent aspect, comprising: casting an aluminum alloy comprising a migrant element to produce a cast aluminum alloy article; rolling the cast aluminum alloy article to provide a rolled aluminum alloy article; and heat treating the rolled aluminum alloy article to form an aluminum alloy product, wherein the migrant element is distributed within a subsurface portion and a bulk portion of the aluminum alloy product to provide an enrichment ratio of 4.0 lower, wherein the enrichment ratio is a ratio of the concentration of the migrant element in the subsurface portion to the concentration of the migrant element in the bulk portion.

Aspect 10 is the method of any preceding or subsequent aspect, wherein the rolling step is performed at a temperature of from about 200° C. to about 550° C.

Aspect 11 is the method of any preceding or subsequent aspect, wherein the heat treating step is performed at a temperature of from about 400° C. to about 580° C.

Aspect 12 is the method of any preceding or subsequent aspect, wherein the heat treating step is performed for about 120 seconds or less.

Aspect 13 is the method of any preceding or subsequent aspect, further comprising pretreating the cast aluminum alloy product.

Aspect 14 is the method of any preceding or subsequent aspect, wherein the pretreating comprises cleaning a surface of the cast aluminum alloy product, etching the surface of the cast aluminum alloy product, and applying a pretreatment to the surface of the cast aluminum alloy product.

Aspect 15 is the method of any preceding or subsequent aspect, wherein the pretreating is performed after the heat treating step.

Aspect 16 is the method of any preceding or subsequent aspect, wherein the casting comprises direct chill casting.

Aspect 17 is the method of any preceding or subsequent aspect, wherein the casting comprises continuous casting.

Aspect 18 is an aluminum alloy product, comprising: a subsurface portion having a concentration of a migrant element; and a bulk portion having a concentration of the migrant element, wherein the concentration of the migrant element in the subsurface portion is higher than the concentration of the migrant element in the bulk portion.

Aspect 19 is the aluminum alloy product of any preceding or subsequent aspect, wherein the migrant element comprises Cu, Mn, Cr, and/or Fe.

Aspect 20 is the aluminum alloy product of any preceding or subsequent aspect, wherein the aluminum alloy product comprises a 6xxx series aluminum alloy or a 5xxx series aluminum alloy.

Aspect 21 is an aluminum alloy product according to any preceding or subsequent aspect, comprising a subsurface portion and a bulk portion, wherein the subsurface portion comprises P.

Aspect 22 is the aluminum alloy product of any preceding or subsequent aspect, wherein the P is present within the subsurface portion as at least one of elemental P, phosphorus pentoxide, phosphorus trioxide, phosphorus monoxide, or diphosphorus tetraoxide.

Aspect 23 is the aluminum alloy product of any preceding or subsequent aspect, wherein the subsurface portion comprises P in an amount of from about 2 at. % to about 10 at. %.

Aspect 24 is the aluminum alloy product of any preceding or subsequent aspect, wherein the subsurface portion comprises an area from a surface of the aluminum alloy product to a depth of about 150 μm.

Aspect 25 is the aluminum alloy product of any preceding or subsequent aspect, wherein the subsurface portion comprises an area from the surface of the aluminum alloy product to a depth of about 83 μm.

Aspect 26 is the aluminum alloy product of any preceding or subsequent aspect, wherein the aluminum alloy product comprises a yellow index of greater than about 15.

Aspect 27 is the aluminum alloy product of any preceding or subsequent aspect, wherein the yellow index is greater than about 20.

Aspect 28 is a method of treating a surface of an aluminum alloy product according to any preceding or subsequent aspect, comprising: providing an aluminum alloy product having a subsurface portion and a bulk portion; and etching a surface of the aluminum alloy product with an etch solution comprising a P-containing compound.

Aspect 29 is the method of any preceding or subsequent aspect, wherein the providing step comprises providing an aluminum alloy product comprising at least about 0.001 wt. % Mg.

Aspect 30 is the method of any preceding or subsequent aspect, wherein the providing step comprises providing an aluminum alloy product comprising from about 0.001 wt. % to about 10 wt. % Mg.

Aspect 31 is the method of any preceding or subsequent aspect, wherein the providing step comprises providing an aluminum alloy product comprising a 5xxx series aluminum alloy, a 6xxx series aluminum alloy, or a 7xxx series aluminum alloy.

Aspect 32 is the method of any preceding or subsequent aspect, wherein the P containing compound comprises phosphoric acid, phosphonic acid, phosphinic acid, and combinations thereof.

Aspect 33 is the method of any preceding or subsequent aspect, wherein the etch solution further comprises one or more additional acids.

Aspect 34 is the method of any preceding or subsequent aspect, wherein the one or more additional acids comprises sulfuric acid, hydrofluoric acid, acetic acid, and/or hydrochloric acid.

Aspect 35 is the method of any preceding or subsequent aspect, wherein the etch solution comprises phosphoric acid and sulfuric acid.

Aspect 36 is the method of any preceding or subsequent aspect, wherein a ratio of phosphoric acid to sulfuric acid is from about 3 to about 5.

Aspect 37 is the method of any preceding or subsequent aspect, wherein etching the surface of the aluminum alloy product exposes Mg on the surface of the aluminum alloy product.

Aspect 38 is the method of any preceding or subsequent aspect, wherein exposing Mg comprises forming magnesium phosphate, magnesium phosphide, magnesium phosphite, or any combination thereof.

Aspect 39 is the method of any preceding or subsequent aspect, wherein forming magnesium phosphate, magnesium phosphide, magnesium phosphite, or any combination thereof, comprises providing an atomic concentration ratio of P to Mg of from 0.001 to 10 in the subsurface portion.

Aspect 40 is an aluminum alloy product prepared according to the method of any preceding or subsequent aspect, wherein the aluminum alloy product comprises a motor vehicle body part, an aerospace body part, a transportation body part, a marine body part, a motor vehicle panel, an aerospace skin panel, a marine panel, an electronics device housing, an architectural structural part, or an architectural aesthetic panel.

The following examples will serve to further illustrate the present invention without, however, constituting any limitation thereof. On the contrary, it is to be clearly understood that resort may be had to various embodiments, modifications, and equivalents thereof which, after reading the description herein, may suggest themselves to those skilled in the art without departing from the spirit of the invention. During the studies described in the following examples, conventional procedures were followed, unless otherwise stated. Some of the procedures are described below for illustrative purposes.

EXAMPLES

Example 1: Controlling Migrant Element Concentrations Through Solutionization

Figure 4:
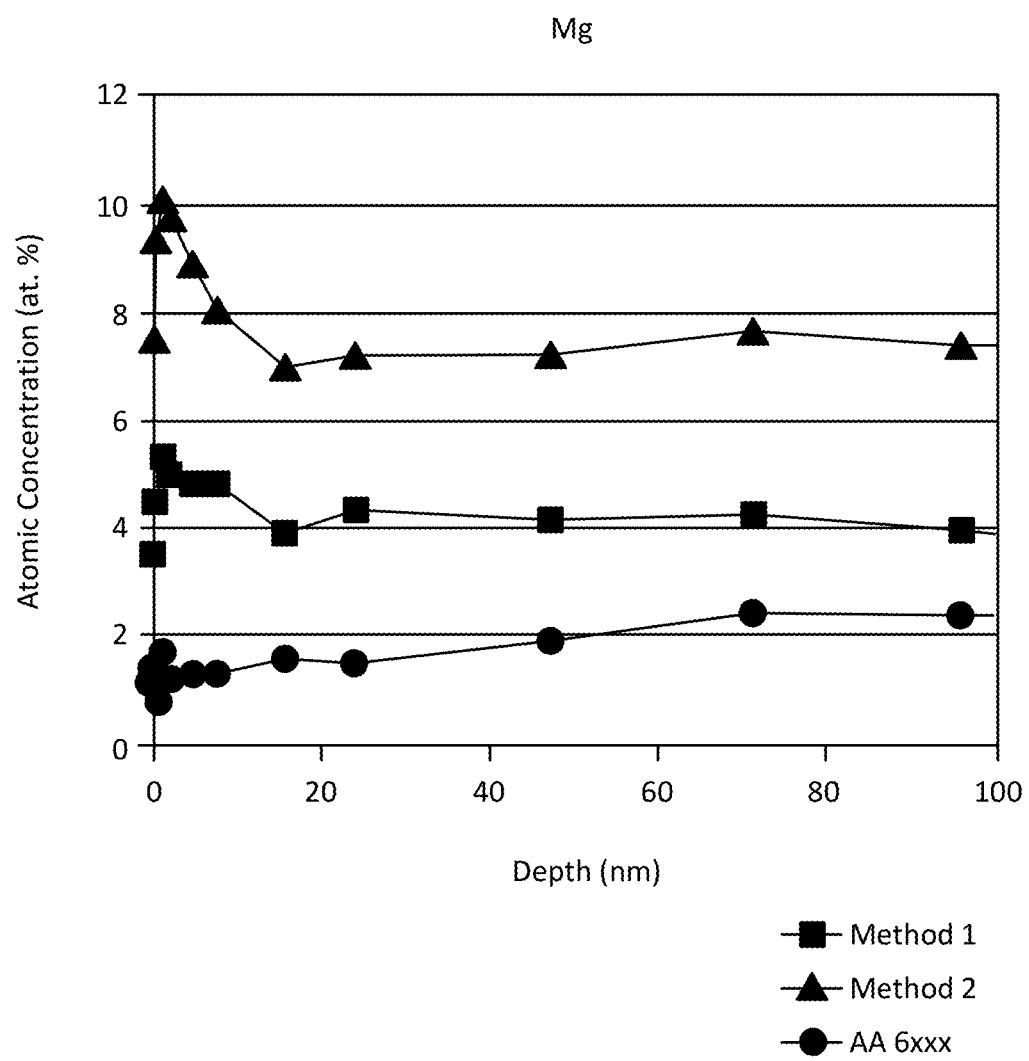
FIG. 4 is a graph showing the Mg content in exemplary aluminum alloy product surfaces by X-ray photoelectron spectroscopy.

Two samples of a 6xxx series aluminum alloy were prepared by direct chill casting and were processed by homogenizing, hot rolling, cold rolling, solution heat treating, air quenching, etching using 7% R243, and pretreating with an adhesion promoter. The processing methods differed only by the solution heat treatment step. The first alloy sample was solution heat treated at 540° C. for 1 second (Method 1) and the second alloy sample was solution heat treated at 578° C. for 35 seconds (Method 2). FIG. 4 presents X-ray photoelectron spectroscopy (XPS) depth profile data for the Mg content in the sample prepared according to Method 1 (indicated by square symbols), the Mg content in the sample prepared according to Method 2 (indicated by triangle symbols), and the Mg content in a comparative 6xxx series aluminum alloy that was not solution heat treated ("AA 6xxx;" indicated by circle symbols). Evident in FIG. 4 is the ability to control migrant Mg concentrations in the subsurface and provide a uniform Mg concentration throughout the aluminum alloy product. Method 1 provided a more uniform Mg concentration from the surface to the bulk of the aluminum alloy with a greater Mg content compared to the comparative 6xxx series aluminum alloy. Method 2 provided a greater Mg content closer to the aluminum alloy surface and a lower Mg content in the bulk of the aluminum alloy, as well as a greater Mg content compared to the exemplary aluminum alloy prepared according to Method 1 and the comparative 6xxx series aluminum alloy. The comparative 6xxx series aluminum alloy exhibited a highly uniform Mg concentration from the surface to the bulk of the aluminum alloy and a lower overall Mg content near the surface of the aluminum alloy.

Figure 5:
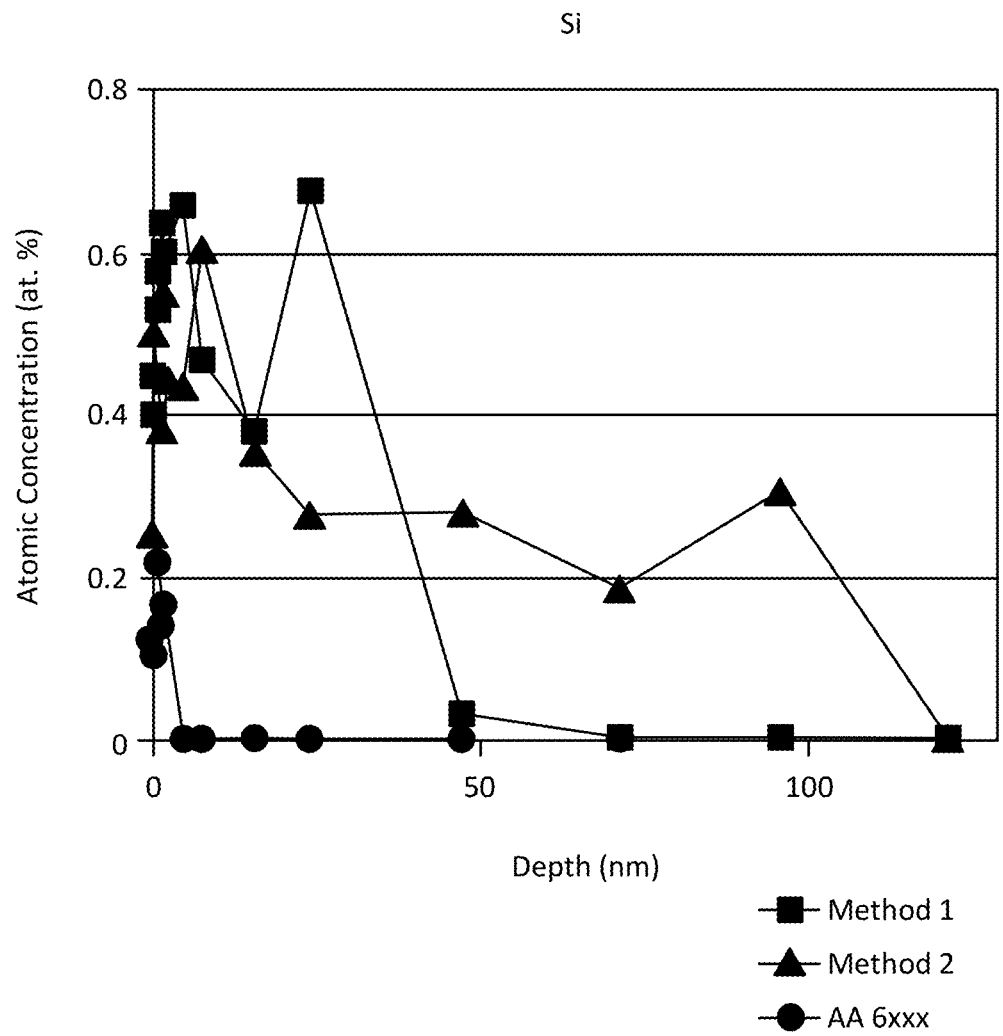
FIG. 5 is a graph showing the Si content in exemplary aluminum alloy product surfaces by X-ray photoelectron spectroscopy.

FIG. 5 presents XPS depth profile data for the Si content in the aluminum alloy product prepared according to Method 1 (indicated by square symbols), the aluminum alloy product prepared according to Method 2 (indicated by triangle symbols), and a comparative 6xxx series aluminum alloy that was not solution heat treated (indicated by circle symbols). Evident in FIG. 5 is the ability to control migrant silicon (Si) concentration in the bulk aluminum alloy and provide uniform Si concentration into the bulk of the aluminum alloy. Method 1 provided a greater Si content closer to the aluminum alloy surface and a lower Si content in the bulk of the aluminum alloy. Method 2 provided a greater Si content near the surface of the aluminum alloy and a more uniform Si concentration further into the bulk of the aluminum alloy. The Si content of the Method 2 alloy product was higher than that of the comparative 6xxx series aluminum alloy product. The comparative 6xxx series aluminum alloy exhibited a highly uniform and very low Si concentration from the surface to the bulk of the aluminum alloy and a lower overall Si content near the surface of the aluminum alloy.

Figure 6:
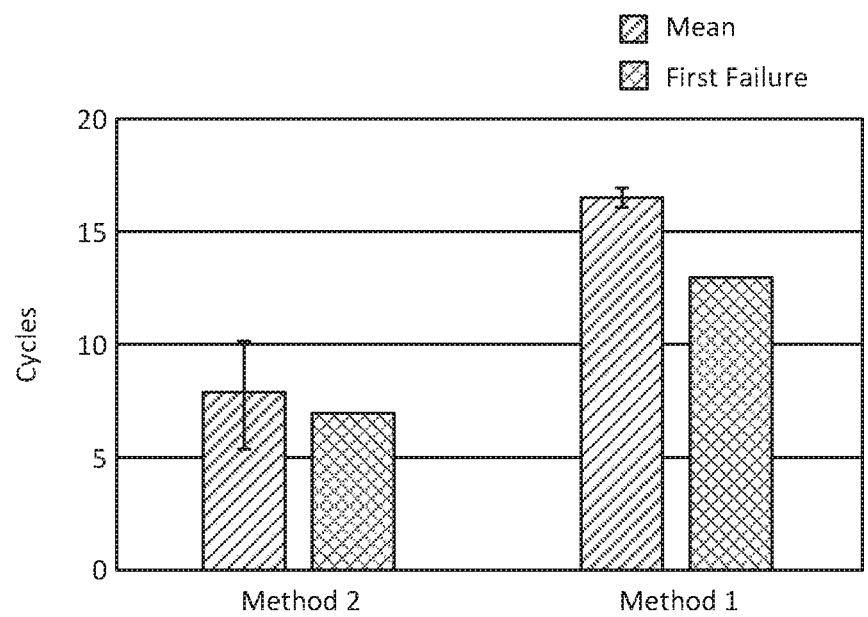
FIG. 6 is a graph showing bond durability of exemplary alloys prepared and processed according to methods described herein.

FIG. 6 shows bond durability testing results of aluminum alloys prepare according to methods described herein. Exemplary aluminum alloy samples prepared according to Method 1 and Method 2 were bonded together and subjected to a stress durability test. In the stress durability test, a set of 6 lap joints/bonds were connected in sequence by bolts and positioned vertically in a 90% relative humidity (RH) humidity cabinet. The temperature was maintained at 50° C. A force load of 2.4 kN was applied to the bond sequence. The stress durability test is a cyclic exposure test that is conducted for up to 45 cycles. Each cycle lasts for 24 hours. In each cycle, the bonds are exposed in the humidity cabinet for 22 hours, then immersed in 5% NaCl for 15 minutes, and finally air-dried for 105 minutes. Upon the breaking of three joints, the test is discontinued for the particular set of joints and is indicated as a first failure.

The exemplary aluminum alloy prepared according to Method 2 (left set of histograms) exhibited a lower cycles to failure number, indicating a lower bond durability than the exemplary aluminum alloy prepared according to Method 1 (right set of histograms). Mean cycles to failure is indicated by the left histogram in each set (hatched histogram) with first observed failure indicated by the right histogram in each set (cross-hatched).

Example 2: Controlling Migrant Element Concentrations Through Hot Rolling

Figure 7:
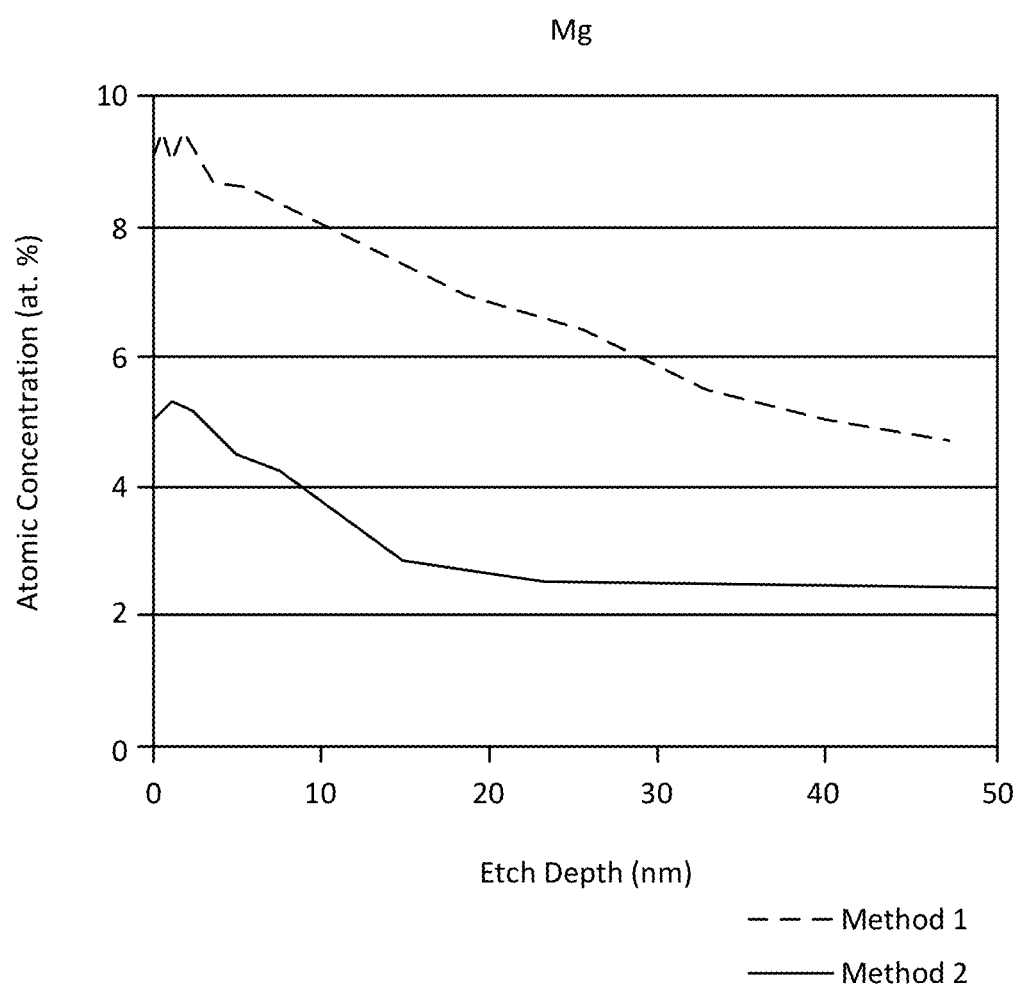
FIG. 7 is a graph showing the Mg content in exemplary aluminum alloy product surfaces provided according to exemplary methods described herein.

Two samples of a 6xxx series aluminum alloy were prepared by direct chill casting and were processed by homogenizing, hot rolling, cold rolling, solution heat treating, air quenching, etching using 7% R243, and pretreating with an adhesion promoter. The processing methods differed only by the hot rolling temperatures. The first alloy sample was hot rolled with a 390° C. hot mill exit temperature (Method 1) and the second alloy sample was hot rolled with a 330° C. hot mill exit temperature (Method 2). FIG. 7 shows the XPS depth profiling of the Mg content in the aluminum alloy product prepared by the high-temperature (Method 1) versus the low-temperature (Method 2) rolled surface. The aluminum alloy sample prepared according to Method 1 exhibited an enrichment ratio of 2 and an Mg concentration of 10% within the aluminum alloy subsurface. The aluminum alloy prepared according to Method 2 exhibited an enrichment ratio of 1.6 and an Mg concentration of 5% within the aluminum alloy subsurface.

Example 3: Controlling Migrant Element Concentrations Through Cleaning Sequence Two samples of a 6xxx series aluminum alloy were prepared by direct chill casting and were processed by homogenizing, hot rolling, cold rolling, solution heat treating, air quenching, etching using 7% R243, and pretreating with an adhesion promoter. The processing methods differed only by the order of the cleaning step. The first alloy sample was pre-cleaned before solution heat treatment (referred to as "Pre-clean→SHT") and the second alloy sample was solution heat treated and then pre-cleaned (referred to as "SHT→Pre-clean"). Both were followed by acid etching and pre-treatment application.

Figure 8:
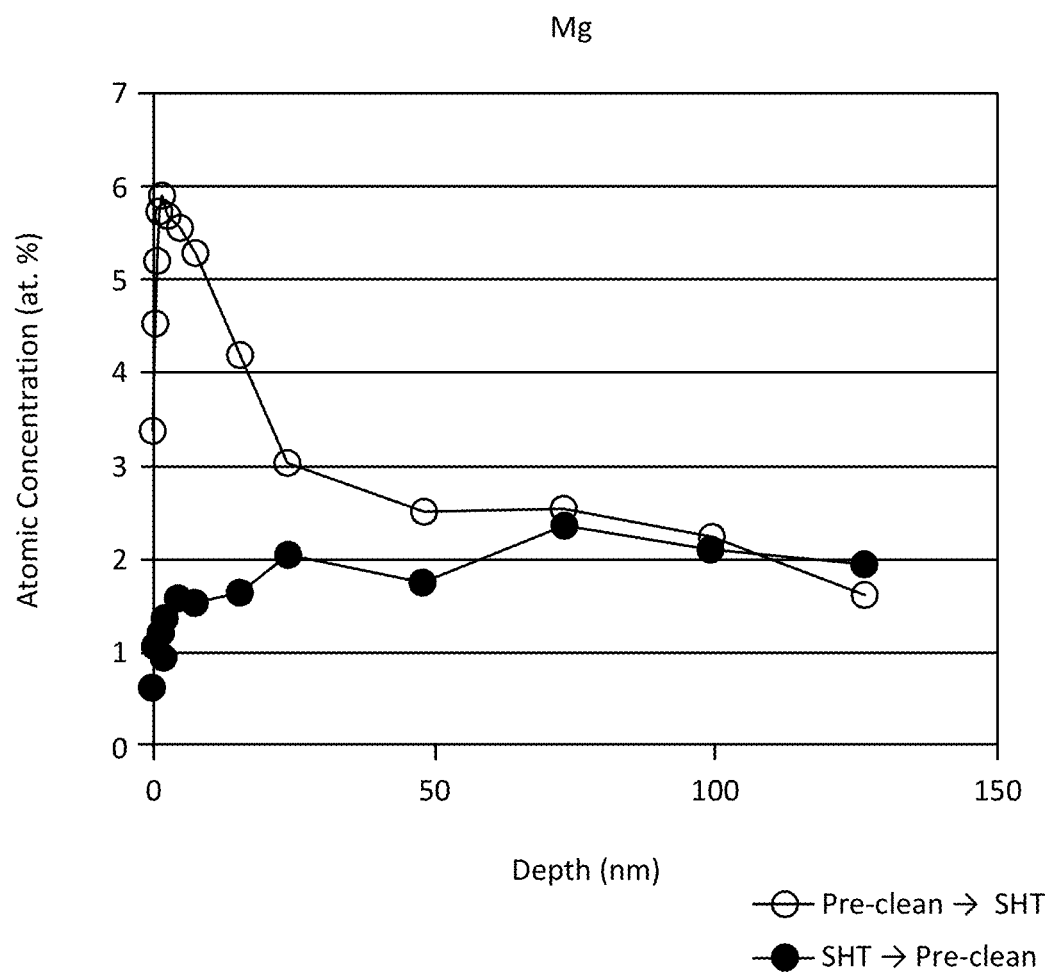
FIG. 8 is a graph showing the Mg content in exemplary aluminum alloy product surfaces provided according to exemplary methods described herein.

FIG. 8 presents XPS depth profile data of the Mg content in the aluminum alloy samples. The exemplary aluminum alloy cleaned before solutionizing (referred to as "Pre-clean→SHT") showed a 6% Mg concentration and a 2.4 enrichment ratio. The exemplary aluminum alloy cleaned after solutionizing (referred to as "SHT→Pre-clean") showed a 1.5% Mg concentration and a 0.7 enrichment ratio.

Example 4: Controlling Migrant Element Concentrations in a Continuously Cast Aluminum Alloy Aluminum alloy products were prepared according to continuous casting methods as described above. The products were cast at a width of 1450 mm and trimmed to 1300 mm. The products were then hot rolled, cold rolled to 5.1 mm, annealed at 400° C. for 2 hours, and cold rolled to 2 mm. The products were then solutionized and quenched under varying conditions, as shown in Table 1.

TABLE 1

| Sample ID | Solutionizing Temperature | Quenching Method |
| --- | --- | --- |
| Continuous Casting Condition 1 (C1) | 553° C. | Air |
| Continuous Casting Condition 2 (C2) | 553° C. | Water |
| Continuous Casting Condition 3 (C3) | 544° C. | Water |
| Continuous Casting Condition 4 (C4) | 560° C. | Air |
| Direct Chill Casting Condition (D1) | 560° C. | Air |

Surfaces of the aluminum alloy sheets were analyzed by glow discharge optical emission spectroscopy (GDOES). Amounts of magnesium (Mg), silicon (Si), copper (Cu), manganese (Mn), chromium (Cr), and iron (Fe) were analyzed. Measurements were conducted from the surface to a depth of 2.0 µm. Exemplary continuously cast aluminum alloy sheets are referred to as "C1," "C2," "C3," and "C4."

All samples were pretreated with an adhesion promoter (indicated by "PT"). A first surface of the aluminum alloy sheets (e.g., a surface contacting the belt of the caster) is indicated by "label." A second analyzed surface (e.g., a surface not contacting the belt of the caster) is indicated by "unlabel." Comparative DC cast aluminum alloys (referred to as "D1") were analyzed for comparison and effectiveness of continuously casting aluminum alloys for controlled enrichment of the surfaces of the aluminum alloy sheets.

Figure 9A:
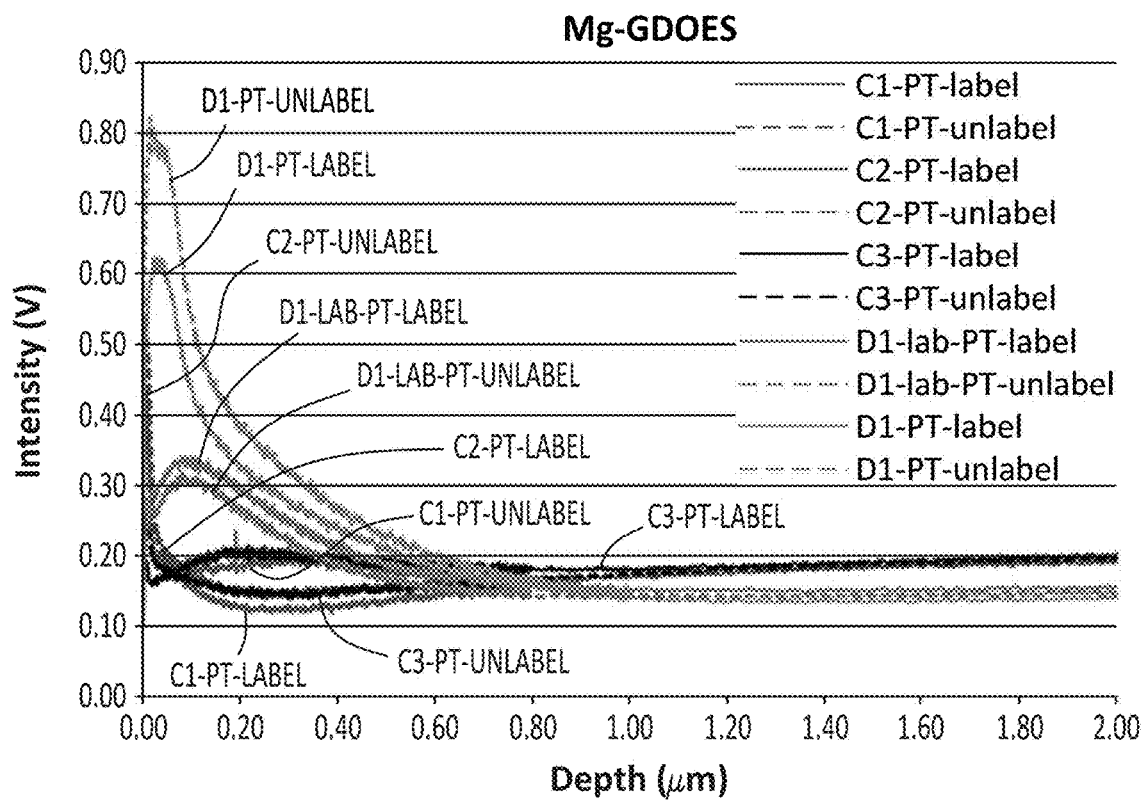
FIG. 9A is a graph showing glow discharge optical emission spectroscopy of Mg in the subsurface and bulk portions of an aluminum alloy produced by exemplary methods described herein.
Figure 9B:
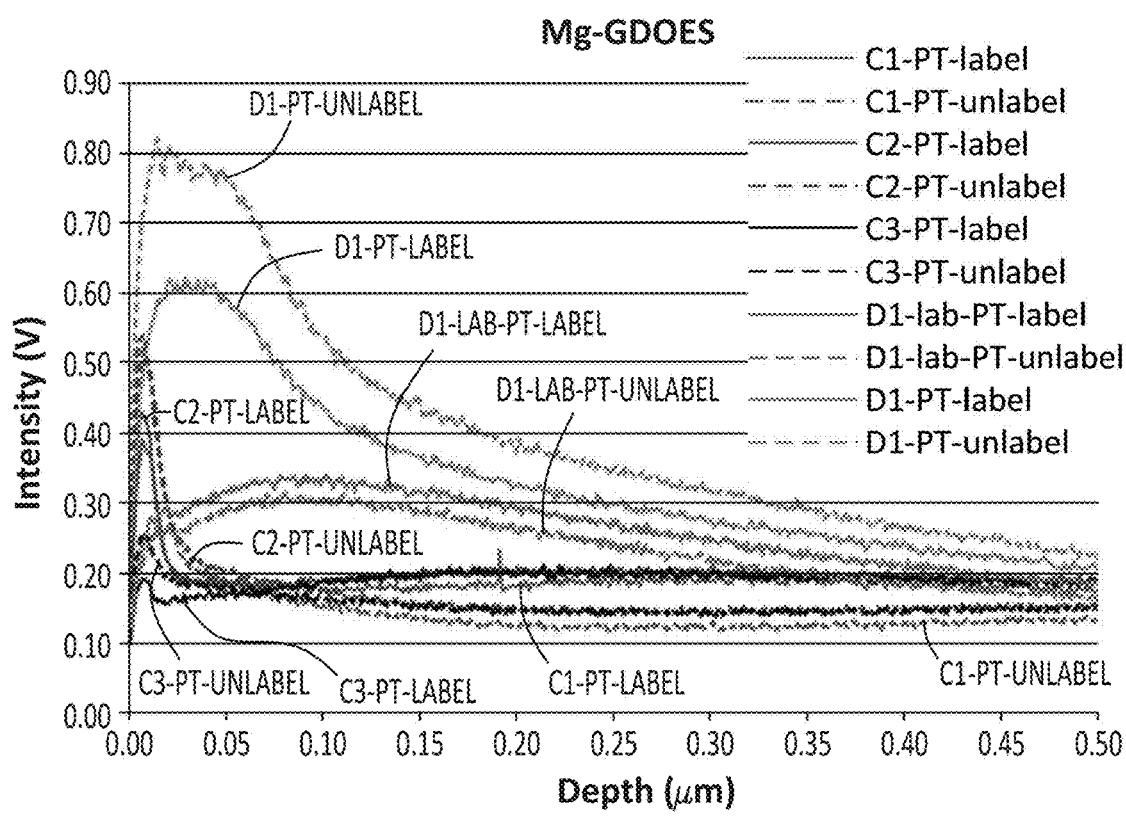
FIG. 9B is a graph showing glow discharge optical emission spectroscopy of Mg in the subsurface and bulk portions of an aluminum alloy produced by exemplary methods described herein.

FIGS. 9A and 9B show GDOES data for Mg content near the surfaces of aluminum alloy sheets (e.g., from the surface to a depth of 2.0 µm). FIG. 9A shows data for Mg content extending into the bulk of the aluminum alloy sheet. FIG. 9B shows data for Mg content considered to be found in the surface of the aluminum alloy sheet (e.g., from the surface to a depth of 0.5 µm). FIGS. 9A and 9B show a high diffusion of Mg to the surface of the aluminum alloy sheets produced by direct chill casting (samples D1 and D1-lab). FIGS. 9A and 9B show decreased diffusion of Mg to the surface of the aluminum alloy sheets, and a uniform distribution of Mg from the surface into the bulk of the aluminum alloy sheets, produced by the exemplary continuous casting method described above. A lower concentration of Mg near the surface of the aluminum alloy sheets is desirable for bonding and joining applications.

Figure 10A:
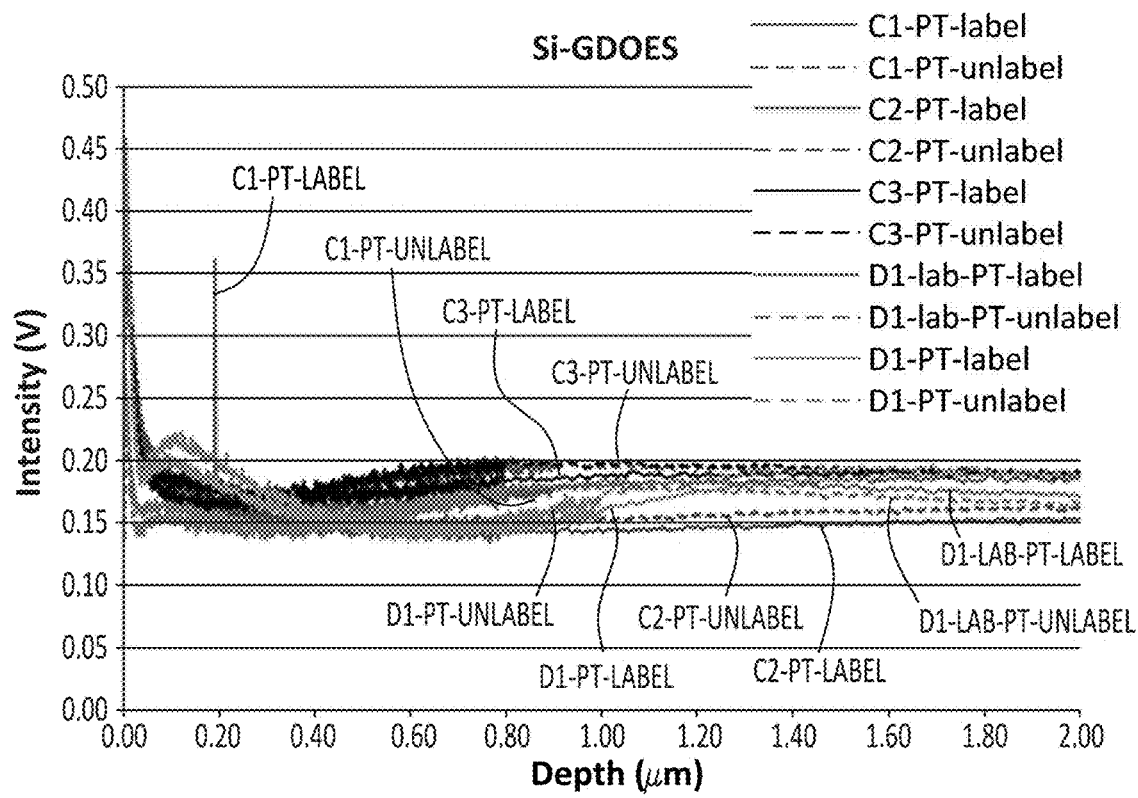
FIG. 10A is a graph showing glow discharge optical emission spectroscopy of Si in the subsurface and bulk portions of an aluminum alloy produced by exemplary methods described herein.
Figure 10B:
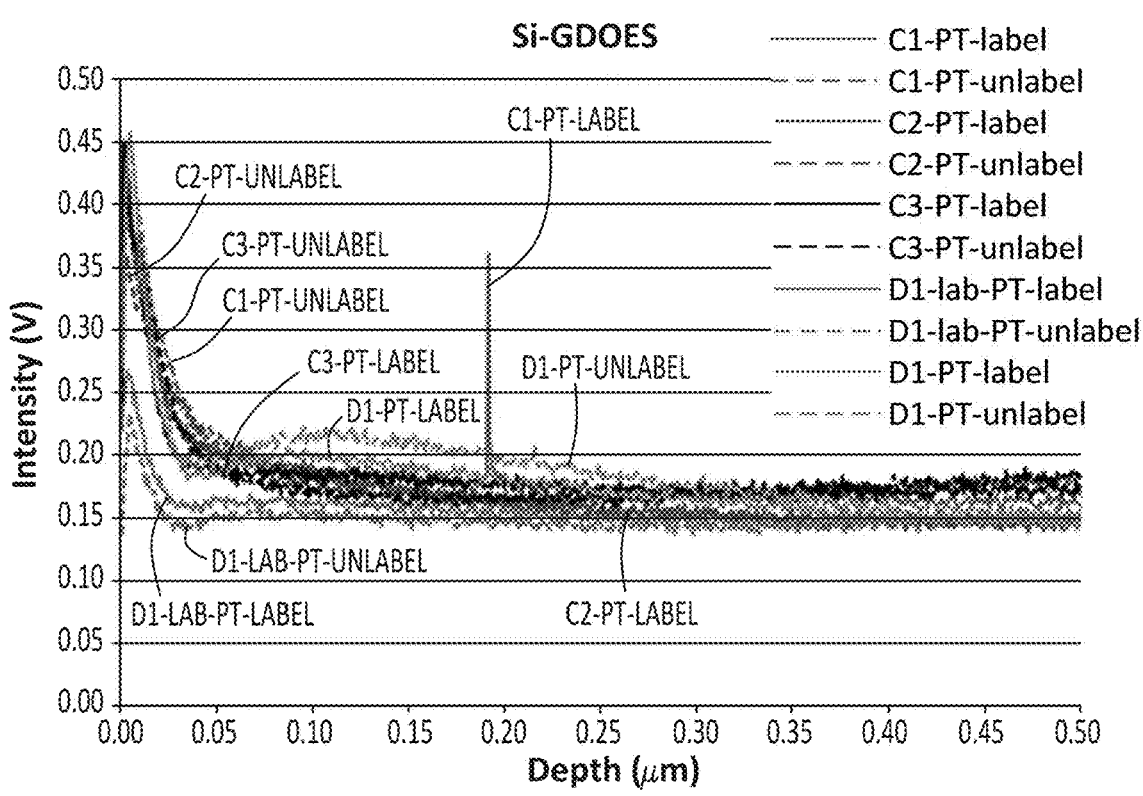
FIG. 10B is a graph showing glow discharge optical emission spectroscopy of Si in the subsurface and bulk portions of an aluminum alloy produced by exemplary methods described herein.

FIGS. 10A and 10B show GDOES data for Si content near the surfaces of aluminum alloy sheets (e.g., from the surface to a depth of 2.0 µm). FIG. 10A shows data for Si content extending into the bulk of the aluminum alloy sheet. FIG. 10B shows data for Si content considered to be found in the surface of the aluminum alloy sheet (e.g., from the surface to a depth of 0.5 µm). FIGS. 10A and 10B show a high diffusion of Si to the surface of the aluminum alloy sheets produced by direct chill casting (samples D1 and D1-lab). FIGS. 10A and 10B show decreased diffusion of Si to the surface of the aluminum alloy sheets, and a uniform distribution of Si from the surface into the bulk of the aluminum alloy sheets produced by the exemplary continuous casting method described above.

Figure 11A:
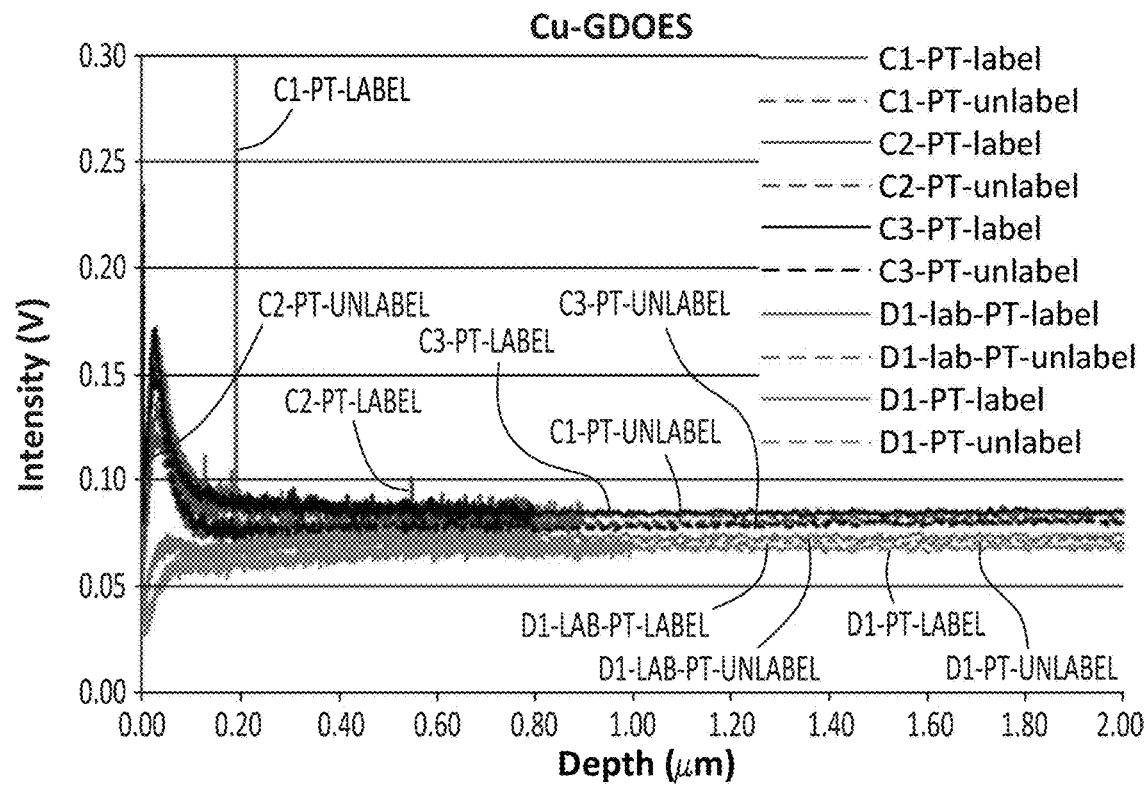
FIG. 11A is a graph showing glow discharge optical emission spectroscopy of Cu in the subsurface and bulk portions of an aluminum alloy produced by exemplary methods described herein.
Figure 11B:
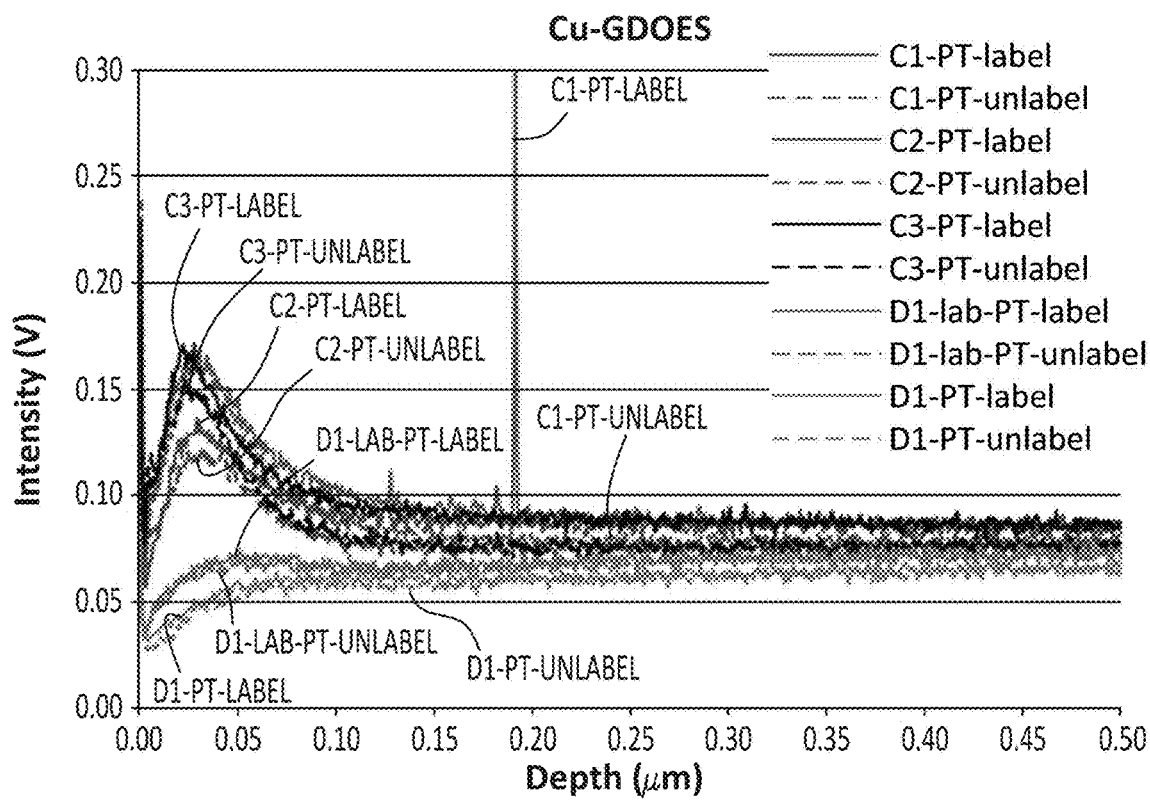
FIG. 11B is a graph showing glow discharge optical emission spectroscopy of Cu in the subsurface and bulk portions of an aluminum alloy produced by exemplary methods described herein.

FIGS. 11A and 11B show GDOES data for Cu content near the surfaces of aluminum alloy sheets (e.g., from the surface to a depth of 2.0 µm). FIG. 11A shows data for Cu content extending into the bulk of the aluminum alloy sheet. FIG. 11B shows data for Cu content considered to be found in the surface of the aluminum alloy sheet (e.g., from the surface to a depth of 0.5 µm). FIGS. 11A and 11B show a low diffusion of Cu to the surface of the aluminum alloy sheets produced by direct chill casting (samples D1 and D1-lab). FIGS. 11A and 11B show increased diffusion of Cu to the surface of the aluminum alloy sheets produced by the exemplary continuous casting method described above. Controlled diffusion of Cu to the surface of the aluminum alloy sheets can be desirable for bonding and joining applications.

Figure 12A:
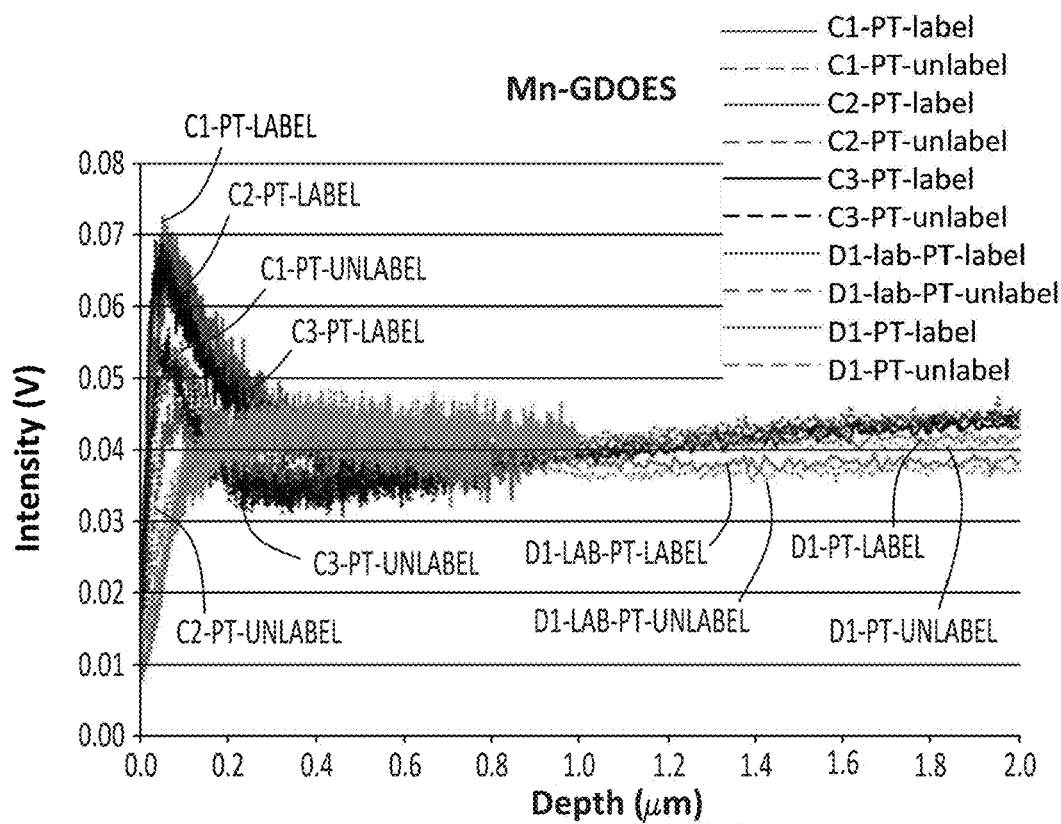
FIG. 12A is a graph showing glow discharge optical emission spectroscopy of Mn in the subsurface and bulk portions of an aluminum alloy produced by exemplary methods described herein.
Figure 12B:
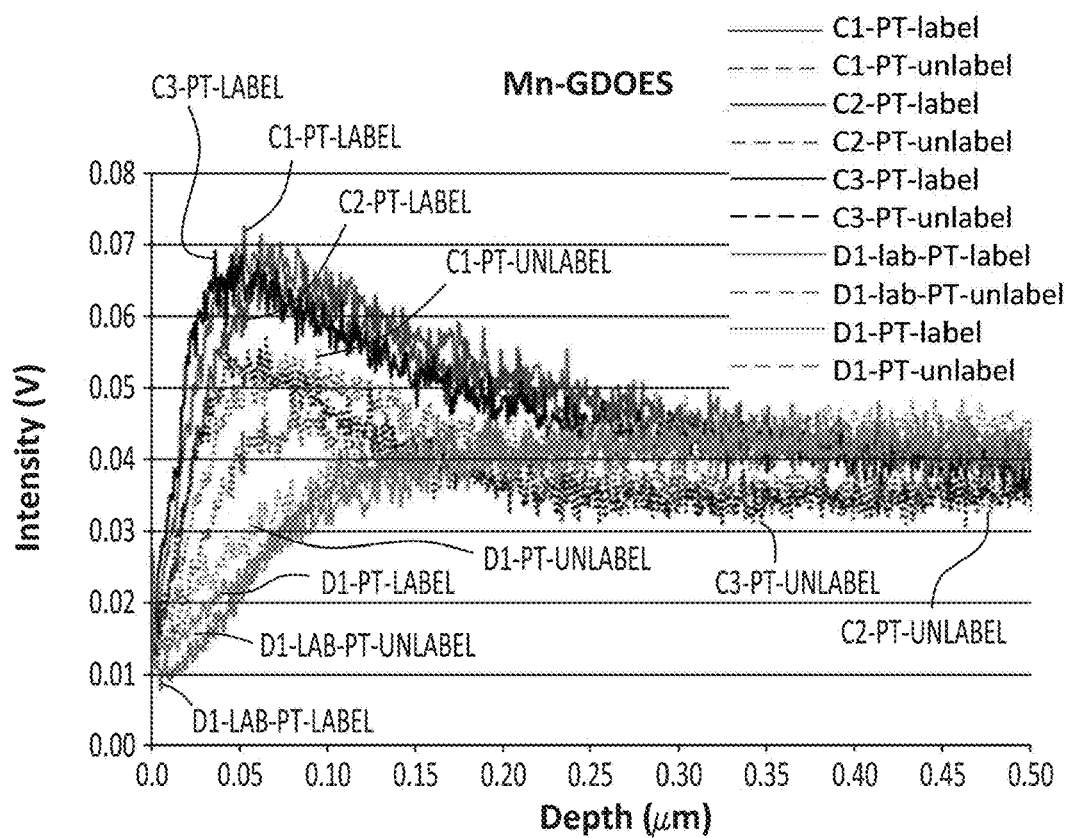
FIG. 12B is a graph showing glow discharge optical emission spectroscopy of Mn in the subsurface and bulk portions of an aluminum alloy produced by exemplary methods described herein.

FIGS. 12A and 12B show GDOES data for Mn content near the surfaces of aluminum alloy sheets (e.g., from the surface to a depth of 2.0 μm). FIG. 12A shows data for Mn content extending into the bulk of the aluminum alloy sheet. FIG. 12B shows data for Mn content considered to be found in the surface of the aluminum alloy sheet (e.g., from the surface to a depth of 0.5 μm). FIGS. 12A and 12B show no diffusion of Mn to the surface of the aluminum alloy sheets produced by direct chill casting (samples D1 and D1-lab). FIGS. 12A and 12B show increased diffusion of Mn to the surface of the aluminum alloy sheets produced by the exemplary continuous casting method described above.

Figure 13A:
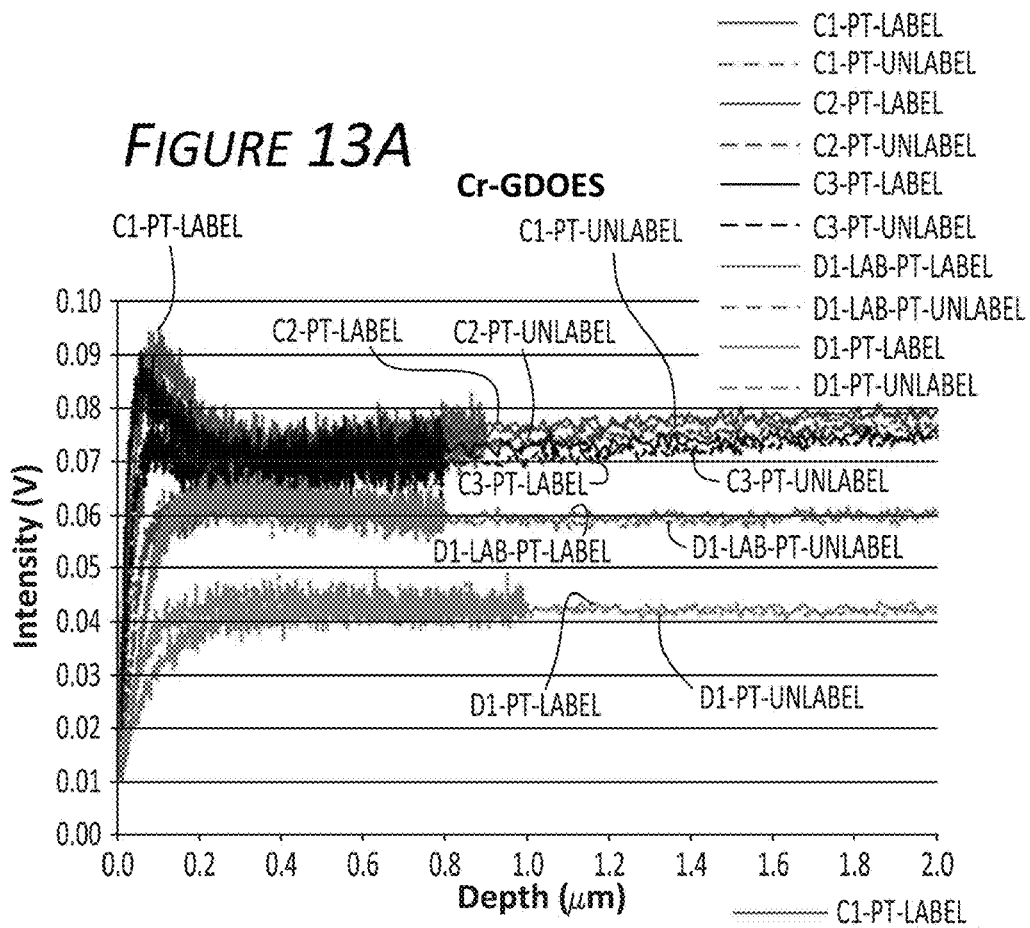
FIG. 13A is a graph showing glow discharge optical emission spectroscopy of Cr in the subsurface and bulk portions of an aluminum alloy produced by exemplary methods described herein.
Figure 13B:
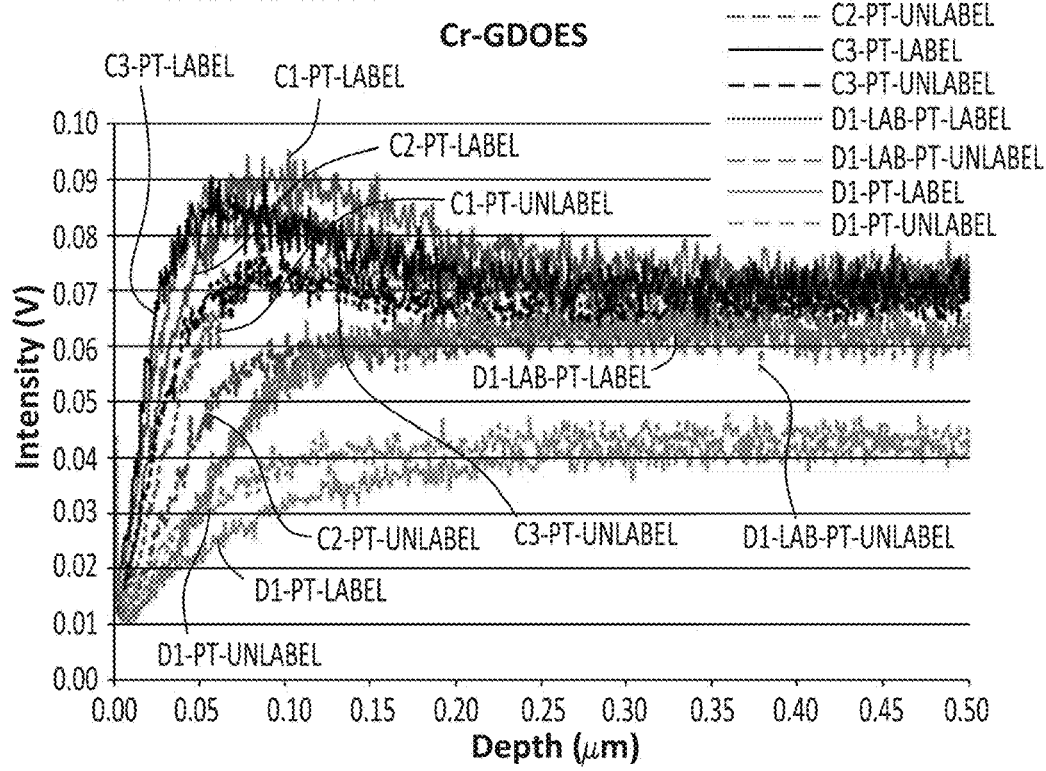
FIG. 13B is a graph showing glow discharge optical emission spectroscopy of Cr in the subsurface and bulk portions of an aluminum alloy produced by exemplary methods described herein.

FIGS. 13A and 13B show GDOES data for Cr content near the surfaces of aluminum alloy sheets (e.g., from the surface to a depth of 2.0 μm). FIG. 13A shows data for Cr content extending into the bulk of the aluminum alloy sheet. FIG. 13B shows data for Cr content considered to be found in the surface of the aluminum alloy sheet (e.g., from the surface to a depth of 0.5 μm). FIGS. 13A and 13B show no diffusion of Cr to the surface of the aluminum alloy sheets produced by direct chill casting (samples D1 and D1-lab). FIGS. 13A and 13B show increased diffusion of Cr to the surface of the aluminum alloy sheets produced by the exemplary continuous casting method described above. Controlled diffusion of Cr to the surface of the aluminum alloy sheets can be desirable for bonding and joining applications. Controlled diffusion of Cr to the surface of the aluminum alloy sheets can be desirable for corrosion resistance.

Figure 14A:
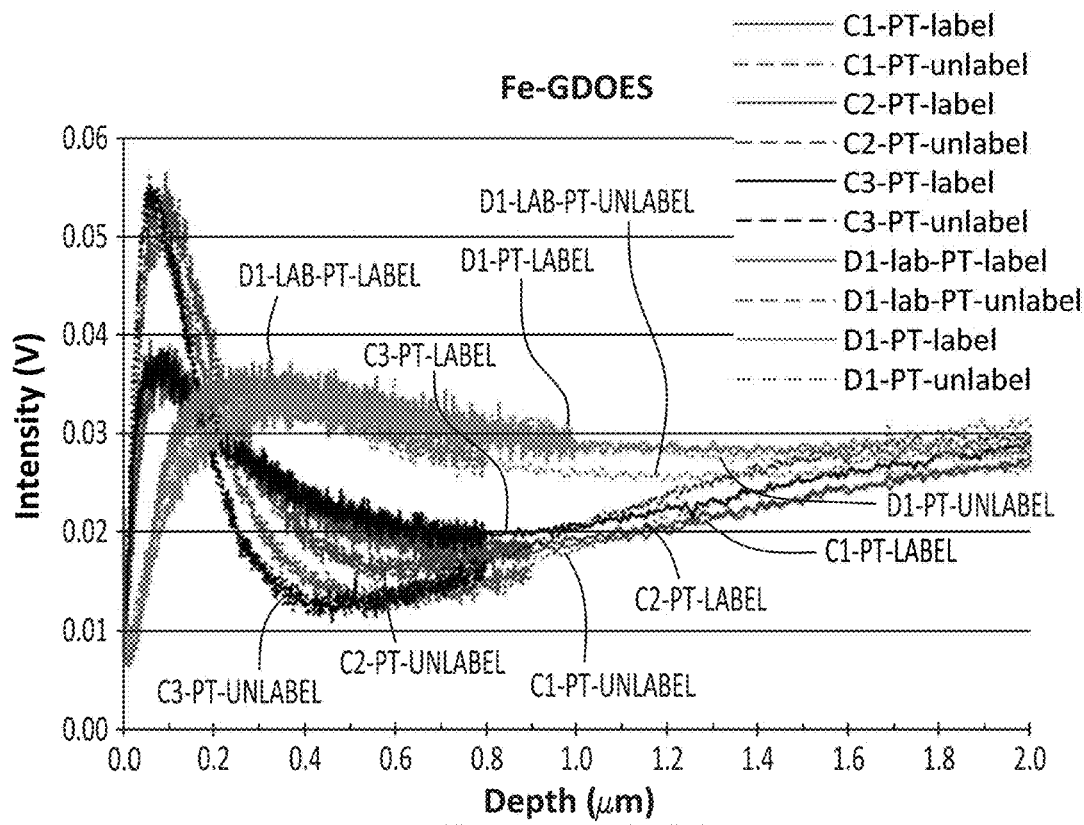
FIG. 14A is a graph showing glow discharge optical emission spectroscopy of Fe in the subsurface and bulk portions of an aluminum alloy produced by exemplary methods described herein.
Figure 14B:
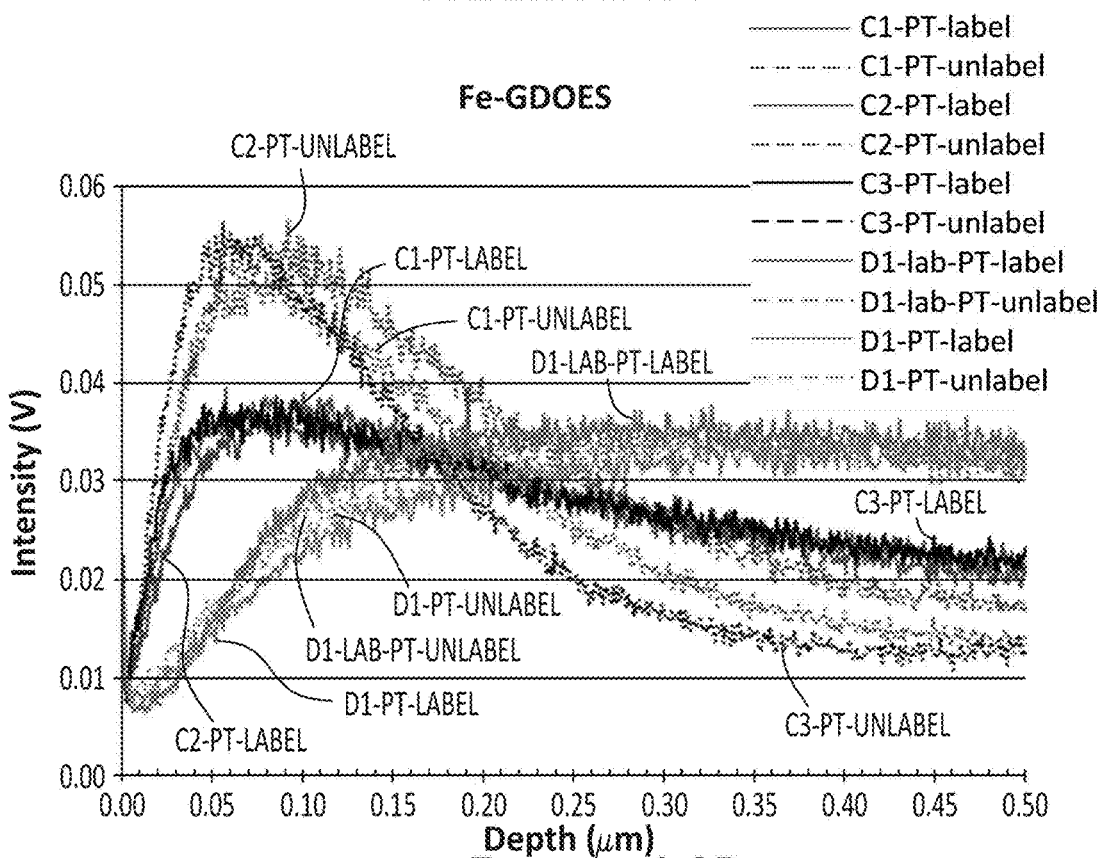
FIG. 14B is a graph showing glow discharge optical emission spectroscopy of Fe in the subsurface and bulk portions of an aluminum alloy produced by exemplary methods described herein.

FIGS. 14A and 14B show GDOES data for Fe content near the surfaces of aluminum alloy sheets (e.g., from the surface to a depth of 2.0 μm). FIG. 14A shows data for Fe content extending into the bulk of the aluminum alloy sheet. FIG. 14B shows data for Fe content considered to be found in the surface of the aluminum alloy sheet (e.g, from the surface to a depth of 0.5 μm). FIGS. 14A and 14B show no diffusion of Fe to the surface of the aluminum alloy sheets produced by direct chill casting (samples D1 and D1-lab). FIGS. 14A and 14B show increased diffusion of Fe to the surface of the aluminum alloy sheets produced by the exemplary continuous casting method described above.

Bond durability test results for the exemplary continuously cast aluminum alloy sheets and the comparative direct chill cast aluminum alloy sheets were performed according to the procedure described in Example 2. For this experiment, the completion of 45 cycles indicates that the set of joints passed the bond durability test. The test results are shown below in Table 2. In Table 2, each of the joints are numbered 1 through 6, where joint 1 is the top joint and joint 6 is the bottom joint when oriented vertically. The number in the cells, except for "45," indicates the number of successful cycles before a break. The number "45 in a cell indicates that the joints remained intact for 45 cycles. The results are summarized in Table 2 below:

TABLE 2

| Trial | Sample | Surface Finishing | Bond Durability Test Coupon Arrangement | | | | | |
|---|---|---|---|---|---|---|---|---|
| | | | 1 Top | 2 | 3 | 4 | 5 | 6 Bottom |
| 1 | C1 | Alkaline and acid etch | 45 | 45 | 45 | 45 | 45 | 45 |
| 2 | C2 | Alkaline and acid etch | 45 | 45 | 45 | 45 | 45 | 45 |
| 3 | C3 | Alkaline and acid etch | 45 | 45 | 45 | 45 | 45 | 45 |
| 4 | C1 | Strong alkaline and acid etch | 45 | 45 | 45 | 45 | 45 | 45 |
| 5 | C1 | Acid etch | 45 | 45 | 45 | 45 | 45 | 45 |
| 6 | C4 | Alkaline and acid etch | 45 | 45 | 45 | 45 | 45 | 45 |
| 7 | D1 | Acid etch | 20 | 21 | 21 | 21 | 21 | 21 |

For Trials 1, 2, and 3, test coupons were cut from the exemplary continuously cast aluminum alloy sheets. The test coupons were subjected to alkaline and acid etching to clean and prepare the surfaces for bonding. Bonding was performed by pretreating the aluminum alloy sheets with an adhesion promoter and bonding the test coupons with an adhesive. Bonded test coupons were exposed to a humid environment for up to 45 duty cycles.

For Trial 4, test coupons were cut from the exemplary continuously cast aluminum alloy sheets. The test coupons were subjected to a strong alkaline cleaning and acid etching to clean and prepare the surfaces for bonding. Bonding was performed by pretreating the aluminum alloy sheets with an adhesion promoter and bonding the test coupons with an adhesive. Bonded test coupons were exposed to a humid environment for up to 45 duty cycles.

For Trial 5, test coupons were cut from the exemplary continuously cast aluminum alloy sheets. The test coupons were subjected to an acid etching to clean and prepare the surfaces for bonding. Bonding was performed by pretreating the aluminum alloy sheets with an adhesion promoter and bonding the test coupons with an adhesive. Bonded test coupons were exposed to a humid environment for up to 45 duty cycles.

For Trial 6, test coupons were cut from the exemplary continuously cast aluminum alloy sheets. The test coupons were solution heat treated in the lab furnace and then subjected to alkaline and acid etching to clean and prepare the surface for bonding. Bonding was performed by pretreating the aluminum alloy sheets with an adhesion promoter and bonding the test coupons with an adhesive. Bonded test coupons were exposed to a humid environment for up to 45 duty cycles.

For Trial 7, test coupons were cut from the comparative direct chill cast aluminum alloy sheets. The test coupons were subjected to acid etching to prepare the surface for bonding. Bonding was performed by pretreating the aluminum alloy sheets with an adhesion promoter and bonding the test coupons with an adhesive. Bonded test coupons were exposed to a humid environment for up to 45 duty cycles.

The exemplary continuously cast aluminum alloy sheets having controlled diffusion of Mn and Cr to the surface of the aluminum alloy sheets demonstrated excellent bond durability, surviving 45 test cycles without failure. The comparative direct chill cast aluminum alloy sheets having Mg diffused to the surface demonstrated poor bond durability.

Example 5: Resistance Spot Welding (RSW) Electrode Life after Etching with Various Etchants Four samples of an AA5xxx series aluminum alloy were prepared by direct chill casting and were processed by homogenizing, hot rolling, cold rolling to a gauge of 1.5 mm, solution heat treating, air quenching, and etching using four different etchants. The etchants employed were (i) a mixture of phosphoric and sulfuric acid (referred to as solution "A" in Table 3 below), (ii) a mixture of sulfuric acid and ammonium fluoride (referred to as solution "B" in Table 3 below), (iii) a mixture of sulfuric acid and iron (III) sulfate hydrate (referred to as solution "C" in Table 3 below), and (iv) sodium hydroxide (referred to as solution "D" in Table 3 below). Sodium hydroxide (NaOH) was employed as a comparative control etchant due to its ability to remove any oxide layers from the subsurface.

TABLE 3

Etching Conditions and Results

| Etch Solution | Etch Reference | Dwell Time (s) | Temperature (° C.) | Etch Weight (g/m$^3$) Average | Std. Dev. |
|---|---|---|---|---|---|
| A | 1 | 2 | 70 | 0.226 | 0.022 |
| A | 2 | 5 | 70 | 0.277 | 0.023 |
| A | 3 | 10 | 70 | 0.345 | 0.016 |
| A | 4 | 15 | 70 | 0.441 | 0.017 |
| B | 5 | 2 | 60 | 0.679 | 0.057 |
| B | 6 | 5 | 60 | 1.148 | 0.064 |
| B | 7 | 10 | 60 | 1.783 | 0.036 |
| B | 8 | 15 | 60 | 2.406 | 0.078 |
| C | 9 | 2 | 67 | 0.209 | 0.018 |
| C | 10 | 5 | 67 | 0.242 | 0.008 |
| C | 11 | 10 | 67 | 0.308 | 0.006 |
| C | 12 | 15 | 67 | 0.316 | 0.025 |
| D | 13 | 5* | 65 | 0.446 | 0.086 |
| D | 14 | 20* | 65 | 1.508 | 0.558 |
| D | 15 | 30* | 65 | 3.162 | 0.617 |
| D | 16 | 60* | 65 | 5.931 | 0.695 |

*Additional desmutting was employed after etching.

Figure 15:
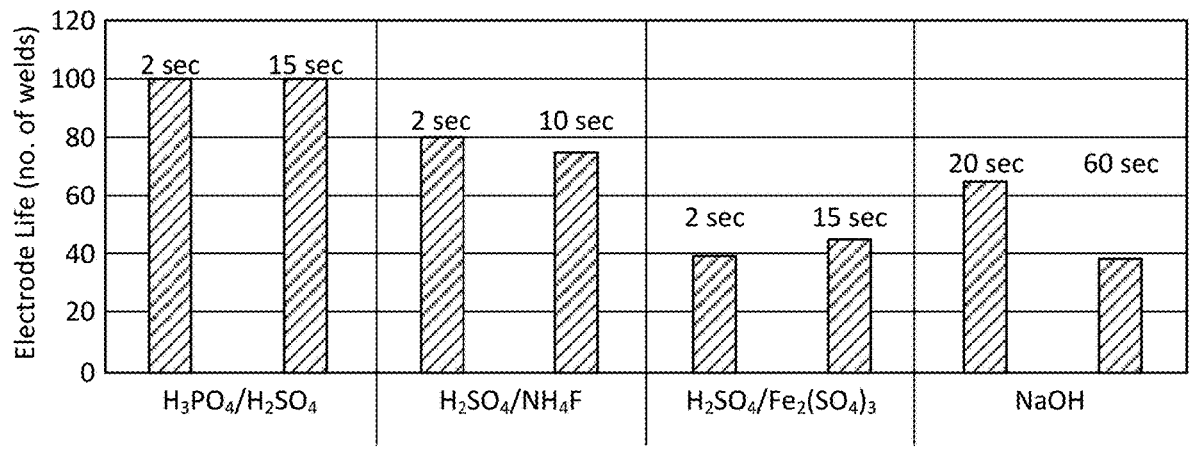
FIG. 15 is a graph comparing resistance spot welding electrode tip life after welding for various aluminum alloy samples according to certain aspects of the present disclosure.

FIG. 15 is a graph showing the RSW electrode service lifetime for RSW electrodes employed to weld aluminum alloy samples after etching in the various etchant solutions described above. Solution D (NaOH) was employed as a comparative control etchant as it is known in the art to completely remove a deformed oxide layer present on a rolled aluminum alloy product, particularly when the dwell time is at least 20 seconds (e.g., Etches 15 and 16 in Table 3). As evident in the graph of FIG. 15, Solution A (a mixture of phosphoric acid and sulfuric acid ($H_3PO_4/H_2SO_4$)) provided a RSW electrode lifetime of 100 welds, which is greater than the current industry demand of 80 welds. Additionally, in the example of FIG. 15, the mixture of $H_3PO_4/H_2SO_4$ provided an atomic concentration ratio of P/Mg of about 0.65 in a subsurface extending to a depth of about 83 μm from the surface of the aluminum alloy. Solution B (a mixture of sulfuric acid and ammonium fluoride ($H_2SO_4/NH_4F$)) provided a RSW electrode lifetime of 80 welds when etched for 2 seconds, however a longer etch dwell time resulted in a loss of electrode lifetime. Solution C (a mixture of sulfuric acid and iron (III) sulfate hydrate ($H_2SO_4/Fe_2(SO_4)_3$)) exhibited a poor performance, significantly reducing the RSW electrode lifetime. Thus, incorporating P into a Mg-containing subsurface significantly increased the RSW electrode lifetime.

Figure 16:
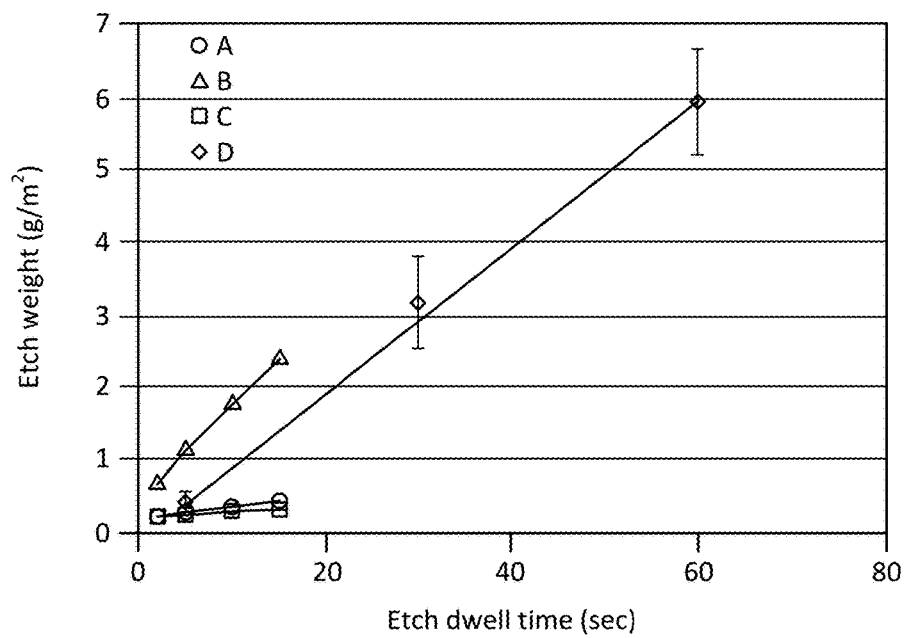
FIG. 16 is a graph showing amount of material removed (referred to as "etch weight") during etching of aluminum alloys according to certain aspects of the present disclosure.

FIG. 16 is a graph showing etch weight (i.e., amount of material removed from the surface of the aluminum alloys during etching) for each etch performed (Etches 1-16 in Table 3). Evident in the graph of FIG. 16 and described above, Solution D was able to provide the greatest etch weight and was thus employed as a comparative solution. Of the etch solutions A, B, and C, Solution B provided the greatest etch weight and Solutions A and C provided similar etch weights, both less than that provided by Solution B. Referring to FIG. 15, Solution B provided the greatest etch weight (see FIG. 16) but did not exhibit improvement to the RSW electrode lifetime. Surprisingly, solutions A and C provided similar etch weights but also provided significantly different RSW electrode lifetimes. Particularly, Solution A (containing P) provided a significantly improved RSW electrode lifetime and Solution C was detrimental to the RSW electrode lifetime. Thus, removal of the deformed oxide layer alone is insufficient to improve the RSW electrode lifetime. Evident in FIGS. 15 and 16, removal of a portion of the deformed oxide layer, and a presence of a residual P concentration, can work in concert to improve the RSW electrode lifetime.

Figure 17:
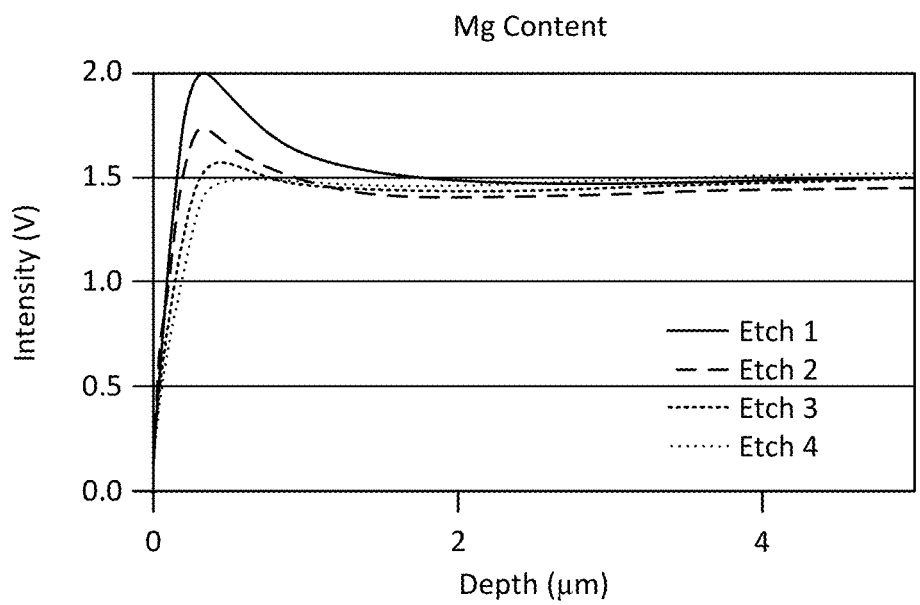
FIG. 17 is a graph showing glow-discharge optical emission spectroscopy (GDOES) of Mg in aluminum alloys according to certain aspects of the present disclosure.
Figure 18:
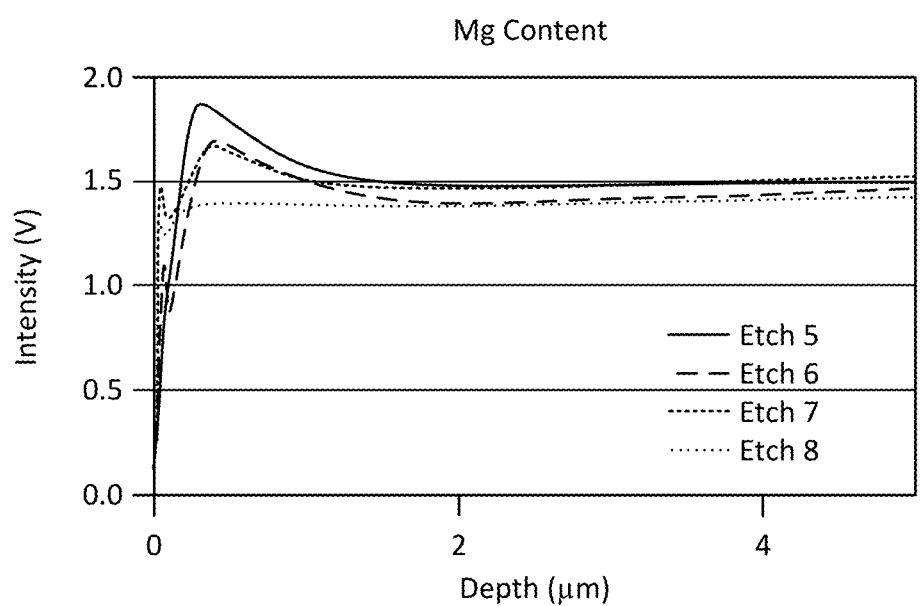
FIG. 18 is a graph showing glow-discharge optical emission spectroscopy (GDOES) of Mg in aluminum alloys according to certain aspects of the present disclosure.
Figure 19:
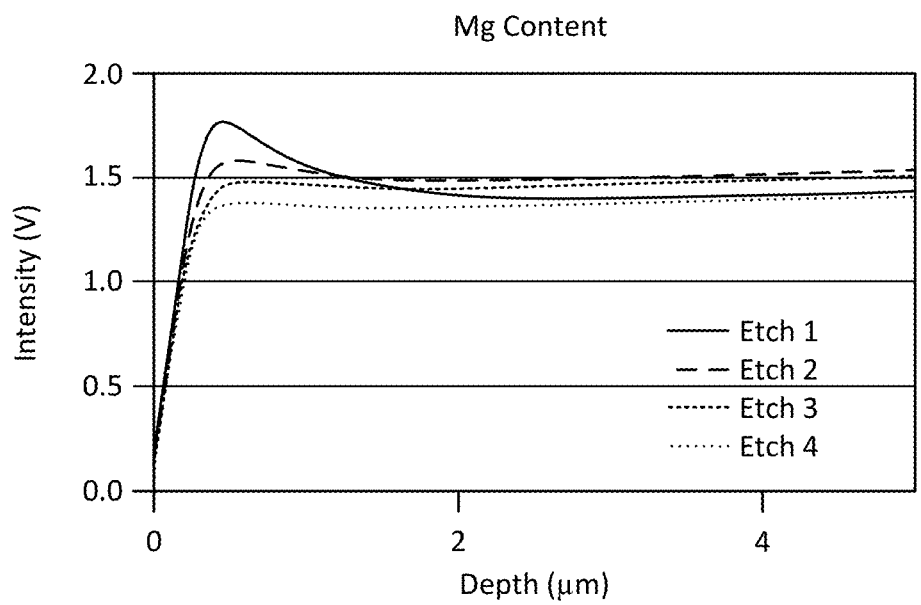
FIG. 19 is a graph showing glow-discharge optical emission spectroscopy (GDOES) of Mg in aluminum alloys according to certain aspects of the present disclosure.

FIGS. 17-20 are graphs showing glow discharge optical emission spectroscopy (GDOES) data for Mg content near the surface of the aluminum alloy samples described above (e.g., from the surface to a depth of 5.0 μm). FIG. 17 shows data for Mg content extending into the bulk of the aluminum alloy sample etched with Solution A. FIG. 18 shows data for Mg content extending into the bulk of the aluminum alloy sample etched with Solution B. FIG. 19 shows data for Mg content extending into the bulk of the aluminum alloy sample etched with Solution C.

Figure 20:
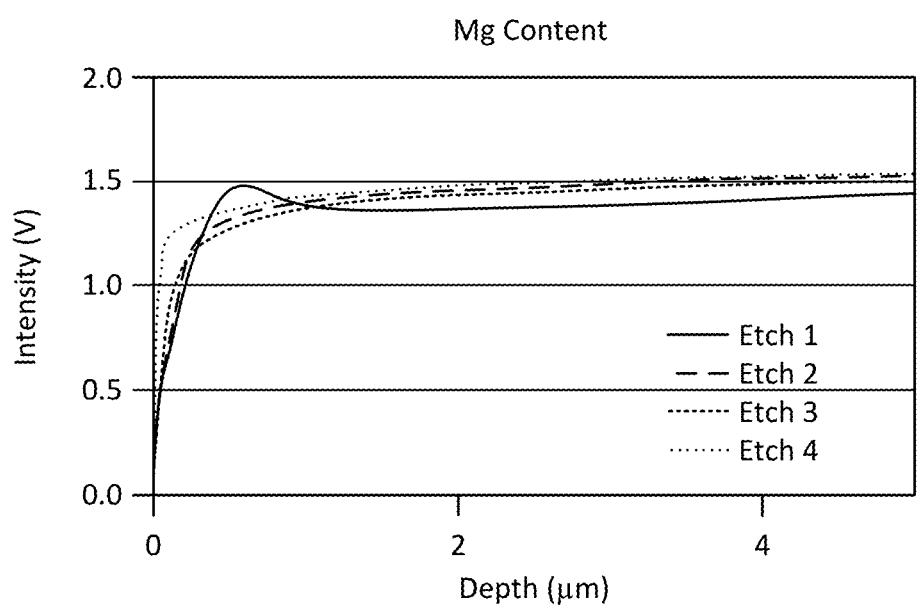
FIG. 20 is a graph showing glow-discharge optical emission spectroscopy (GDOES) of Mg in aluminum alloys according to certain aspects of the present disclosure.

FIG. 20 shows data for Mg content extending into the bulk of the aluminum alloy sample etched with Solution D. Not to be bound by theory, a Mg concentration found within the subsurface portion of the aluminum alloy samples can negatively impact the RSW electrode lifetime. Surprisingly, when the aluminum alloy samples were etched with Solution A (containing P), RSW electrode lifetime was significantly improved even though the sample contained a concentration of Mg within the subsurface of the aluminum alloy. The aluminum alloy sample etched with comparative Solution D (FIG. 20) exhibited nearly complete removal of Mg near the surface of the aluminum alloy, further indicating that the presence of Mg and/or a Mg containing compound (e.g., MgO) after etching with a P containing compound provides a significantly improved RSW electrode lifetime.

Further, FIG. 19 shows the GDOES data for the aluminum alloy sample etched with Solution C. Evident in the graph of FIG. 19, Mg and/or Mg containing compounds are present near the surface of the aluminum alloy samples; however, Solution C did not contain P and was detrimental to the RSW electrode lifetime (see FIG. 15). Thus, the presence of Mg and/or Mg containing compounds near the surface of the aluminum alloy without having P present in the etching solution can be detrimental to the RSW electrode lifetime.

Example 6: Aluminum Alloy Surface Properties after Etching with Various Etchants In some aspects, alloying element and/or alloying element oxide particle size and morphology can affect surface properties of the aluminum alloy product. For example, FIGS. 21, 22, 23, and 24 present scanning electron microscope (SEM) micrographs of the aluminum alloy samples described above. FIGS. 21A-D show SEM micrographs of the aluminum alloy samples etched using Solution A. FIGS.

Figure 21A:
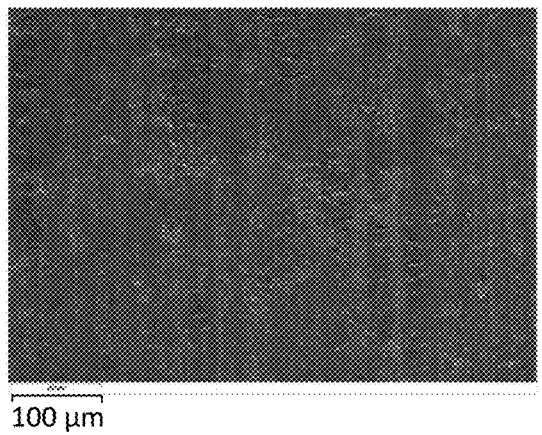
FIG. 21A is a scanning electron micrograph showing a surface portion of an aluminum alloy according to certain aspects of the present disclosure.
Figure 21B:
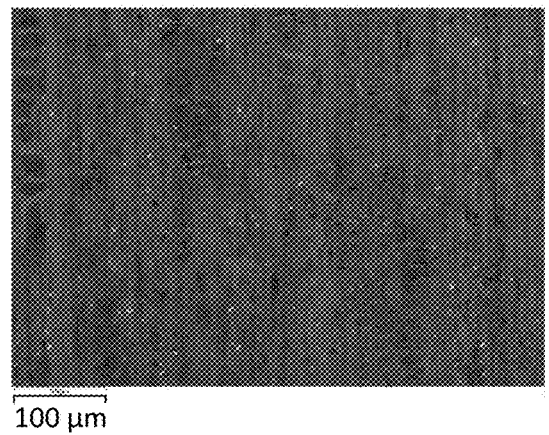
FIG. 21B is a scanning electron micrograph showing a surface portion of an aluminum alloy according to certain aspects of the present disclosure.
Figure 21C:
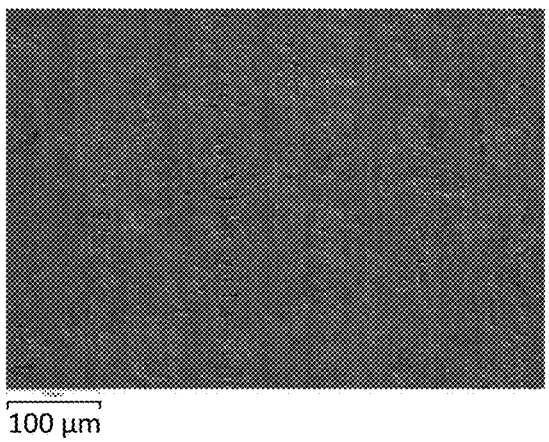
FIG. 21C is a scanning electron micrograph showing a surface portion of an aluminum alloy according to certain aspects of the present disclosure.
Figure 21D:
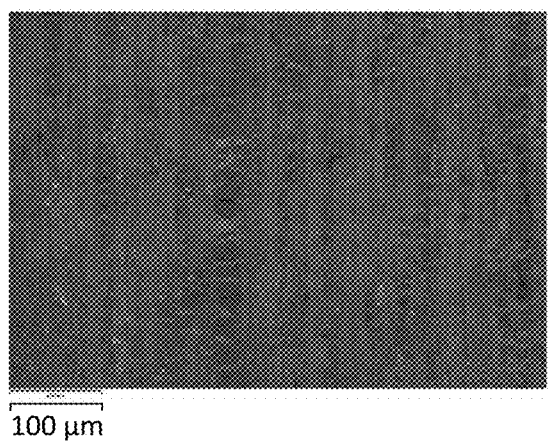
FIG. 21D is a scanning electron micrograph showing a surface portion of an aluminum alloy according to certain aspects of the present disclosure.
Figure 22A:
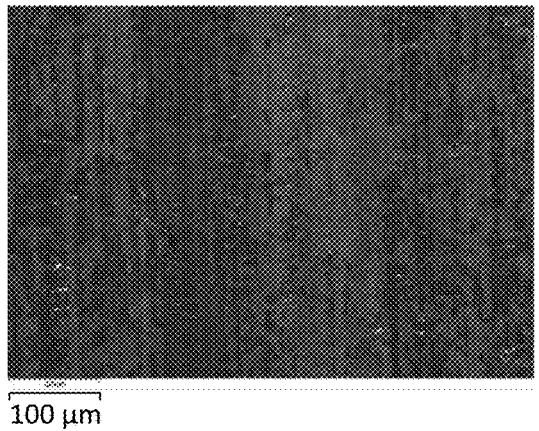
FIG. 22A is a scanning electron micrograph showing a surface portion of an aluminum alloy according to certain aspects of the present disclosure.
Figure 22B:
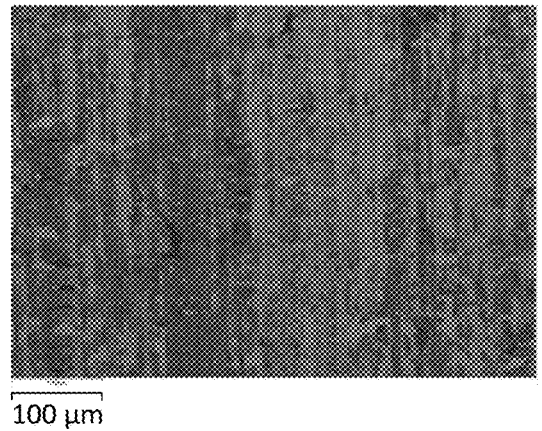
FIG. 22B is a scanning electron micrograph showing a surface portion of an aluminum alloy according to certain aspects of the present disclosure.
Figure 22C:
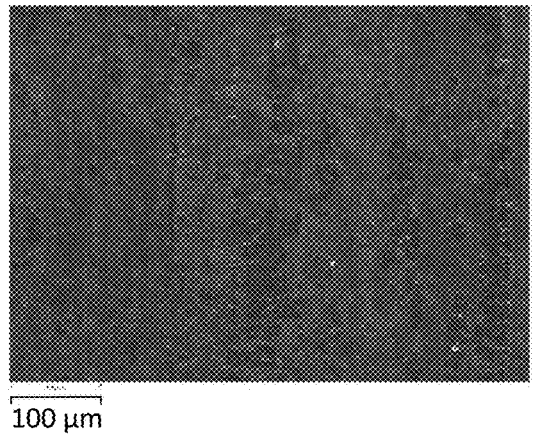
FIG. 22C is a scanning electron micrograph showing a surface portion of an aluminum alloy according to certain aspects of the present disclosure.
Figure 22D:
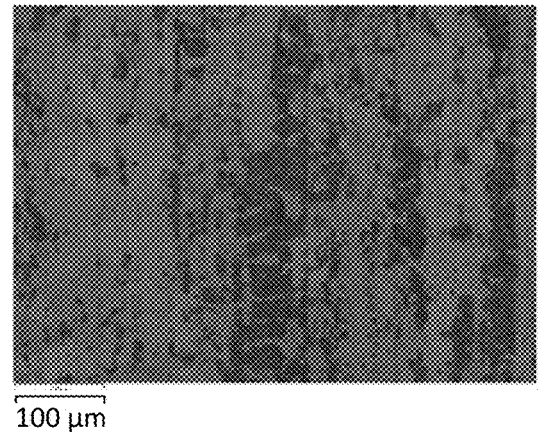
FIG. 22D is a scanning electron micrograph showing a surface portion of an aluminum alloy according to certain aspects of the present disclosure.
Figure 23A:
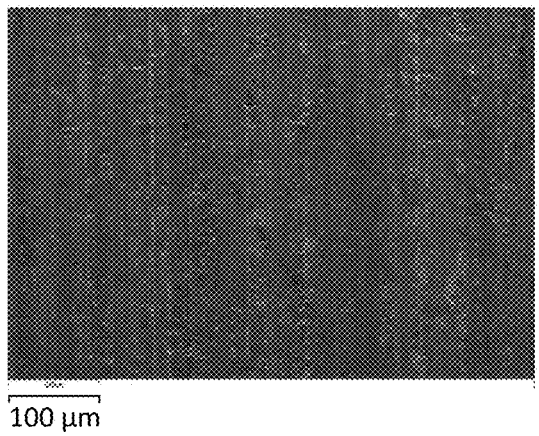
FIG. 23A is a scanning electron micrograph showing a surface portion of an aluminum alloy according to certain aspects of the present disclosure.
Figure 23B:
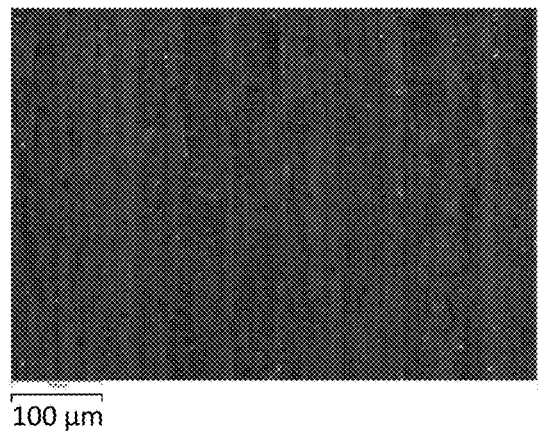
FIG. 23B is a scanning electron micrograph showing a surface portion of an aluminum alloy according to certain aspects of the present disclosure.
Figure 23C:
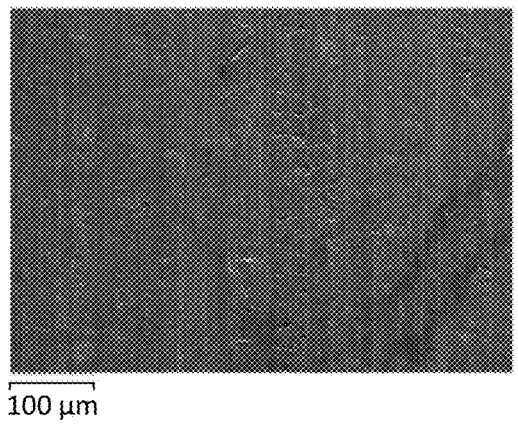
FIG. 23C is a scanning electron micrograph showing a surface portion of an aluminum alloy according to certain aspects of the present disclosure.
Figure 23D:
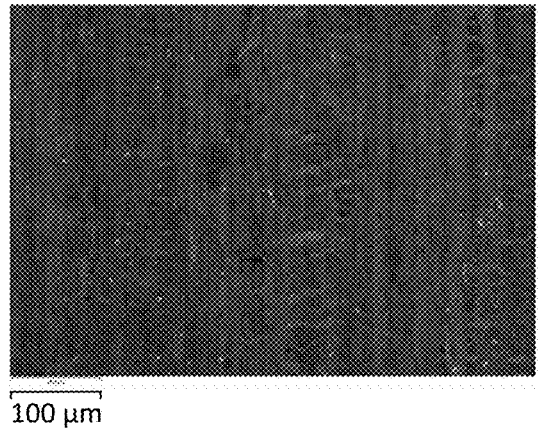
FIG. 23D is a scanning electron micrograph showing a surface portion of an aluminum alloy according to certain aspects of the present disclosure.
Figure 24A:
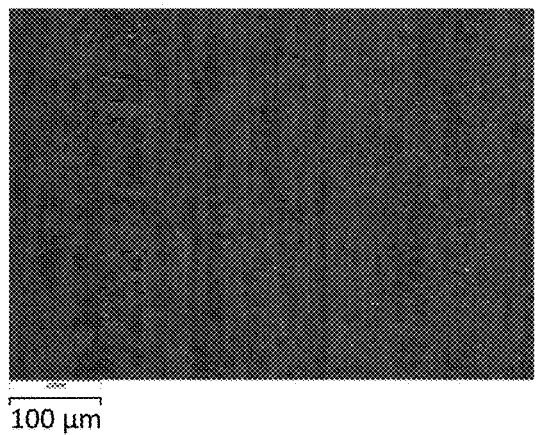
FIG. 24A is a scanning electron micrograph showing a surface portion of an aluminum alloy according to certain aspects of the present disclosure.
Figure 24B:
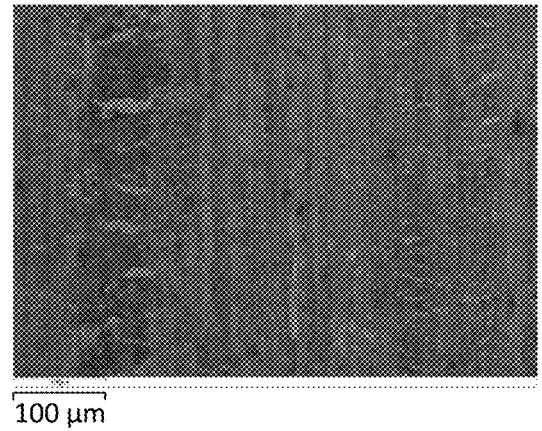
FIG. 24B is a scanning electron micrograph showing a surface portion of an aluminum alloy according to certain aspects of the present disclosure.
Figure 24C:
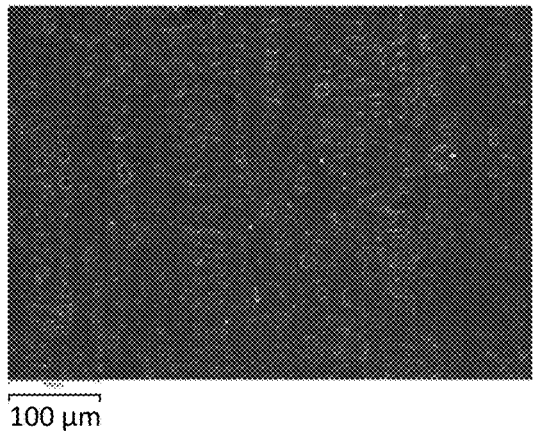
FIG. 24C is a scanning electron micrograph showing a surface portion of an aluminum alloy according to certain aspects of the present disclosure.
Figure 24D:
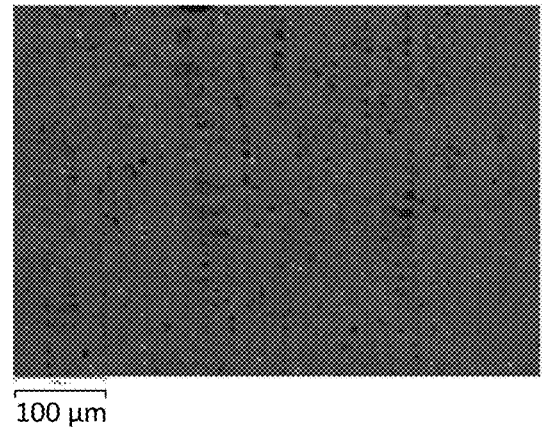
FIG. 24D is a scanning electron micrograph showing a surface portion of an aluminum alloy according to certain aspects of the present disclosure.

21A and 21B show the SEM micrographs from Etch 1 (see Table 3). FIGS. 21C and 21D show the SEM micrographs from Etch 4. FIGS. 21A and 21C are micrographs from a scanning electron mode. FIGS. 21B and 21D are micrographs from a back-scattered electron mode. FIGS. 22A-D shows SEM micrographs of the aluminum alloy samples etched using Solution B. FIGS. 22A and 22B show the SEM micrographs from Etch 5. FIGS. 22C and 22D show the SEM micrographs from Etch 7. FIGS. 22A and 22C are micrographs from a scanning electron mode. FIGS. 22B and 22D are micrographs from a back-scattered electron mode. FIGS. 23A-D shows SEM micrographs of the aluminum alloy samples etched using Solution C. FIGS. 23A and 23B show the SEM micrographs from Etch 9. FIGS. 23C and 23D show the SEM micrographs from Etch 12. FIGS. 23A and 23C are micrographs from a scanning electron mode. FIGS. 23B and 23D are micrographs from a back-scattered electron mode. FIGS. 24A-D shows SEM micrographs of the aluminum alloy samples etched using Solution D. FIGS. 24A and 24B show the SEM micrographs from Etch 13. FIGS. 24C and 24D show the SEM micrographs from Etch 16. FIGS. 24A and 24C are micrographs from a scanning electron mode. FIGS. 24B and 24D are micrographs from a back-scattered electron mode. Evident in FIGS. 21-24, Solution B (FIG. 22) provided the greatest etch weight of Etch Solutions A, B, and C, see FIG. 16), thus providing a surface having a reduced amount of Mg and/or Mg containing compound particles (indicated by bright spots in FIGS. 21, 23, and 24), and a reduced deformed oxide layer (shown as darker grey areas in FIGS. 21, 23, and 24).

Figure 25:
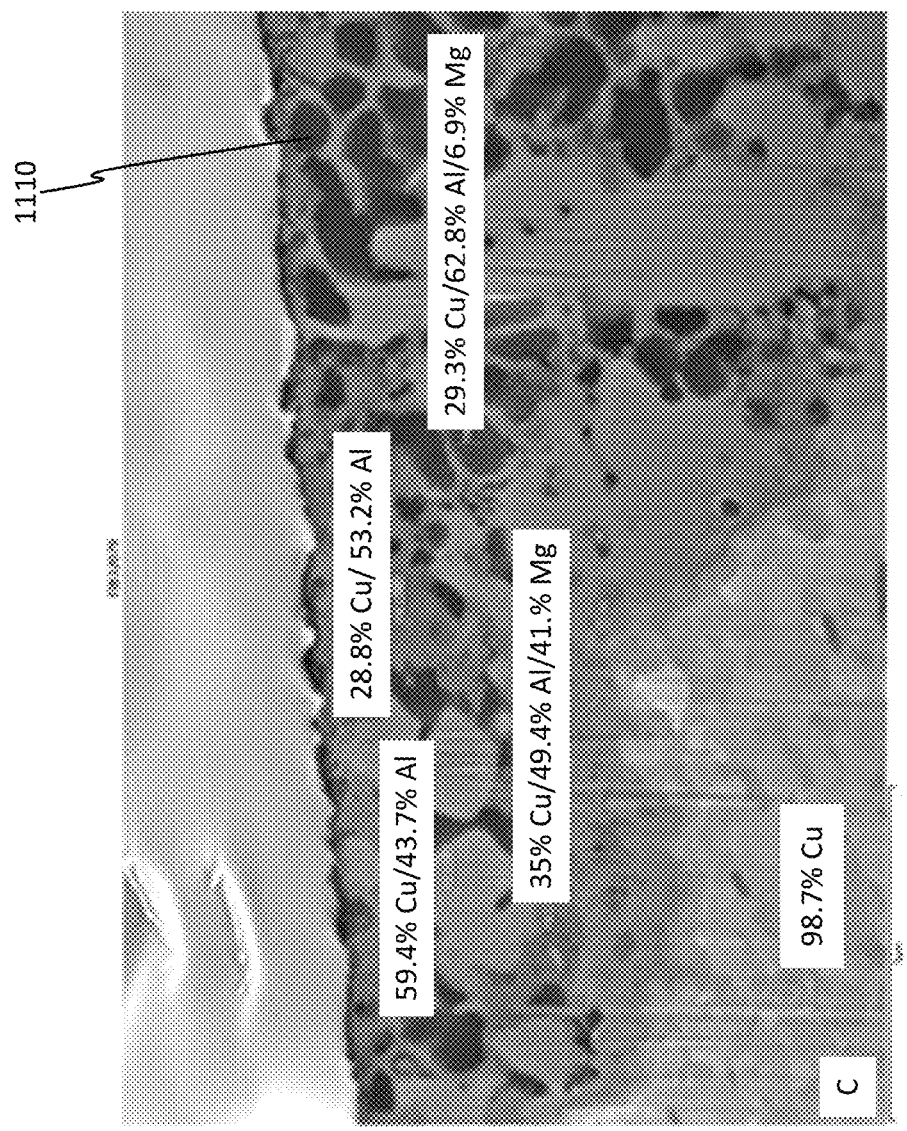
FIG. 25, Panel A shows scanning electron micrographs of a resistance spot welding copper electrode tip.
Figure 25:
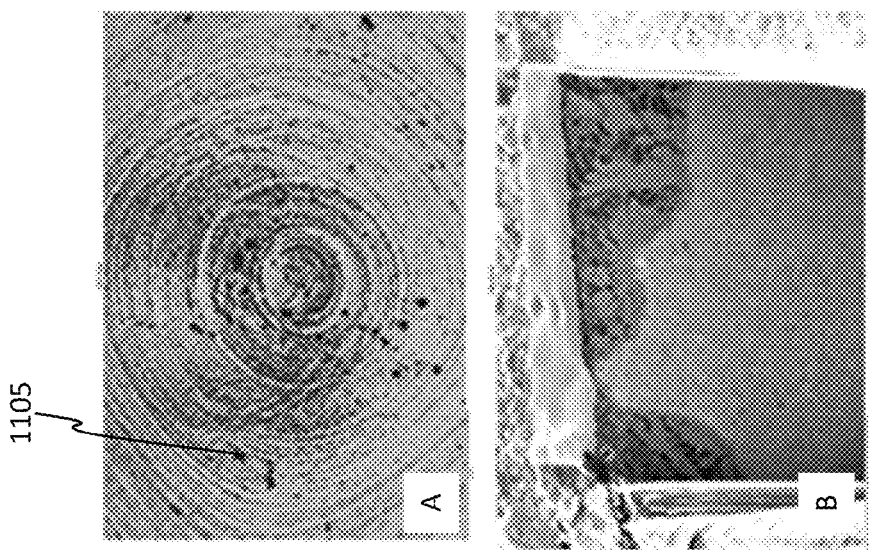

A commercially produced AA5182 aluminum alloy sheet having a thickness of 1.1 mm was used in an as-produced condition (meaning the aluminum alloy sheet was not etched according to the methods described herein). The aluminum alloy sheet was subjected to a RSW trial. FIG. 25, Panel A shows a copper RSW electrode tip. In the example of FIG. 25, Panel A, MgO particles 1105 adhered to the RSW electrode tip. FIG. 25, Panel B shows a micrograph of the weld, and FIG. 25, Panel C is a higher magnification image of FIG. 25, Panel B. As shown in FIG. 25, Panel C, dark areas 1110 indicate MgO present at the surface or in the subsurface of the aluminum alloy sheet. In the example of FIG. 25, Panel C, the Mg content was 6.9%. An as-produced AA5182 aluminum alloy contains from 4% to 5% Mg (e.g., about 4.5% Mg). A Mg content of 6.9% at the surface or in the subsurface indicated migration of Mg from a bulk of the aluminum alloy toward the surface during processing, providing undesired amounts of MgO at the surface or in the subsurface of the aluminum alloy. Accordingly, during the RSW trial, MgO particles adhered to the RSW electrode tip. Such MgO particle pick-up can significantly reduce the RSW electrode lifetime. Thus, etching and/or cleaning the surface of the aluminum alloy sheet according to the methods described herein can remove MgO from the surface or the subsurface of the aluminum alloy, form Mg—P compounds as described above, eliminate MgO pick-up by the RSW electrode, and increase the lifetime of the RSW electrode.

Figure 26:
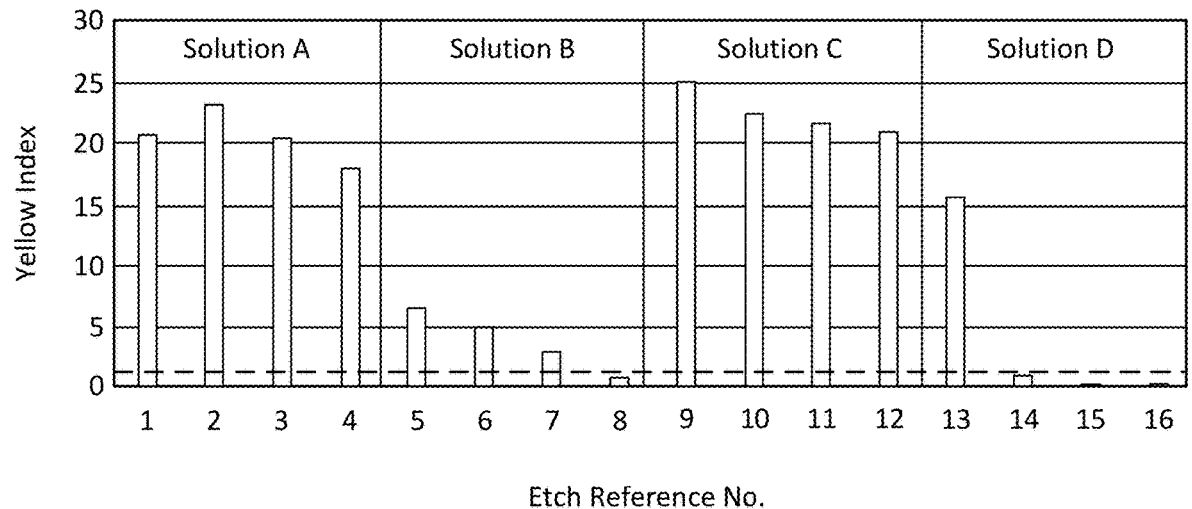
FIG. 26 is a graph showing the yellow index (YI) of aluminum alloys according to certain aspects of the present disclosure.

FIG. 26 is a graph showing the yellow index (YI) of the aluminum alloy samples prepared as described above. As described above, the YI can indicate the presence of a Mg and/or Mg containing compound (e.g., MgO) on the surface of the aluminum alloys. A lack of a significant YI is indicated by a dashed line (e.g., a YI less than about 1). The aluminum alloy samples etched using comparative Solution D (e.g., providing the greatest etch weight) exhibited a very low YI, particularly when the etching dwell time was greater than 20 seconds (e.g., Etches 14, 15, and 16, see Table 3). A very low YI indicates a negligible concentration of Mg or Mg containing compounds on the surface of the aluminum alloys. Additionally, the aluminum alloy samples etched using Solution B (e.g., providing the greatest etch weight of the exemplary etch solutions (Solutions A, B, and C)) exhibited a low YI, indicating a significant removal of Mg and/or Mg containing compounds from the surface of the aluminum alloy samples. The aluminum alloy samples etched using Solutions A and C (e.g., providing low etch weights) exhibited a greater YI for each sample, indicating a greater Mg and/or Mg containing compounds concentration than the aluminum alloy samples etched using Solutions B and D. Surprisingly, the aluminum alloy samples etched using Solution A provided a significantly improved RSW electrode lifetime even while having a significant Mg and/or Mg containing compounds concentration at the surface of the aluminum alloy samples. Also, an increase in the YI was observed from Etch Reference No. 1 to Etch Reference No. 2 (e.g., a "reverse effect" was observed), indicating the etch procedure exposed additional Mg to the alloy surface and thus oxidizing the additional Mg once exposed. Additional Mg can be attributed to a Mg enriched subsurface. Surprisingly, the aluminum alloy samples etched using Solution C exhibited detrimental effects on the RSW electrode lifetime when exhibiting a similar YI to the aluminum alloy samples etched using Solution A. Thus, an optimized surface chemistry, wherein a lower etch weight allows for a concentration of Mg and/or Mg containing compounds to remain within the subsurface of an aluminum alloy, created by etching with a P containing compound in which residual P can remain, provided a significantly improved RSW electrode lifetime. The standard deviation of the YI for all samples was less than 1.5% of the mean YI.

Figure 27:
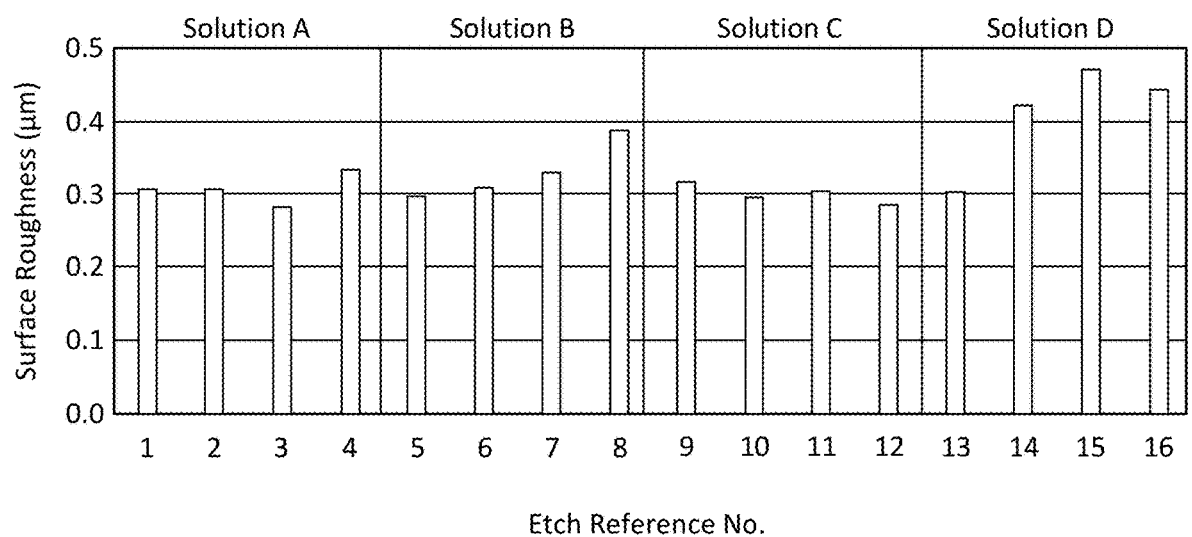
FIG. 27 is a graph showing the surface roughness of aluminum alloys according to certain aspects of the present disclosure.

FIG. 27 is a graph showing the surface roughness of the aluminum alloy samples prepared as described above. The aluminum alloy samples etched using Solutions A and C (e.g., providing low etch weights) exhibited a negligible change in surface roughness with increasing etch time for each sample, indicating a more uniform etch (i.e., a more uniform removal of surface material) regardless of etch time when compared to the aluminum alloy samples etched using Solutions B and D. Surprisingly, the aluminum alloy samples etched using Solution A provided a significantly improved RSW electrode lifetime even while having a lower surface roughness compared to the aluminum alloy samples etched using Solutions B and D, in particular, Etch Reference Nos. 8, 14, 15, and 16.

All patents, publications, and abstracts cited above are incorporated herein by reference in their entireties. Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:

1. An aluminum alloy product, comprising:
   one or more migrant elements, the one or more migrant elements comprising at least Mg as a first migrant element and Si as a second migrant element;
   a subsurface portion having a first peak concentration of the first migrant element and a second peak concentration of the second migrant element, wherein the subsurface portion comprises a thickness from a surface of the aluminum alloy product to a depth of about 5 μm or less within an interior of the aluminum alloy product; and a bulk portion having a first bulk concentration of the first migrant element and a second bulk concentration of the second migrant element, wherein the first peak concentration of the first migrant element in the subsurface portion is higher than the first bulk concentration of the first migrant element in the bulk portion and wherein the second peak concentration of the second migrant element in the subsurface portion is higher than the second bulk concentration of the second migrant element in the bulk portion, and wherein the aluminum alloy product comprises a first enrichment ratio of the first migrant element and a second enrichment ratio of the second migrant element, wherein the first enrichment ratio is from about 1.5 to about 4.0 and wherein the second enrichment ratio is from about 1.5 to about 4.0, wherein an enrichment ratio is defined as a ratio of a peak concentration of a migrant element in the subsurface portion to a bulk concentration of the migrant element in the bulk portion.

2. The aluminum alloy product of claim 1, wherein the one or more migrant elements further comprise an additional migrant element, wherein the additional migrant element is at least one of Zn or Cu, and wherein the additional migrant element has an additional enrichment ratio of from about 1.0 to about 4.0.

3. The aluminum alloy product of claim 1, wherein the subsurface portion comprises a thickness from the surface of the aluminum alloy product to a depth of about 2 μm or less within the interior of the aluminum alloy product.

4. The aluminum alloy product of claim 1, wherein the subsurface portion comprises a thickness from the surface of the aluminum alloy product to a depth of about 0.5 μm or less within the interior of the aluminum alloy product.

5. The aluminum alloy product of claim 1, wherein the first enrichment ratio is 2.0 or less.

6. The aluminum alloy product of claim 1, wherein the aluminum alloy product comprises a 7xxx series aluminum alloy, a 6xxx series aluminum alloy, a 5xxx series aluminum alloy, or a 2xxx series aluminum alloy.

7. The aluminum alloy product of claim 6, wherein the aluminum alloy product comprises a 6xxx series aluminum alloy.

8. The aluminum alloy product of claim 1, wherein the one or more migrant elements further comprise Zn as a third migrant element and Cu as a fourth migrant element, wherein the third migrant element has a third enrichment ratio of from about 1.0 to about 4.0 and wherein the fourth migrant element has a fourth enrichment ratio of from about 1.0 to about 4.0.

9. The aluminum alloy product of claim 1, wherein the one or more migrant elements further comprise Cr as a third migrant element, wherein the third migrant element has a third enrichment ratio of from about 4.1 to about 8.0.

10. The aluminum alloy product of claim 1, wherein the one or more migrant elements further comprise Fe as a third migrant element, wherein the third migrant element has a third enrichment ratio of from about 4.1 to about 8.0.

11. The aluminum alloy product of claim 1, wherein the one or more migrant elements further comprise Zn as a third migrant element, wherein the third migrant element has a third enrichment ratio of from about 4.1 to about 8.0.

12. The aluminum alloy product of claim 1, wherein the one or more migrant elements further comprise Mn as a third migrant element, wherein the third migrant element has a third enrichment ratio of from about 4.1 to about 8.0.

13. The aluminum alloy product of claim 1, wherein the one or more migrant elements further comprise Cr as a third migrant element and Fe as a fourth migrant element, wherein the third migrant element has a third enrichment ratio of from about 4.1 to about 8.0 and wherein the fourth migrant element has a fourth enrichment ratio of from about 4.1 to about 8.0.

14. The aluminum alloy product of claim 1, wherein the one or more migrant elements further comprise Cr as a third migrant element and Zn as a fourth migrant element, wherein the third migrant element has a third enrichment ratio of from about 4.1 to about 8.0 and wherein the fourth migrant element has a fourth enrichment ratio of from about 4.1 to about 8.0.

15. The aluminum alloy product of claim 1, wherein the aluminum alloy product comprises a 7xxx series aluminum alloy.

16. The aluminum alloy product of claim 1, wherein the subsurface portion includes Cu dispersoids or particles less than about 10 nm in diameter.

17. An aluminum alloy product, comprising:
one or more migrant elements, the one or more migrant elements comprising at least Cr as a first migrant element and Mg as a second migrant element;
a subsurface portion having a first peak concentration of the first migrant element and a second peak concentration of the second migrant element, wherein the subsurface portion comprises a thickness from an exterior surface of the aluminum alloy product to a depth of from 0.01 μm to 5 μm within an interior of the aluminum alloy product; and
a bulk portion having a first bulk concentration of the first migrant element and a second bulk concentration of the second migrant element,
wherein the first peak concentration of the first migrant element in the subsurface portion is higher than the first bulk concentration of the first migrant element in the bulk portion, wherein the second peak concentration of the second migrant element in the subsurface portion is higher than the second bulk concentration of the second migrant element in the bulk portion, and wherein the aluminum alloy product comprises a first enrichment ratio of the first migrant element from about 4.1 to about 8.0 and a second enrichment ratio of the second migrant element from about 1.5 to about 4.0, wherein an enrichment ratio is defined as a ratio of a peak concentration of a migrant element in the subsurface portion to a bulk concentration of the migrant element in the bulk portion.

18. The aluminum alloy product of claim 17, wherein the one or more migrant elements further comprise an additional migrant element, wherein the additional migrant element is at least one of Cu, Mn, or Fe, wherein the additional migrant element has an additional peak concentration in the subsurface portion and an additional bulk concentration in the bulk portion, wherein the additional peak concentration is higher than the additional bulk concentration, wherein the aluminum alloy product comprises an additional enrichment ratio of the additional migrant element, and wherein the additional enrichment ratio is from about 4.1 to about 8.0.

19. The aluminum alloy product of claim 17, wherein the aluminum alloy product comprises a 6xxx series aluminum alloy or a 5xxx series aluminum alloy.

20. The aluminum alloy product of claim 19, wherein the aluminum alloy product comprises a 6xxx series aluminum alloy.

21. The aluminum alloy product of claim 17, wherein the one or more migrant elements further comprise Fe as a third migrant element, wherein the aluminum alloy product comprises a third enrichment ratio of the third migrant element, and wherein the third enrichment ratio is from about 4.1 to about 8.0.

22. The aluminum alloy product of claim 17, wherein the one or more migrant elements further comprise Zn as a third migrant element, wherein the aluminum alloy product comprises a third enrichment ratio of the third migrant element, and wherein the third enrichment ratio is from about 4.1 to about 8.0.

23. The aluminum alloy product of claim 17, wherein the one or more migrant elements further comprise Mn as a third migrant element, wherein the aluminum alloy product comprises a third enrichment ratio of the third migrant element, and wherein the third enrichment ratio is from about 4.1 to about 8.0.

24. The aluminum alloy product of claim 17, wherein the one or more migrant elements further comprise Fe as a third migrant element and Mn as a fourth migrant element, wherein the aluminum alloy product comprises a third enrichment ratio of the third migrant element and a fourth enrichment ratio of the fourth migrant element, and wherein the third enrichment ratio is from about 4.1 to about 8.0 and wherein the fourth enrichment ratio is from about 4.1 to about 8.0.

25. The aluminum alloy product of claim 17, wherein the one or more migrant elements further comprise Fe as a third migrant element and Zn as a fourth migrant element, wherein the aluminum alloy product comprises a third enrichment ratio of the third migrant element and a fourth enrichment ratio of the fourth migrant element, and wherein the third enrichment ratio is from about 4.1 to about 8.0 and wherein the fourth enrichment ratio is from about 4.1 to about 8.0.

26. The aluminum alloy product of claim 17, wherein the one or more migrant elements further comprise Zn as a third migrant element and Mn as a fourth migrant element, wherein the aluminum alloy product comprises a third enrichment ratio of the third migrant element and a fourth enrichment ratio of the fourth migrant element, and wherein the third enrichment ratio is from about 4.1 to about 8.0 and wherein the fourth enrichment ratio is from about 4.1 to about 8.0.

27. The aluminum alloy product of claim 17, wherein the subsurface portion includes Cu dispersoids or particles less than about 10 nm in diameter.

28. The aluminum alloy product of claim 17, wherein the one or more migrant elements further comprise Si as a third migrant element, wherein the aluminum alloy product comprises a third enrichment ratio of the third migrant element, and wherein the third enrichment ratio is from about 1.5 to about 4.0.

29. A method of producing an aluminum alloy product, comprising:
    casting an aluminum alloy comprising one or more migrant elements to produce a cast aluminum alloy article, the one or more migrant elements comprising at least Mg as a first migrant element and Si as a second migrant element;
    rolling the cast aluminum alloy article to provide a rolled aluminum alloy article; and
    heat treating the rolled aluminum alloy article to form an aluminum alloy product,
    wherein the first migrant element and the second migrant element are distributed within a subsurface portion and a bulk portion of the aluminum alloy product to provide a first enrichment ratio for the first migrant element of from about 1.5 to about 4.0 and second enrichment ratio for the second migrant element of from about 1.5 to about 4.0, wherein an enrichment ratio is defined as a ratio of a peak concentration of a migrant element in the subsurface portion to a bulk concentration of the migrant element in the bulk portion, wherein a first peak concentration of the first migrant element in the subsurface portion is higher than a first bulk concentration of the first migrant element in the bulk portion and a second peak concentration of the second migrant element in the subsurface portion is higher than a second bulk concentration of the second migrant element in the bulk portion, and wherein the subsurface portion comprises a thickness from a surface of the aluminum alloy product to a depth of about 5 μm or less within an interior of the aluminum alloy product.

30. The method of claim 29, wherein the rolling step is performed at a temperature of from about 200° C. to about 550° C.

31. The method of claim 29, wherein the heat treating step is performed at a temperature of from about 400° C. to about 580° C.

32. The method of claim 29, wherein the heat treating step is performed for about 120 seconds or less.

33. The method of claim 29, further comprising pretreating the cast aluminum alloy article.

34. The method of claim 33, wherein the pretreating comprises cleaning a surface of the cast aluminum alloy article, etching the surface of the cast aluminum alloy article, and applying a pretreatment to the surface of the cast aluminum alloy article.

35. The method of claim 34, wherein the pretreating is performed after the heat treating step.

36. The method of claim 29, wherein the casting comprises direct chill casting.

37. The method of claim 29, wherein the casting comprises continuous casting.

\* \* \* \* \*